(12) United States Patent
Yarger et al.

(10) Patent No.: US 7,688,036 B2
(45) Date of Patent: Mar. 30, 2010

(54) SYSTEM AND METHOD FOR STORING ENERGY

(75) Inventors: Eric Jay Yarger, Rigby, ID (US); John Morrison, Butte, MT (US); John Grant Richardson, Idaho Falls, ID (US); David Frazer Spencer, Idaho Falls, ID (US); Dale W. Christiansen, Blackfoot, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 318 days.

(21) Appl. No.: 11/475,564

(22) Filed: Jun. 26, 2006

(65) Prior Publication Data
US 2008/0074083 A1 Mar. 27, 2008

(51) Int. Cl.
*H02J 7/00* (2006.01)
*H04B 1/38* (2006.01)
*G11B 13/00* (2006.01)
*H01F 27/02* (2006.01)

(52) U.S. Cl. .................. 320/137; 320/138; 455/573; 369/13.02; 336/90

(58) Field of Classification Search ............. 320/137, 320/138; 455/573
See application file for complete search history.

(56) References Cited

U.S. PATENT DOCUMENTS

| | | | | |
|---|---|---|---|---|
| 2,209,809 A | 7/1940 | Burton | | 175/21 |
| 2,302,687 A | 11/1942 | Dyer | | 290/37 |
| 3,022,400 A | 2/1962 | von Ahlefeldt | | 200/93 |
| 3,031,802 A | 5/1962 | Leliaert | | |
| 3,549,818 A | 12/1970 | Turner | | 179/82 |
| 3,607,403 A | 9/1971 | Arrance | | 136/6 |
| 3,660,760 A | 5/1972 | Schaad et al. | | 325/28 |
| 3,665,123 A | 5/1972 | Ikeda | | 179/100.41 K |
| 3,665,597 A | 5/1972 | Tan et al. | | |
| 3,809,825 A | 5/1974 | Schaad et al. | | 179/82 |
| 3,925,694 A | 12/1975 | Richter et al. | | |
| 3,963,854 A | 6/1976 | Fowler | | 174/36 |
| 3,973,269 A | 8/1976 | Koch et al. | | |
| 4,046,244 A | 9/1977 | Velazquez | | |
| 4,080,663 A | 3/1978 | Wik | | 366/274 |

(Continued)

FOREIGN PATENT DOCUMENTS

AU 20022585 A4 6/2002

(Continued)

OTHER PUBLICATIONS

Callahan et al., "Free-Piston Engine Linear Generator for Hybrid Vehicles Modeling Study," Advanced Research Projects Agency, Arlington, VA, May 1995.

(Continued)

*Primary Examiner*—Edward Tso
*Assistant Examiner*—Yalkew Fantu
(74) *Attorney, Agent, or Firm*—Seed IP Law Group PLLC

(57) ABSTRACT

A self-recharging battery comprising a generator and an energy storage device contained within the battery case. The generator comprises a magnetic structure configured to generate a compressed magnetic field and a coil configured to focus the compressed magnetic field in electrical conductive elements of the coil.

12 Claims, 39 Drawing Sheets
(3 of 39 Drawing Sheet(s) Filed in Color)

U.S. PATENT DOCUMENTS

| | | | |
|---|---|---|---|
| 4,217,171 A | 8/1980 | Schaffer | |
| 4,218,712 A | 8/1980 | Clymer et al. | 358/229 |
| 4,245,640 A | 1/1981 | Hunt | 128/419 B |
| 4,290,663 A | 9/1981 | Fowler et al. | 339/143 R |
| 4,304,136 A | 12/1981 | McCabe et al. | |
| 4,320,927 A | 3/1982 | Sertich | |
| 4,331,285 A | 5/1982 | Gottwals | |
| 4,363,902 A | 12/1982 | Kurz | |
| 4,372,214 A | 2/1983 | Toton et al. | |
| 4,421,118 A | 12/1983 | Dow et al. | |
| 4,430,679 A | 2/1984 | van de Bult | 360/106 |
| 4,460,855 A | 7/1984 | Kelly | |
| 4,563,727 A | 1/1986 | Curiel | 362/183 |
| 4,636,902 A | 1/1987 | Dalziel et al. | 360/128 |
| 4,639,667 A | 1/1987 | Andresen | |
| 4,641,118 A | 2/1987 | Hirose et al. | |
| 4,646,141 A | 2/1987 | Timmermans et al. | 358/50 |
| 4,648,013 A | 3/1987 | Curiel | 362/183 |
| 4,890,812 A | 1/1990 | Chechile et al. | 248/674 |
| 4,959,504 A | 9/1990 | Yarger et al. | |
| 4,992,624 A | 2/1991 | Benson et al. | 174/35 R |
| 5,075,809 A | 12/1991 | Heinz et al. | 360/128 |
| 5,146,123 A | 9/1992 | Yarr | |
| 5,161,414 A | 11/1992 | Rubbelke | 73/658 |
| 5,181,004 A | 1/1993 | Johnson | |
| 5,214,710 A | 5/1993 | Ziegenberg et al. | |
| 5,319,332 A | 6/1994 | Espinosa | 335/214 |
| 5,347,186 A | 9/1994 | Konotchick | |
| 5,463,268 A | 10/1995 | Schroeder | 313/293 |
| 5,502,901 A | 4/1996 | Brown | 36/28 |
| 5,650,681 A | 7/1997 | DeLerno | |
| 5,770,945 A | 6/1998 | Constable | 324/350 |
| 5,782,512 A | 7/1998 | Cargnoni | |
| 5,838,138 A | 11/1998 | Henty | 320/107 |
| 5,951,459 A | 9/1999 | Blackwell | 600/13 |
| 5,975,714 A | 11/1999 | Vetorino et al. | |
| 5,978,446 A | 11/1999 | Resnick | |
| 5,997,464 A | 12/1999 | Blackwell | 600/13 |
| 6,111,257 A | 8/2000 | Shand et al. | 250/368 |
| 6,174,276 B1 | 1/2001 | Blackwell | 600/13 |
| 6,179,772 B1 | 1/2001 | Blackwell | 600/13 |
| 6,186,941 B1 | 2/2001 | Blackwell | 600/13 |
| 6,215,303 B1 | 4/2001 | Weinstock et al. | 324/263 |
| 6,220,719 B1 | 4/2001 | Vetorino et al. | |
| 6,313,624 B1 | 11/2001 | Alhorn et al. | 324/207.17 |
| 6,489,772 B1 | 12/2002 | Holladay et al. | 324/339 |
| 6,550,306 B1 | 4/2003 | Bensley | 73/12.04 |
| 6,554,097 B2 | 4/2003 | König | 181/129 |
| 6,600,399 B1 | 7/2003 | Trandafir | 335/222 |
| 6,603,224 B1 | 8/2003 | Hollingsworth et al. | |
| 6,664,759 B1 | 12/2003 | Goris | |
| 6,731,968 B2 | 5/2004 | Buchanan | 600/409 |
| 6,759,755 B2 | 7/2004 | Sagov | |
| 6,791,205 B2 | 9/2004 | Woodbridge | |
| 6,798,090 B2 | 9/2004 | Cheung et al. | |
| 6,864,592 B1 | 3/2005 | Kelly | |
| 6,903,725 B2 | 6/2005 | Nacson | 345/163 |
| 6,915,145 B2 * | 7/2005 | Tu et al. | 455/573 |
| 6,936,937 B2 | 8/2005 | Tu et al. | |
| 6,937,881 B2 | 8/2005 | König | 455/575.1 |
| 6,952,060 B2 | 10/2005 | Goldner et al. | |
| 7,009,310 B2 | 3/2006 | Cheung et al. | |
| 7,327,046 B2 | 2/2008 | Biamonte | 290/1 R |
| 7,501,726 B1 | 3/2009 | Waters et al. | |
| 7,573,163 B2 | 8/2009 | Tu et al. | |
| 2001/0033175 A1 | 10/2001 | Marbach et al. | |
| 2002/0066617 A1 | 6/2002 | Konig | 181/129 |
| 2002/0074881 A1 | 6/2002 | Imlach | |
| 2002/0074882 A1 | 6/2002 | Werfel et al. | |
| 2002/0148625 A1 | 10/2002 | Darling et al. | 174/35 R |
| 2002/0154518 A1 | 10/2002 | Elferich et al. | 363/15 |
| 2002/0160726 A1 | 10/2002 | Konig | 455/90 |
| 2003/0168924 A1 | 9/2003 | Murakami et al. | |
| 2003/0232627 A1 * | 12/2003 | Tu et al. | 455/550.1 |
| 2004/0070482 A1 | 4/2004 | Golan | 336/223 |
| 2004/0133130 A1 | 7/2004 | Ferry et al. | |
| 2004/0140880 A1 | 7/2004 | Haugs et al. | |
| 2005/0001703 A1 | 1/2005 | Zimmerling | |
| 2005/0067907 A1 | 3/2005 | Takeuchi | |
| 2005/0127765 A1 | 6/2005 | Kummeth | |
| 2005/0141742 A1 | 6/2005 | Kasztelan | 381/331 |
| 2005/0168307 A1 | 8/2005 | Reynolds et al. | 335/220 |

FOREIGN PATENT DOCUMENTS

| | | |
|---|---|---|
| CN | 2457747 | 10/2001 |
| CN | 1444234 A | 9/2003 |
| DE | 19702056 A1 | 7/1998 |
| DE | 19947119 A1 | 5/2001 |
| DE | 10132881 A1 | 1/2003 |
| EP | 0192860 A1 | 9/1986 |
| EP | 0290343 A1 | 11/1988 |
| EP | 0192860 B1 | 3/1990 |
| EP | 0523450 A1 | 1/1993 |
| EP | 0290343 B1 | 2/1993 |
| EP | 0786849 B1 | 7/1997 |
| EP | 0933980 A2 | 8/1999 |
| EP | 0933980 A3 | 4/2000 |
| EP | 1143461 A1 | 10/2001 |
| GB | 115789 A | 5/1918 |
| GB | 424549 A | 2/1935 |
| GB | 424669 A | 2/1935 |
| GB | 435416 | 9/1935 |
| GB | 2052886 A | 1/1981 |
| GB | 8315514 A | 7/1983 |
| GB | 2181306 A | 4/1987 |
| GB | 2263386 A | 7/1993 |
| GB | 2314470 A | 12/1997 |
| GB | 2354646 A | 3/2001 |
| JP | 2114438 A | 4/1990 |
| JP | 3119638 A | 5/1991 |
| JP | 6207965 A | 7/1994 |
| JP | 10283079 A | 10/1998 |
| JP | 2000036418 A | 2/2000 |
| JP | 2000092783 A | 3/2000 |
| SU | 546951 A | 3/1977 |
| WO | WO 86/04132 | 7/1986 |
| WO | WO 91/17611 | 11/1991 |
| WO | WO 92/01362 | 1/1992 |
| WO | WO 02/15658 A1 | 2/2002 |
| WO | WO 02/052671 A1 | 7/2002 |
| WO | WO 02/060041 A2 | 8/2002 |
| WO | WO 02/060041 A3 | 8/2002 |
| WO | WO 03/085408 A2 | 10/2003 |
| WO | WO 03/085408 A3 | 10/2003 |
| WO | 2005031952 A1 | 4/2005 |
| WO | 2009126188 A2 | 10/2009 |

OTHER PUBLICATIONS

English Abstract for SU546951A.
English Translation of SU546951A.
United States Patent and Trademark Office Action dated Jul. 10, 2009 entered in co-pending U.S. Appl. No. 11/475,389.

* cited by examiner

SYSTEM AND METHOD FOR STORING ENERGY

STATEMENT REGARDING GOVERNMENT INTEREST

This invention was made with United States Government support under Contract No. DE-AC07-05-ID14517 awarded by the United States Department of Energy. The United States Government has certain rights in the invention.

BACKGROUND OF THE INVENTION

1. Field of the Invention

This disclosure generally relates to a system and method for storing energy and more particularly to a system and method for portably converting energy into an electrical current and storing the energy.

2. Description of the Related Art

Conventional portable energy storage devices, such as conventional batteries and storage capacitors, are either disposable or rechargeable by coupling the device to a remote source of electrical energy. Disposable devices inherently limit the amount of portable stored energy available to a user. Carrying extra disposable devices is expensive, and a user must accommodate associated weight, storage space, and disposal requirements. They also are environmentally unfriendly. Conventional rechargeable devices are more environmentally friendly than non-rechargeable devices, but a remote source of energy is required to recharge the devices and the energy available between accesses to the remote source of energy is limited. In addition, recharging requires user intervention.

Conventional shake-flashlights and similar shake-activated devices provide for storing limited amounts of energy, enough to power, for example, an LED for a brief period of time, but typically do not produce enough energy to power a conventional flashlight light bulb, and other high current draw devices, for example, a cell-phone, a camera, a GPS system or a conventional flashlight. They also are bulky and require physical activity expressly directed to charging the device. In addition, conventional shake-activated devices are not readily deployable to power another portable device. They also produce objectionable levels of magnetic fields that can potentially interfere with the operation of electronic devices, such as cell-phones and health-related devices, such as pacemakers.

Conventional crank-powered devices have much more energy-storage capabilities than conventional shake-activated devices, but similarly are bulky, require physical activity expressly directed to recharging the device, are not readily deployable to power another portable device, and may generate objectionable levels of magnetic fields.

Electro-magnetic and electro-mechanical devices and applications, such as, for example, motors, generators and alternators, typically employ coils and/or magnets. Conventional magnetic structures employ a single magnet to generate a magnetic field, or a plurality of magnets arranged to generate a magnetic field. The magnets are typically permanent magnets or electromagnets. The efficiency of many applications is dependant on the gradient of the magnetic field generated by the magnetic structure.

When an increase in output or performance was desired, conventionally the size or number of coils was increased or the size or strength of the magnets would be increased. These approaches introduce weight, cost, size and durability issues. These approaches also are not practical for many applications. Therefore it can be appreciated that there is a need for improved coils and magnets for use in electro-magnetic and electromechanical devices and applications.

BRIEF SUMMARY OF THE INVENTION

In one embodiment, a coil comprises an electrical conductive winding and a magnetic conductive winding configured to focus magnetic flux in the electrical conductive winding. In one embodiment, the coil further comprises a winding form. In one embodiment, a first layer on the winding form comprises a layer of the electrical conductive winding. In one embodiment, a second layer of the electrical conductive winding is adjacent to the first layer on the winding form. In one embodiment, a layer of the magnetic conductive winding is adjacent to the second layer of the electrical conductive winding. In one embodiment, a layer of the magnetic conductive winding is adjacent to the first layer on the winding form. In one embodiment, a last layer on the winding form comprises a layer of the electrical conductive winding. In one embodiment, a last layer on the winding form comprises a layer of the electrical conductive winding. In one embodiment, a layer of the magnetic conductive winding is between two layers of the electric conductive winding. In one embodiment, a plurality of layers of the magnetic conductive winding is between two layers of the electric conductive winding. In one embodiment, the magnetic conductive winding forms a closed loop. In one embodiment, the coil has a trapezoidal-shaped portion. In one embodiment, the coil is wound around a core. In one embodiment, the electrical conductive winding and the magnetic conductive winding together comprise a dual-conductor winding. In one embodiment, the magnetic conductive winding comprises a silver/nickel alloy. In one embodiment, the coil further comprises a layer of insulating material, wherein the electrical conductive winding comprises a trace formed on the layer of insulation material.

In one embodiment, a winding comprises an electrical conductive wire and a magnetic conductive wire insulated from and secured to the electrical conductive wire and configured to focus magnetic flux in the electrical conductive wire. In one embodiment, the magnetic conductive wire forms a closed loop. In one embodiment, the magnetic conductive wire is secured to the magnetic conductive wire by an insulating material. In one embodiment, the magnetic conductive wire forms a core of the winding and is surrounded by an insulating layer and the electrical conductive wire surrounds the insulating layer. In one embodiment, the electrical conductive wire comprises a stranded wire.

In one embodiment, a system comprises a magnetic structure and a coil, the coil comprising an electrical conductive winding and a magnetic conductive winding configured to focus magnetic flux in the electrical conductive winding. In one embodiment, the system is configured to receive energy and to generate an electrical signal in response to the receipt of the energy. In one embodiment, the system further comprises a mechanical transmission system configured to receive the energy. In one embodiment, the mechanical transmission system is coupled to the magnetic structure and configured to move the magnet structure with respect to the coil in response to the receipt of energy. In one embodiment, the mechanical transmission system is configured to move the magnetic structure in a linear manner. In one embodiment, the mechanical transmission system is configured to move the magnetic structure in a rotational manner. In one embodiment, the mechanical transmission system is configured to move the magnetic structure in a radial manner. In one embodiment, the mechanical transmission system is coupled to the coil and configured to move the coil with respect to the magnetic structure in response to the receipt of energy. In one embodiment, the coil is configured to receive an electrical signal and the system is configured to generate mechanical force in response to the receipt of the electrical signal. In one embodiment, the system further comprises a mechanical transmission system.

In one embodiment, a system comprises a coil comprising means for conducting an electric signal and means for focusing magnetic flux in the means for conducting an electrical signal, and a magnetic structure. In one embodiment, the means for focusing magnetic flux comprises a winding comprising a silver/nickel alloy. In one embodiment, the means for conducting an electrical signal comprises a stranded copper wire. In one embodiment, the coil further comprises a first insulating substrate and the means for conducting an electrical signal comprises an electrical conductive trace formed on the first insulating substrate. In one embodiment, the means for focusing magnetic flux comprises a magnetic conductive trace formed on the first insulating substrate. In one embodiment, the electrical conductive trace is formed on a first surface of the first insulating substrate and the magnetic conductive trace is formed on the first surface of the first insulating substrate. In one embodiment, the coil further comprises a plurality of insulating substrates, and the means for conducting an electric signal comprises a plurality of electrical conductive traces formed on selected substrates in the plurality of substrates and the means for focusing magnetic flux comprises a plurality of magnetic conductive traces formed on selected substrates in the plurality of substrates.

In one embodiment, a method for generating an electrical signal comprises causing relative movement between a magnetic structure and an electrical conductive winding and focusing magnetic flux generated by the magnetic structure in the electrical conductive winding using a magnetic conductive winding. In one embodiment, the method further comprises forming a closed loop with the magnetic conductive winding.

In one embodiment, a coil comprises a plurality of insulating substrates, a plurality of electrical conductive traces formed on a first set of selected substrates in the plurality of substrates and a plurality of magnetic conductive traces formed on a second set of selected substrates in the plurality of substrates. In one embodiment, the first set of selected substrates comprises every other insulating substrate in the plurality of insulating substrates and the plurality of electrical conductive traces consists of an electrical conductive trace formed on each of the plurality of insulating substrates in the first set of selected substrates. In one embodiment, the plurality of electrical conductive traces are electrically coupled in series. In one embodiment, the plurality of magnetic conductive traces are electrically coupled together to form a closed loop.

In one embodiment, a method of generating mechanical force comprises generating a magnetic field, focusing the magnetic field in an electrical conductive element and conducting a current through the electrical conductive element. In one embodiment, the current is an alternating current. In one embodiment, the method further comprises applying the mechanical force so as to generate a linear movement in a transmission system. In one embodiment, the method further comprises applying the mechanical force so as to generate a rotational movement in a transmission system. In one embodiment, the method further comprises applying the mechanical force so as to generate a radial movement in a transmission system. In one embodiment, the current is a direct current. In one embodiment, the electrical conductive element comprises layers of an electrical conductive winding and focusing the magnetic field in the electrical conductive winding comprises inserting a magnetic conductive winding between two layers of the electrical conductive winding. In one embodiment, the magnetic conductive winding forms a closed loop.

In one embodiment, a system comprises a first magnet housing, a first magnet secured within the first magnet housing and having a first pole of a first polarity and a second pole of a second polarity, and a second magnet having a first pole of the first polarity and a second pole of the second polarity, secured within the first magnet housing such that the first pole of the second magnet is held spaced apart a distance from and generally facing the first pole of the first magnet, so as to generate a compressed magnetic field. In one embodiment, the first magnet comprises a rare earth magnet. In one embodiment, the system further comprises a coil. In one embodiment, the system is configured to receive energy and to generate an electrical signal in response to the receipt of the energy. In one embodiment, the system is configured to receive an electrical signal and to generate mechanical force in response to the electrical signal. In one embodiment, the system further comprises a mechanical transmission system. In one embodiment, the mechanical transmission system is coupled to the first magnet housing and configured to move the first magnet housing with respect to the coil in response to the receipt of the energy. In one embodiment, the mechanical transmission system is configured to move the first magnet housing in a linear manner. In one embodiment, the mechanical transmission system is configured to rotate the first magnet housing. In one embodiment, the system further comprises a third magnet having a first pole of the first polarity and a second pole of the second polarity, secured within the first magnet housing such that the second pole of the third magnet is held spaced apart a distance from and generally facing the second pole of the first magnet, so as to generate a compressed magnetic field. In one embodiment, the coil is configured to pass between the first and second magnets as the first magnet housing is rotated. In one embodiment, the mechanical transmission system is coupled to the coil and configured to move the coil with respect to the first magnet housing in response to a receipt of energy. In one embodiment, the mechanical transmission system comprises a repelling magnet. In one embodiment, the mechanical transmission system comprises a mechanical repelling system. In one embodiment, the coil is configured to receive an electrical signal and the system is configured to move the first magnet housing with respect to the coil in response to the receipt of the electrical signal. In one embodiment, the system is configured to receive energy and to move the first magnet housing with respect to the coil in response to the receipt of the energy. In one embodiment, the system further comprises a second coil. In one embodiment, the coil has an axis that is at least generally aligned with an axis along which the first magnet housing is configured to move relative to the coil. In one embodiment, the system further comprises a second magnet housing, a third magnet secured within the second magnet housing and having a first pole of a first polarity and a second pole of a second polarity, and a fourth magnet having a first pole of the first polarity and a second pole of the second polarity, secured within the second magnet housing such that the first pole of the third magnet is held spaced apart a distance from and generally facing the first pole of the fourth magnet, so as to generate a compressed magnetic field. In one embodiment, the second magnet housing is substantially perpendicular to the first magnet housing. In one embodiment, the system further comprises a second coil. In one embodiment, the first magnet housing is gimbaled. In one embodiment, the electrical signal comprises a DC current. In one embodiment, the electrical signal comprises an AC current and the system further comprises rectification circuitry coupled to the coil and configured to convert the AC current to a DC current. In one embodiment, the system further comprises a power storage system coupled to the rectification circuitry for accumulating and storing power generated by the system. In one embodiment, the system further comprises an inverter coupled to the power storage system and configured to supply alternating current to an electricity distribution system. In one embodiment, the system is configured to convert energy from waves into an electrical signal.

In one embodiment, a magnetic structure comprises a magnet housing, a first magnet secured within the magnet housing, and having a first pole of a first polarity and a second pole of a second polarity, and a second magnet having a first pole of the first polarity and a second pole of the second polarity, secured within the magnet housing such that the first pole of the second magnet is held spaced apart a distance from and generally facing the first pole of the first magnet, so as to generate a compressed magnetic field. In one embodiment, the first magnet comprises a permanent magnet. In one embodiment, the first magnet comprises a rare earth magnet. In one embodiment, the first magnet comprises an electromagnet. In one embodiment, a space between the first and second magnets is substantially filled with a non-magnet substance. In one embodiment, the non-magnetic substance comprises air. In one embodiment, the non-magnetic substance comprises a fluoropolymer resin. In one embodiment, the magnetic structure further comprises a third magnet having a first pole of the first polarity and a second pole of the second polarity, secured within the magnet housing such that the second pole of the third magnet is held spaced apart a distance from and generally facing the second pole of the first magnet, so as to generate a compressed magnetic field. In one embodiment, the first polarity is a north polarity. In one embodiment, a face of the first pole of the first magnet is at least generally planar. In one embodiment, a face of the first pole of the second magnet is at least generally planar. In one embodiment, a face of the first pole of the first magnet is at least generally convex. In one embodiment, a face of the first pole of the first magnet is at least generally concave. In one embodiment, the first magnet is generally rectangular. In one embodiment, the first magnet is generally spherical. In one embodiment, the magnetic structure further comprises a suspension system. In one embodiment, the suspension system is gimbaled. In one embodiment, gravitational forces are used to position the magnetic structure within the suspension system. In one embodiment, the suspension system is configured to employ gyroscopic principles to position the magnetic structure. In one embodiment, the magnet housing is evacuated and hermetically sealed.

In one embodiment, a magnetic structure comprises a plurality of magnets and means for holding the magnets spaced apart with respect to each other and configured so as to generate a compressed magnetic field. In one embodiment, the means for holding the magnets comprises a magnet housing having a threaded inner surface. In one embodiment, the means for holding the magnets comprises tabs configured to hold the plurality of magnets in fixed positions with respect to each other. In one embodiment, the magnetic structure further comprises means for transmitting mechanical energy coupled to the means for holding the magnets.

In one embodiment, a method of generating power comprises generating a compressed magnetic field using a plurality of spaced-apart magnets and causing relative movement between an electrical conductive winding and the compressed magnetic field. In one embodiment, generating the compressed magnetic field comprises holding the plurality of magnets spaced apart in a fixed position with respect to each other such that like poles of the magnets face each other so as to generate the compressed magnetic field. In one embodiment, the plurality of magnets consists of two magnets and a distance between the two magnets is less than an ambient distance. In one embodiment, the method further comprises rectifying a current generated in the electrical conductive winding. In one embodiment, the method further comprises storing the rectified current in an energy storage system. In one embodiment, causing relative movement comprises moving the electrical conductive winding with respect to the plurality of magnets. In one embodiment, causing relative movement comprises moving the plurality of magnets with respect to the electrical conductive winding. In one embodiment, moving the plurality of magnets with respect to the electrical conductive winding comprises moving the plurality of magnets along a generally linear path. In one embodiment, moving the plurality of magnets with respect to the electrical conductive winding comprises moving the plurality of magnets along a generally radial path. In one embodiment, moving the plurality of magnets with respect to the electrical conductive winding comprises rotating the plurality of magnets. In one embodiment, the method further comprises optimizing a gradient of the compressed magnetic field.

In one embodiment, a method of generating mechanical force comprises generating a compressed magnetic field and conducting a current through an electrical conductive winding in the compressed magnetic field. In one embodiment, generating the compressed magnetic field comprises holding a plurality of magnets spaced apart in a fixed position with respect to each other such that like poles of the magnets face each other so as to generate the compressed magnetic field. In one embodiment, the plurality of magnets consists of two magnets and a distance between the two magnets is less than an ambient distance. In one embodiment, the current is an alternating current. In one embodiment, the current is a direct current. In one embodiment, the method further comprises applying the mechanical force so as to cause a generally linear movement in a transmission system. In one embodiment, the method further comprises applying the mechanical force so as to cause a generally rotational movement in a transmission system.

In one embodiment, a system comprises a coil having an electrical conductive winding and a magnetic conductive winding configured to focus magnetic flux in the electrical conductive winding, and a magnetic structure configured to generate a compressed magnetic field. In one embodiment, the magnetic structure comprises a first magnet housing, a first magnet secured within the first magnet housing, and having a first pole of a first polarity and a second pole of a second polarity, and a second magnet having a first pole of the first polarity and a second pole of the second polarity, secured within the first magnet housing such that the first pole of the second magnet is held spaced apart a distance from and generally facing the first pole of the first magnet, so as to generate the compressed magnetic field. In one embodiment, the system is configured to receive energy and to generate an electrical signal in response to the receipt of the energy. In one embodiment, the electrical signal comprises an AC current and the system further comprises rectification circuitry coupled to the coil and configured to convert the AC current to a DC current. In one embodiment, the electrical signal comprises a DC current. In one embodiment, the system is configured to receive an electrical signal and to generate mechanical force in response to the electrical signal. In one embodiment, the system further comprises a mechanical transmission system. In one embodiment, the mechanical transmission system is coupled to the magnetic structure and configured to move the magnetic structure with respect to the coil in response to a receipt of energy. In one embodiment, the mechanical transmission system is configured to move the magnetic structure in a linear manner. In one embodiment, the mechanical transmission system is configured to rotate the magnetic structure. In one embodiment, the mechanical transmission system is configured to move the magnetic structure along a radial path. In one embodiment, the mechanical transmission system is coupled to the coil and configured to move the coil with respect to the magnetic structure in response to a receipt of energy. In one embodiment, the coil is configured to receive an electrical signal and the system is configured to move the magnetic structure with respect to the coil in response to the receipt of the electrical signal. In one embodiment, the system is configured to receive energy and to move the magnetic structure with respect to the coil in response to the receipt of the energy. In one embodiment, the system is configured to receive energy and to move the coil with respect to the magnetic structure in response to the receipt of the energy. In one embodiment, the coil has an axis that is at least generally aligned with an axis along which the magnetic structure is configured to move relative to the coil. In one embodiment, the system further comprises a gimbaled suspension system. In one embodiment, the system is configured to convert energy from waves into an electrical signal. In one embodiment, the magnetic conductive winding is configured as a closed loop. In one embodiment, the system further comprises an article of clothing configured for coupling the system to a person. In one embodiment, the system further comprises a coupler configured to couple the coil to an electrical transmission grid.

In one embodiment, a method of generating power comprises generating a compressed magnetic field using a plurality of spaced-apart magnets, moving an electrical conductive winding with respect to the compressed magnetic field, and focusing magnetic flux in the electrical conductive winding using a magnetic conductive winding. In one embodiment, generating the compressed magnetic field comprises holding the plurality of magnets spaced apart in a fixed position with respect to each other such that like poles of the magnets face each other so as to generate the compressed magnetic field. In one embodiment, the plurality of magnets consists of two magnets and a distance between the two magnets is less than an ambient distance. In one embodiment, the method further comprises rectifying a current generated in the electrical conductive winding. In one embodiment, the method further comprises storing the rectified current in an energy storage system. In one embodiment, moving the electrical conductive winding with respect to the compressed magnetic field comprises moving the electrical conductive winding with respect to the plurality of magnets. In one embodiment, moving the electrical conductive winding with respect to the compressed magnetic field comprises moving the plurality of magnets with respect to the electrical conductive winding. In one embodiment, moving the plurality of magnets with respect to the electrical conductive winding comprises moving the plurality of magnets along a generally linear path. In one embodiment, moving the plurality of magnets with respect to the electrical conductive winding comprises rotating the plurality of magnets. In one embodiment, the method further comprises optimizing a gradient of the compressed magnetic field. In one embodiment, the magnetic conductive winding forms a closed loop. In one embodiment, the method further comprises coupling the electrical conductive winding to an electrical transmission grid. In one embodiment, the method further comprises generating an alternating current in the electrical conductive winding. In one embodiment, the method further comprises generating a direct current in the electrical conductive winding.

In one embodiment, a method of generating mechanical force comprises generating a compressed magnetic field, focusing magnetic flux in an electrical conductive winding using a magnetic conductive winding, and conducting a current through the electrical conductive winding in the compressed magnetic field. In one embodiment, generating the compressed magnetic field comprises holding a plurality of magnets spaced apart in a fixed position with respect to each other such that like poles of the magnets face each other so as to generate the compressed magnetic field. In one embodiment, the plurality of magnets consists of two magnets and a distance between the two magnets is less than an ambient distance. In one embodiment, the current is an alternating current. In one embodiment, the current is a direct current. In one embodiment, the method further comprises applying the mechanical force so as to cause a generally linear movement in a transmission system. In one embodiment, the method further comprises applying the mechanical force so as to cause a generally rotational movement in a transmission system. In one embodiment, the magnetic conductive winding forms a closed loop.

In one embodiment, an article of clothing comprises a coil having an electrical conductive winding and a magnetic conductive winding configured to focus magnetic flux in the electrical conductive winding, and a magnetic structure configured to generate a compressed magnetic field. In one embodiment, the magnetic structure comprises a first magnet housing, a first magnet secured within the first magnet housing, and having a first pole of a first polarity and a second pole of a second polarity, and a second magnet having a first pole of the first polarity and a second pole of the second polarity, secured within the first magnet housing such that the first pole of the second magnet is held spaced apart a distance from and generally facing the first pole of the first magnet, so as to generate the compressed magnetic field. In one embodiment, the magnetic conductive winding forms a closed loop. In one embodiment, the magnetic structure and the coil are contained within a battery case.

In one embodiment, a system comprises a coil comprising means for conducting an electrical current in response to changes in magnetic flux and means for focusing magnetic flux in the means for conducting the electrical current, and means for generating a compressed magnetic field. In one embodiment, the means for conducting the electrical current comprises an electrical conductive winding and the means for focusing magnetic flux comprises a magnetic conductive winding. In one embodiment, the magnetic conductive winding forms a closed loop. In one embodiment, the means for generating the compressed magnetic field comprises a first magnet housing, a first magnet secured within the first magnet housing, and having a first pole of a first polarity and a second pole of a second polarity, and a second magnet having a first pole of the first polarity and a second pole of the second polarity, secured within the first magnet housing such that the first pole of the second magnet is held spaced apart a distance from and generally facing the first pole of the first magnet, so as to generate the compressed magnetic field.

In one embodiment, a battery comprises a case, a first generator contained within the case and configured to convert energy received by the battery into electrical energy, a first energy storage device contained within the case, a second energy storage device contained within the case, a control module contained within the case, coupled to the first and second energy storage devices, and configured to control a transfer of the electrical energy from the first energy storage device to the second energy storage device, and a plurality of contact terminals. In one embodiment, the first energy storage device comprises an ultracapacitor and the second energy storage device comprises a lithium cell. In one embodiment, the battery further comprises a third energy storage device. In one embodiment, the third energy storage device is coupled in series with the second energy storage device. In one embodiment, the third energy storage device is coupled in parallel with the first energy storage device. In one embodiment, the battery further comprises a connector to house the plurality of contact terminals. In one embodiment, the case and contact terminals have a configuration of a C-cell battery. In one embodiment, the first generator comprises a coil and a magnetic structure. In one embodiment, the magnetic structure is configured to generate a compressed magnetic field. In one embodiment, the coil comprises an electrical conductive element, and a magnetic conductive element. In one embodiment, the magnetic structure is configured to generate a compressed magnetic field. In one embodiment, the plurality of contact terminals are electrically coupled to the control module. In one embodiment, the battery further comprises a second generator contained within the case, wherein the first generator is oriented in a first direction and the second generator is oriented in a second direction different from the first direction. In one embodiment, the control module is further configured to control a transfer of energy between the second energy storage device and the contact terminals. In one embodiment, the transfer of energy between the first energy storage device and the contact terminals comprises a transfer of energy from the contact terminals to the second energy storage device. In one embodiment, the transfer of energy between the first energy storage device and the contact terminals comprises a transfer of energy from the contact terminals to the first energy storage device. In one embodiment, the control module is further configured to control a transfer of energy between the first energy storage device and the contact terminals. In one embodiment, the battery further comprises a suspension system coupled to the generator. In one embodiment, the suspension system is tuned to optimize conversion of expected patterns of movement into electrical energy. In one embodiment, the suspension system is gimbaled. In one embodiment, the suspension system comprises a gyroscopic system. In one embodiment, the generator is configured to convert energy received through movement of the battery. In one embodiment, the generator is configured to convert energy received in a parasitic manner. In one embodiment, the case comprises a magnetic shield.

In one embodiment, a battery comprises a case, a coil contained within the case, a magnetic structure contained within the case and configured to generate a compressed magnetic field, a first energy storage device contained within the case, a plurality of contact terminals coupled to the case, and a control module contained within the case and coupled to the coil and the first energy storage device. In one embodiment, the magnetic structure comprises a plurality of spaced-apart rare earth magnets configured so that like-polarity poles face each other in neighboring magnets in the plurality of rare earth magnets. In one embodiment, the magnets in the plurality of magnets are held in position with respect to one another. In one embodiment, a space between two magnets in the plurality of magnets is substantially filled with a non-magnet substance. In one embodiment, the non-magnetic substance comprises air. In one embodiment, the non-magnetic substance comprises a fluoropolymer resin. In one embodiment, the case is evacuated and hermetically sealed. In one embodiment, the battery further comprises a suspension system coupled to the magnetic structure. In one embodiment, the suspension system is tuned to optimize conversion of expected patterns of movement into electrical energy. In one embodiment, the coil comprises an electrical conductive element and a magnetic conductive element. In one embodiment, the magnetic conductive element is configured to focus magnetic flux in the electrical conductive element.

In one embodiment, a battery comprises a case, a coil contained within the case and having an electrical conductive element and a magnetic conductive element, a magnetic structure, a first energy storage device contained within the case, a plurality of contact terminals coupled to the case and a control module contained within the case and coupled to the coil and the first energy storage device. In one embodiment, the magnetic conductive element is configured to focus magnetic flux in the electrical conductive element. In one embodiment, the electrical conductive element comprises a electrical conductive wire in a multi-wire winding and the magnetic conductive element comprises a magnetic conductive wire in the multi-wire winding. In one embodiment, the electrical conductive element comprises an electrical conductive winding and the magnetic conductive element comprises a magnetic conductive winding. In one embodiment, the electrical conductive element comprises an electrical conductive trace formed on a first insulating substrate. In one embodiment, the magnetic conductive element comprises a magnetic conductive trace formed on the first insulating substrate. In one embodiment, the electrical conductive trace is formed on a first surface of the first insulating substrate and the magnetic conductive trace is formed on the first surface of the first insulating substrate. In one embodiment, the battery further comprises a plurality of insulating substrates, wherein the electrical conductive element comprises a plurality of electrical conductive traces formed on selected substrates in the plurality of substrates and the magnetic conductive element comprises a plurality of magnetic conductive traces formed on selected substrates in the plurality of substrates. In one embodiment, the magnetic structure is configured to generate a compressed magnetic field. In one embodiment, a contact terminal of the plurality of contact terminals is electrically coupled to a contact terminal of an external battery. In one embodiment, the battery has a first physical orientation and the external battery has a second physical orientation different from the first physical orientation.

In one embodiment, a battery comprises a case, means for converting movement of the battery into an electric current, first means for storing energy contained within the case, second means for storing energy contained within the case, means for controlling a transfer of energy from the means for converting movement to the first means for storing energy contained within the case, and means for accessing energy stored in the first means for storing energy. In one embodiment, the battery further comprises third means for storing energy contained within the case. In one embodiment, the means for converting movement comprises means for conducting an electric current and means for generating a magnetic field. In one embodiment, the means for generating a magnetic field is configured to generate a compressed magnetic field. In one embodiment, the battery further comprises means for conducting magnetic flux. In one embodiment, the battery further comprises means for facilitating relative movement of the means for conducting an electric current with respect to the means for generating a magnetic field.

In one embodiment, a method of operating a battery comprises moving the battery, converting energy received through the movement of the battery into an electric current, and controlling transfers of energy to a plurality of energy storage devices contained within the battery. In one embodiment, controlling transfers of energy comprises storing energy from the electric current in a first energy storage device in the plurality of energy storage devices and controlling a transfer of energy from the first energy storage device to a second energy storage device in the plurality of energy storage devices. In one embodiment, controlling transfers of energy comprises rectifying the electric current. In one embodiment, the method further comprises controlling a transfer of energy from the battery to a load. In one embodiment, the method further comprises providing an electric current to the battery and controlling a storage in the battery of energy from the provided electric current. In one embodiment, converting energy received through the movement of the battery into the electric current comprises generating a compressed magnetic field. In one embodiment, converting energy received through the movement of the battery into the electric current further comprises focusing the compressed magnetic field in an electrical conductive winding. In one embodiment, generating the compressed magnetic field comprises holding two magnets spaced-apart with like poles facing each other at a distance closer than an ambient distance. In one embodiment, converting energy received through the movement of the battery into the electric current comprises focusing a magnetic field in an electrical conductive element. In one embodiment, focusing the magnetic field in the electrical conductive element comprises positioning a magnetic conductive element with respect to the electrical conductive element so as to focus the magnetic field. In one embodiment, converting energy received through the movement of the battery into the electric current comprises orienting a generator contained within the battery. In one embodiment, converting the energy received through the movement of the battery into the electric current comprises converting the energy into relative movement between an electrical conductive winding and a magnetic field. In one embodiment, the relative movement is generally linear. In one embodiment, the relative movement is generally rotational.

In one embodiment, a system comprises a first battery having a first orientation and comprising means for converting energy into a first electrical signal, and a second battery electrically coupled to the first battery and having a second orientation, and comprising second means for converting energy into a second electrical signal. In one embodiment, the second orientation is substantially perpendicular to the first orientation. In one embodiment, the means for converting energy into the first electrical signal comprises a control module configured to control a transfer of electrical energy from a first energy storage device to a second energy storage device. In one embodiment, the means for converting energy into the first electrical signal comprises means for generating a compressed magnetic field. In one embodiment, the means for converting energy into the first electrical signal comprises an electrical conductive winding and a magnetic conductive winding configured to focus magnetic flux in the electrical conductive winding.

BRIEF DESCRIPTION OF THE SEVERAL VIEWS OF THE DRAWINGS

The patent or application file contains at least one drawing executed in color. Copies of the patent or patent application publication with color drawings will be provided by the Office upon request and payment of the necessary fee.

The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not necessarily intended to convey any information regarding the actual shape of particular elements, and have been selected solely for ease of recognition in the drawings.

DETAILED DESCRIPTION OF THE INVENTION

In the following description, certain details are set forth in order to provide a thorough understanding of various embodiments of devices, methods and articles. However, one of skill in the art will understand that other embodiments may be practiced without these details. In other instances, well-known structures and methods associated with batteries, linear generators, and control systems have not been shown or described in detail to avoid unnecessarily obscuring descriptions of the embodiments.

Unless the context requires otherwise, throughout the specification and claims which follow, the word "comprise" and variations thereof, such as "comprising," and "comprises," are to be construed in an open, inclusive sense, that is as "including, but not limited to."

Reference throughout this specification to "one embodiment," or "an embodiment" means that a particular feature, structure or characteristic described in connection with the embodiment is included in at least one embodiment. Thus, the appearances of the phrases "in one embodiment," or "in an embodiment" in various places throughout this specification are not necessarily referring to the same embodiment, or to all embodiments. Furthermore, the particular features, structures, or characteristics may be combined in any suitable manner in one or more embodiments to obtain further embodiments.

The headings are provided for convenience only, and do not interpret the scope or meaning of this disclosure or the claimed invention.

Figure 1:
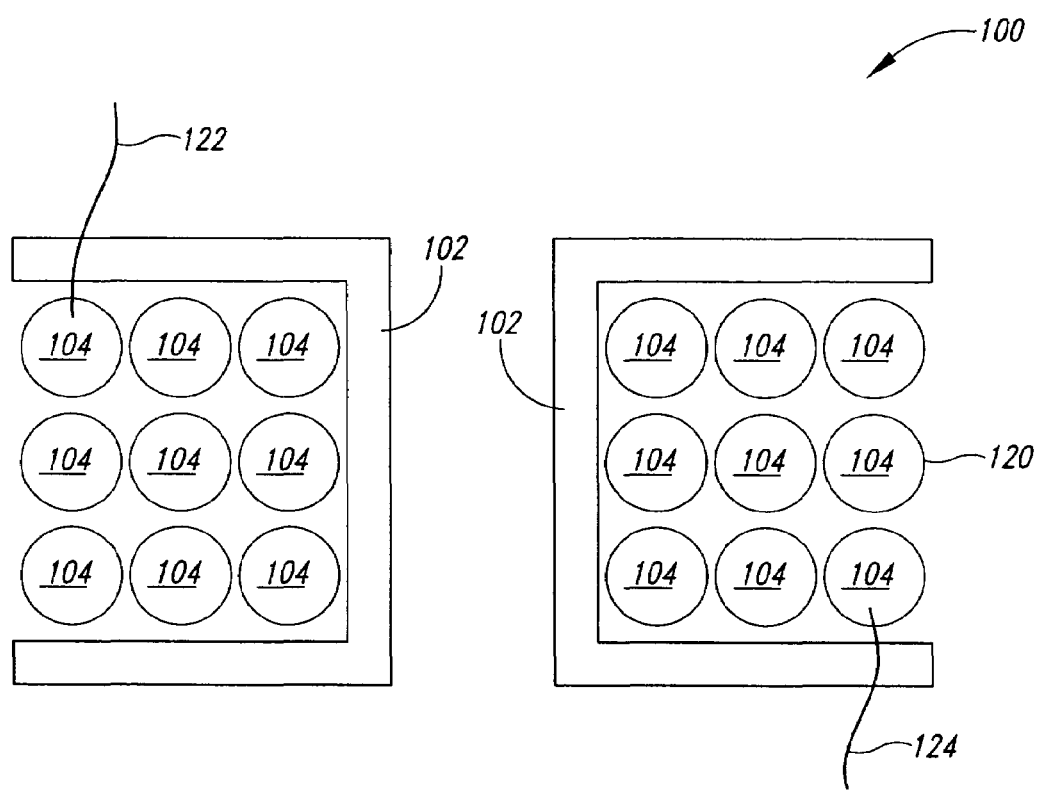
FIG. 1 is a diametric cross-sectional view of a conventional coil.

FIG. 1 is a diametric cross sectional view of a conventional coil 100. The coil 100 comprises a non-magnetic winding form 102 and a non-magnetic, electrical conductive winding 104. A winding comprises one or more complete turns of a conductive materials in a coil, and may comprise one or more layers. As illustrated, the winding 104 comprises nine turns and three layers. As illustrated, the electrical conductive winding 104 is continuous. In other conventional coils, a plurality of electrical conductive windings may be employed, which may or may not be electrically connected in series or in parallel. The electrical conductive winding 104 may comprise any suitable electrically conductive material, such as, for example, metallic materials, such as copper, copper coated with silver or tin, aluminum, silver, gold and/or alloys. The electrical conductive winding 104 may comprise, for example, solid wires, including, for example, flat wires, strands, twisted strands, or sheets. The electrical conductive winding 104 may vary significantly in size from the illustration, and may be substantially smaller or substantially larger than illustrated. The electrical conductive winding 104 is typically covered with an insulating material 120. The electrical conductive winding 104 is coupled to the leads 122, 124 for the coil 100.

Figure 2:
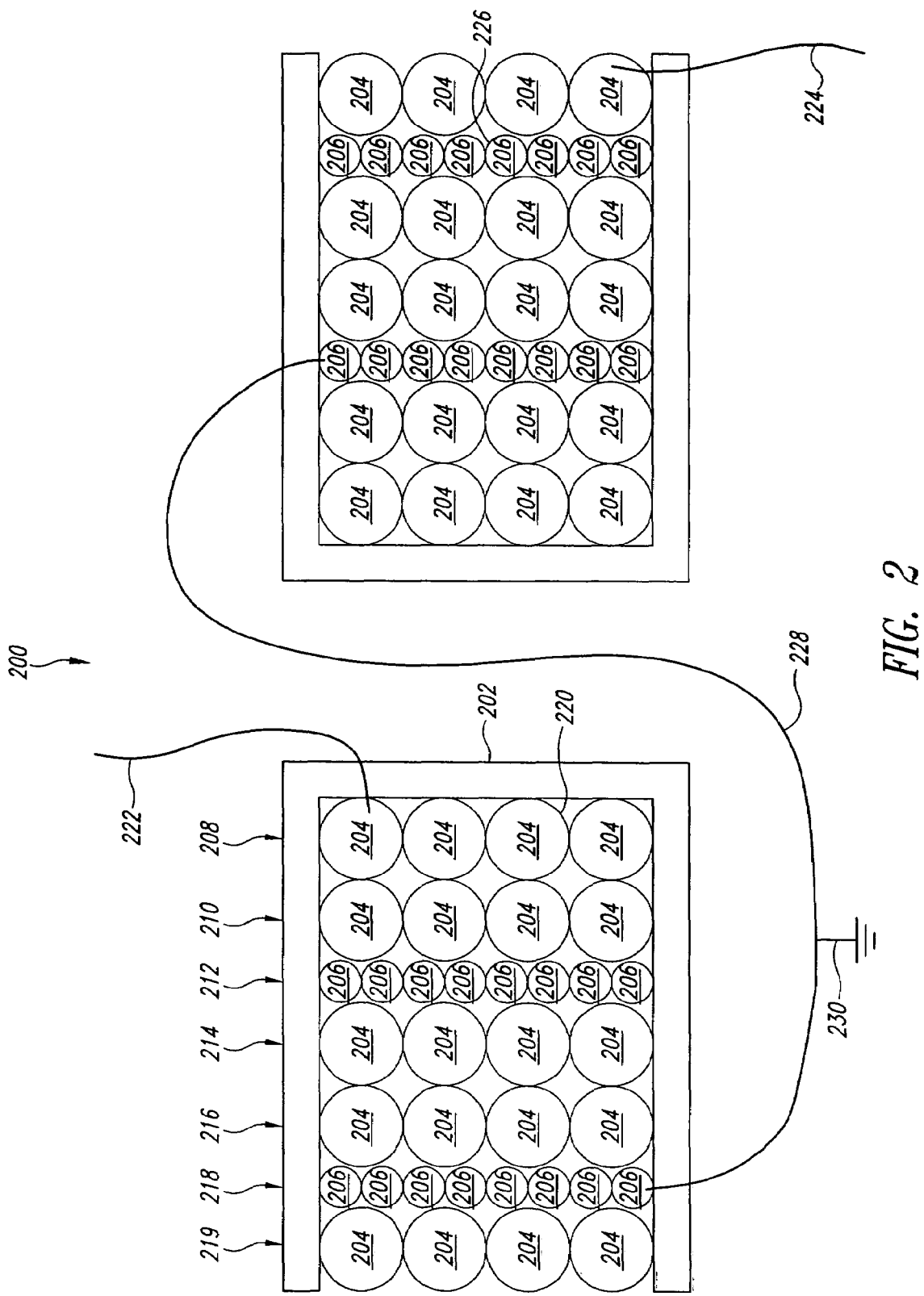
FIG. 2 is a diametric cross-sectional view of an embodiment of a coil in accordance with the present disclosure.

FIG. 2 is a diametric cross-sectional view of an embodiment of a bi-metal coil 200. The coil 200 comprises a non-magnetic winding form 202, a non-magnetic, electrical conductive winding 204 and a magnetic conductive winding 206. The use of an electrical conductive winding, such as the electrical conductive winding 204, with a magnetic conductive winding, such as the magnetic conductive winding 206, facilitates focusing of a magnetic field passing through or generated by an electrical conductive winding of a coil, such as the winding 204 of the coil 200. Focusing of the magnetic field can significantly increase the efficiency of the coil 200. For example, when the coil 200 is employed in a generator, as a magnet is passed through the coil 200 the electrical conductive winding 204 produces electron flow, while the magnetic conductive winding 206 focuses magnetic flux in the electrical conductive winding 204 and causes an increase in power output from the coil 200.

A first layer 208 and a second layer 210 of the electrical conductive winding 204 are wound onto the winding form 202. In one embodiment, the electrical conductive winding 204 is continuous. In other embodiments, the electrical conductive winding 204 may comprise a plurality of windings, which may be electrically connected in series or in parallel. A first layer 212 of the magnetic conductive winding 206 is wound over the second layer 210 of the electrical conductive winding 204. A third layer 214 and a fourth layer 216 of the electrical conductive winding 204 are wound over the first layer 212 of the magnetic conductive winding 206. A second layer 218 of the magnetic conductive winding 206 is wound over the fourth layer 216 of the electrical conductive winding 204. A fifth layer 219 of the electrical conductive winding 204 is wound over the second layer 218 of the magnetic conductive winding 206.

The electrical conductive winding 204 may comprise any suitable electrically conductive material, such as, for example, metallic materials, such as copper, copper coated with silver or tin, aluminum, silver, gold and/or alloys. The electrical conductive winding 204 may comprise, for example, solid wires, strands, twisted strands, or sheets. The electrical conductive winding 204 may vary significantly in size from the illustration, and may be substantially smaller or substantially larger than illustrated. The electrical conductive winding 204 is typically covered with an insulating material 220. The electrical conductive winding 204 is coupled to the leads 222, 224 for the coil 200.

The magnetic conductive winding 206 may comprise any suitable magnetic conductive material, for example, a magnetic shielding material, such as, for example, nickel, nickel/iron alloys, nickel/tin alloys, nickel/silver alloys, plastic magnetic shielding, and/or nickel/iron/copper/molybdenum alloys. Magnetic shielding materials are commercially available under several trademarks, including MuMetal®, Hipernom®, HyMu 80®, and Permalloy®. The magnetic conductive winding 206 may comprise, for example, solid wires, strands, twisted strands, or sheets. The magnetic conductive winding 206 may vary significantly in size from the illustration, and may be substantially smaller or substantially larger than illustrated. The magnetic conductive winding 206 is typically covered with an insulating material 226. The magnetic conductive winding 206 forms a closed loop, as illustrated by the connection 228, and as illustrated is connected to a ground 230.

Other configurations of layers of an electrical conductive winding and a magnetic conductive winding may be employed. For example, m layers of an electrical conductive winding may alternate with n layers of a magnetic conductive winding, instead of two layers of electrical conductive winding alternating with one layer of magnetic conductive winding as illustrated, with m and n positive integers. In another example, m and n need not remain constant. For example, the number of layers may increase or decrease. An example layer pattern would be 2E, 1M, 3E, 2M, 4E, with E indicating electrically conductive layers and M indicating magnetically conductive layers.

Typically, the first and last layers comprise layers of the electrical conductive winding 204. In one experimental embodiment, a configuration with the first and last layer comprising the electrical conductive winding 204 produced better performance in a generator application than when the last layer was comprised of the magnetic conductive winding 206. In another example, a plurality of electrical conductive windings could be employed.

Figure 3:
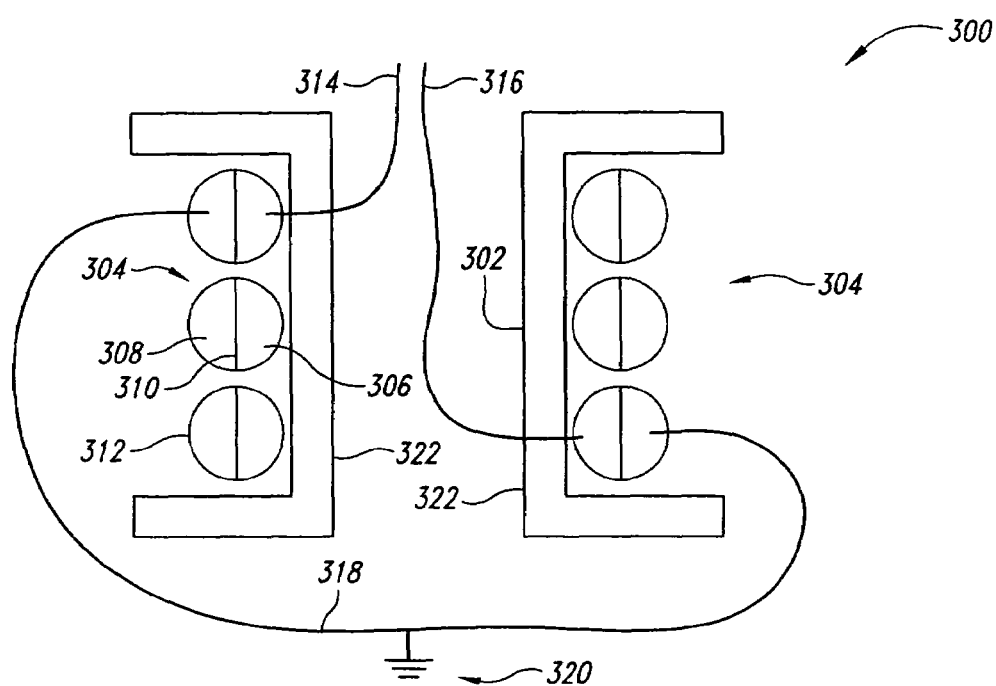
FIG. 3 is a diametric cross-sectional view of another embodiment of a coil in accordance with the present disclosure.

FIG. 3 is a diametric cross-sectional view of another embodiment of a bi-metal coil 300. The coil 300 comprises a winding form 302 and a dual-conductor winding, which as illustrated takes the form of a bi-metal winding 304. The dual-conductor winding 304 comprises an electrical conductive winding in the form of a wire 306, a magnetic conductive winding in the form of a wire 308, an inner layer of insulating material 310 between the electrical conductive wire 306 and the magnetic conductive wire 308, and an outer layer of insulating material 312. The outer layer of insulating material 312 and the inner layer of insulating material 310 may be integrated. The dual-conductor winding 304 may vary significantly in size from the illustration, and may be substantially smaller or substantially larger than illustrated. As illustrated, the electrical conductive wire 306 and the magnetic conductive wire 308 are approximately the same size. In some embodiments, the electrical conductive wire 306 and the magnetic conductive wire 308 may be of different sizes.

The electrical conductive wire 306 may comprise any suitable electrical conductive material. For example, the materials and configurations (e.g., solid wire or stranded wire) discussed above with respect to the electrical conductive winding 204 of FIG. 2 may be employed. The electrical conductive wire 306 is coupled to the leads 314, 316 for the coil 300. The magnetic conductive wire 308 may comprise any suitable magnetic conductive material. For example, the materials and configurations (e.g., solid wire or stranded wire) discussed above with respect to the magnetic conductive winding 206 of FIG. 2 may be employed. The magnetic conductive wire 308 forms a closed loop, as illustrated by the connection 318, and may be connected to a ground 320. As illustrated, the winding 304 is wound so that the electrical conductive wire 306 is closest to an inner surface 322 of the winding form 302 and the magnetic conductive wire 308 is farthest from the inner surface 322 of the winding form 302. As illustrated, the insulating layer 310 separating the electrical conductive wire 306 and the magnetic conductive wire 308 is approximately parallel to the inner surface 322. In some embodiments, the insulating layer 310 separating the electrical conductive wire 306 and the magnetic conductive wire 308 may be at another angle with respect to the inner surface 322. For example, in some embodiments the insulating layer 310 may be approximately perpendicular to the inner surface 322. As illustrated, the dual-conductor winding 304 is a single layer comprising three turns. In some embodiments, the winding may comprise multiple layers. In some embodiments, additional windings may be employed.

Figure 4:
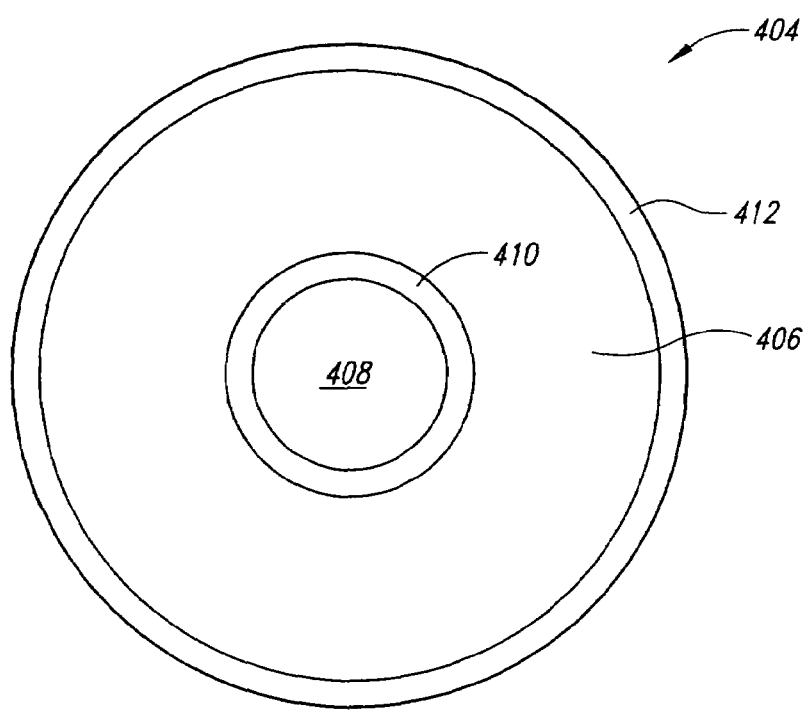
FIG. 4 is a diametric cross-sectional view of an embodiment of a dual conductor winding suitable for use in the embodiment of a coil illustrated in FIG. 3.

FIG. 4 is a diametric cross sectional view of an embodiment of a dual conductor winding 404 suitable for use in the embodiment of a coil 300 illustrated in FIG. 3. The dual conductor winding 404 comprises an electrical conductive winding in the form of a wire 406, a magnetic conductive winding in the form of a wire 408, an inner layer of insulating material 410 between the electrical conductive wire 406 and the magnetic conductive wire 408, and an outer layer of insulating material 412. The electrical conductive wire 406 may comprise any suitable electrical conductive material. For example, the materials and configurations (e.g., solid wire or stranded wire) discussed above with respect to the electrical conductive winding 204 of FIG. 2 may be employed. The electrical conductive wire 406 may vary significantly in size from the illustration, and may be substantially smaller or substantially larger than illustrated. The magnetic conductive wire 408 may comprise any suitable magnetic conductive material. For example, the materials and configurations (e.g., solid wire or stranded wire) discussed above with respect to the magnetic conductive winding 206 of FIG. 2 may be employed. The magnetic conductive wire 408 may vary significantly in size from the illustration, and may be substantially smaller or substantially larger than illustrated.

Figure 5:
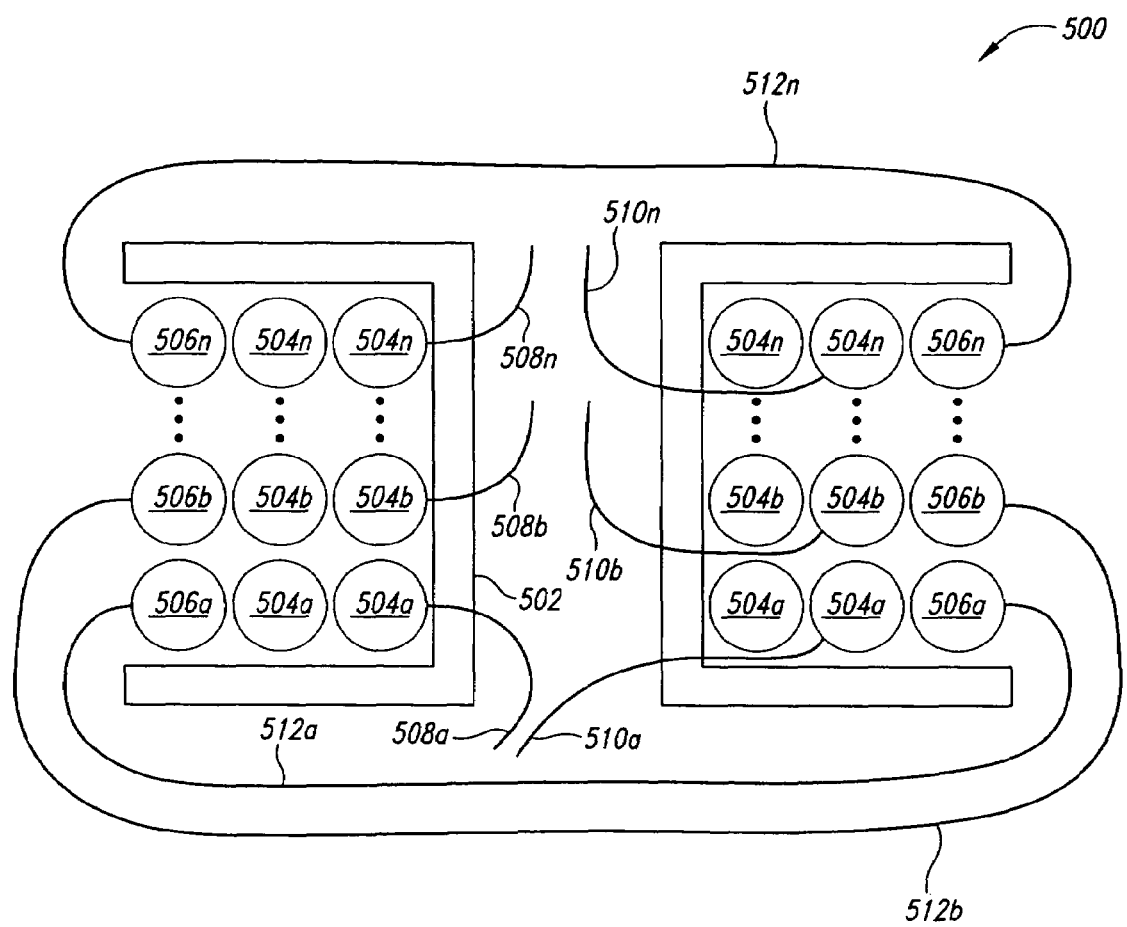
FIG. 5 is a diametric cross-sectional view of another embodiment of a coil in accordance with the present disclosure.

FIG. 5 is a diametric cross-sectional view of another embodiment of a bi-metal coil 500. The coil 500 has a winding form 502. A first electrical conductive winding 504a is wound on the winding form 502 in two layers. A first magnetic conductive winding 506a is wound on the winding form 502 outside of the two layers of the first electrical conductive winding 504a. The first electrical conductive winding 504a is coupled to leads 508a, 510a for the first electrical conductive winding 504a. The first magnetic conductive winding 506a forms a closed loop, as illustrated by the first connection loop 512a. A second electrical conductive winding 504b is wound on the winding form 502 in two layers adjacent to the first electrical conductive winding 504a. A second magnetic conductive winding 506b is wound on the winding form 502 outside of the two layers of the second electrical conductive winding 504b adjacent to the first magnetic conductive winding 506a. The second electrical conductive winding 504b is coupled to leads 508b, 510b for the second electrical conductive winding 504b. The second magnetic conductive winding 506b forms a closed loop, as illustrated by the second connection loop 512b. Additional windings may be added to the coil 500, as illustrated by the electrical conductive winding 504n, which is coupled to the leads 508n, 510n, and by the magnetic conductive winding 506n, which forms a closed loop as indicated by connection 512n. In some embodiments, the electrical conductive windings (e.g., windings 504a, 504b, . . . 504n) may be electrically coupled together in parallel or in series, or in various combinations thereof.

The electrical conductive windings 504a, 504b, . . . 504n may comprise any suitable electrical conductive material. For example, the materials and configurations (e.g., solid wire or stranded wire) discussed above with respect to the electrical conductive winding 204 of FIG. 2 may be employed. The electrical conductive windings 504a, 504b, . . . 504n may vary significantly in size from the illustration, and may be substantially smaller or substantially larger than illustrated. The magnetic conductive windings 506a, 506b, . . . 506n may comprise any suitable magnetic conductive material. For example, the materials and configurations (e.g., solid wire or stranded wire) discussed above with respect to the magnetic conductive winding 206 of FIG. 2 may be employed. The magnetic conductive windings 506a, 506b, . . . 506n may vary significantly in size from the illustration, and may be substantially smaller or substantially larger than illustrated. A bi-metal winding may be employed, such as the bi-metal winding 304 illustrated in FIG. 3 or the bi-metal winding 404 illustrated in FIG. 4. Typically, the coil 500 would have additional layers of each winding, with the outer layer comprising a layer of the electrical conductive winding (e.g., winding 504a), but for ease of illustration the additional layers are omitted.

Figure 6:
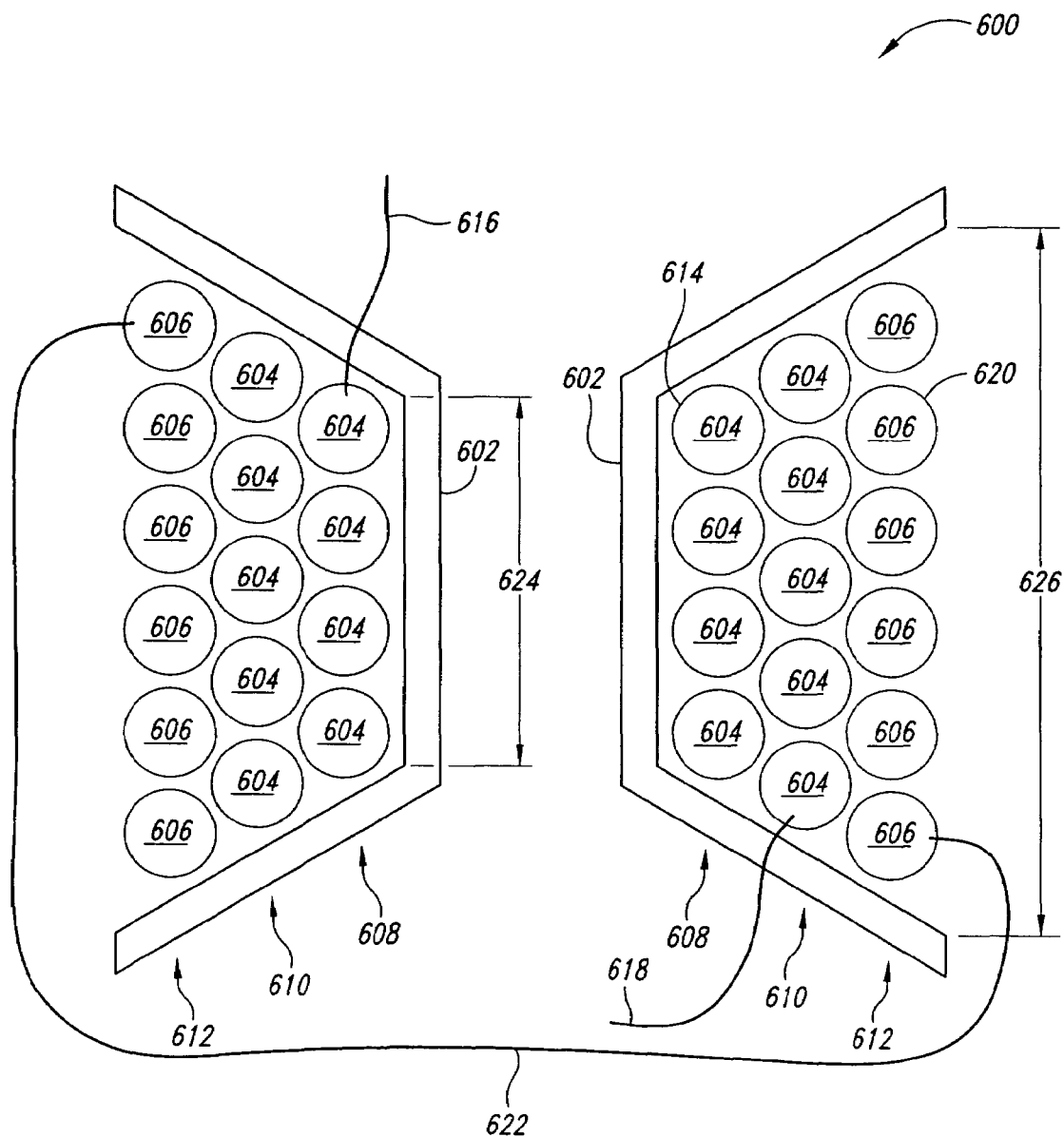
FIG. 6 is a diametric cross-sectional view of another embodiment of a coil in accordance with the present disclosure.

FIG. 6 is a diametric cross-sectional view of another embodiment of a bi-metal coil 600. The coil 600 comprises a non-magnetic winding form 602, a non-magnetic, electrical conductive winding 604 and a magnetic conductive winding 606. A first layer 608 and a second layer 610 of the electrical conductive winding 604 are wound onto the winding form 602. A layer 612 of the magnetic conductive winding 606 is wound over the second layer 610 of the electrical conductive winding 604.

The electrical conductive winding 604 may comprise any suitable electrical conductive material and configuration. For example, the materials and configurations (e.g., solid wire or stranded wire) discussed above with respect the electrical conductive winding 204 of FIG. 2 may be employed. The electrical conductive winding 604 is typically covered with an insulating material 614. The electrical conductive winding 604 is coupled to the leads 616, 618 for the coil 600. The magnetic conductive winding 606 may comprise any suitable magnetic conductive material and configuration. For example, the materials and configurations (e.g., solid wire or stranded wire) discussed above with respect to the magnetic conductive winding 206 of FIG. 2 may be employed. The magnetic conductive winding 606 is typically covered with an insulating material 620. The magnetic conductive winding 606 forms a closed loop, as illustrated by the connection 622, and may be connected to a ground (See ground 230 in FIG. 2). Some embodiments may employ a bi-metal or dual-conducting winding (see dual-conductor winding 304 illustrated in FIG. 3).

The winding form 602 has an inner length 624 and an outer length 626 that are different. As illustrated, the inner length 624 is shorter than the outer length 626. This difference in length facilitates focusing of a magnetic field in the electrical conductive winding 604.

Figure 7:
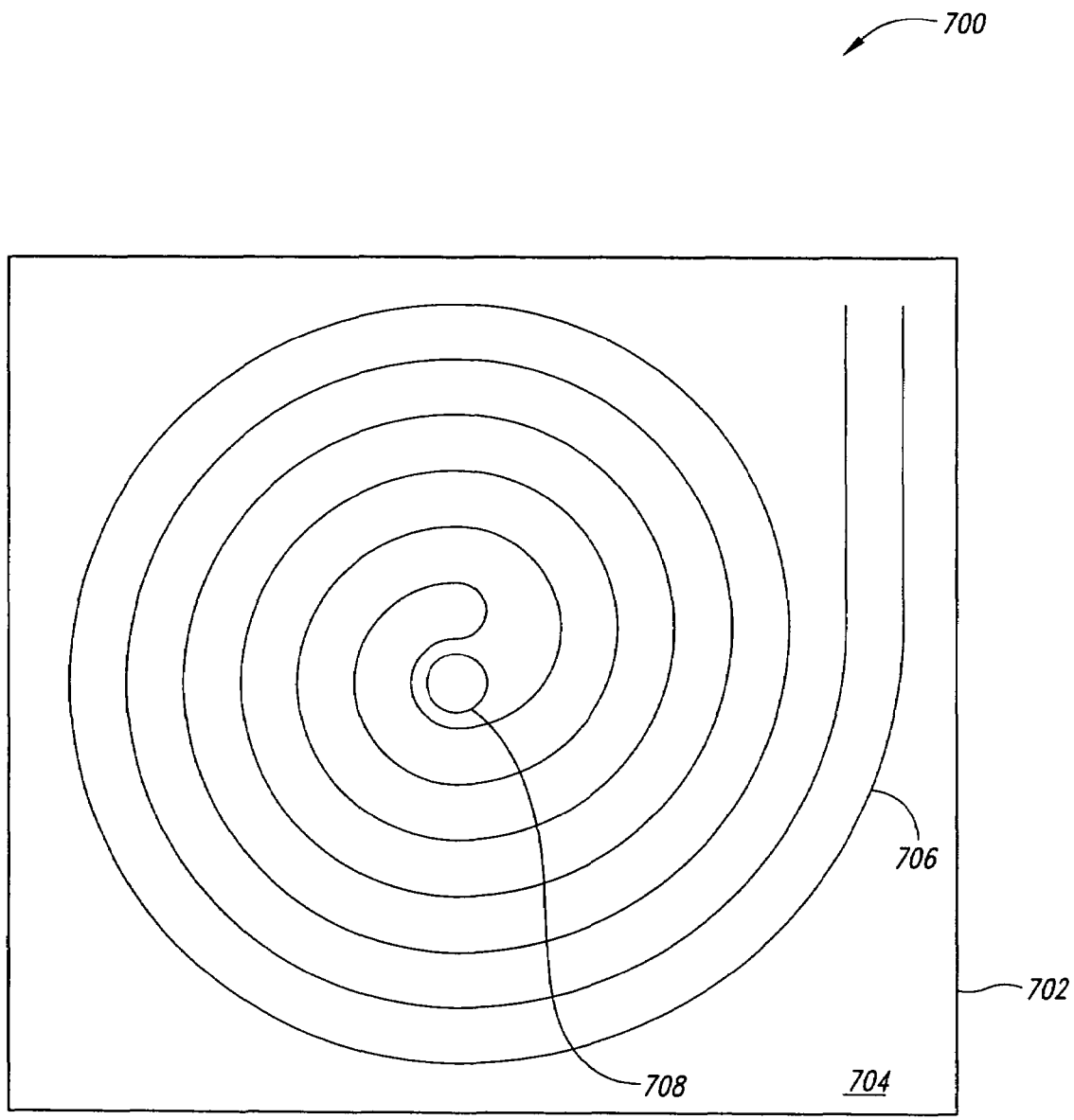
FIG. 7 is a top view of another embodiment of a coil in accordance with the present disclosure.
Figure 8:
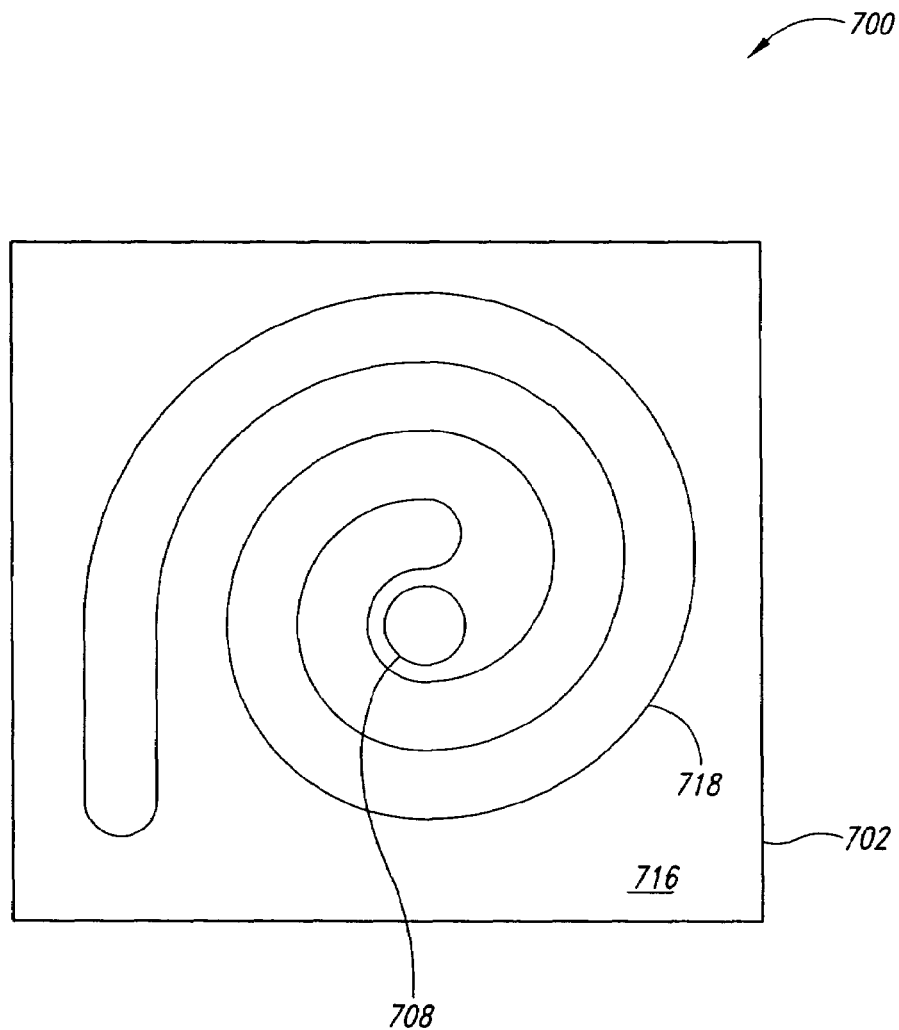
FIG. 8 is a bottom view of the embodiment of a coil illustrated in FIG. 7.
Figure 9:
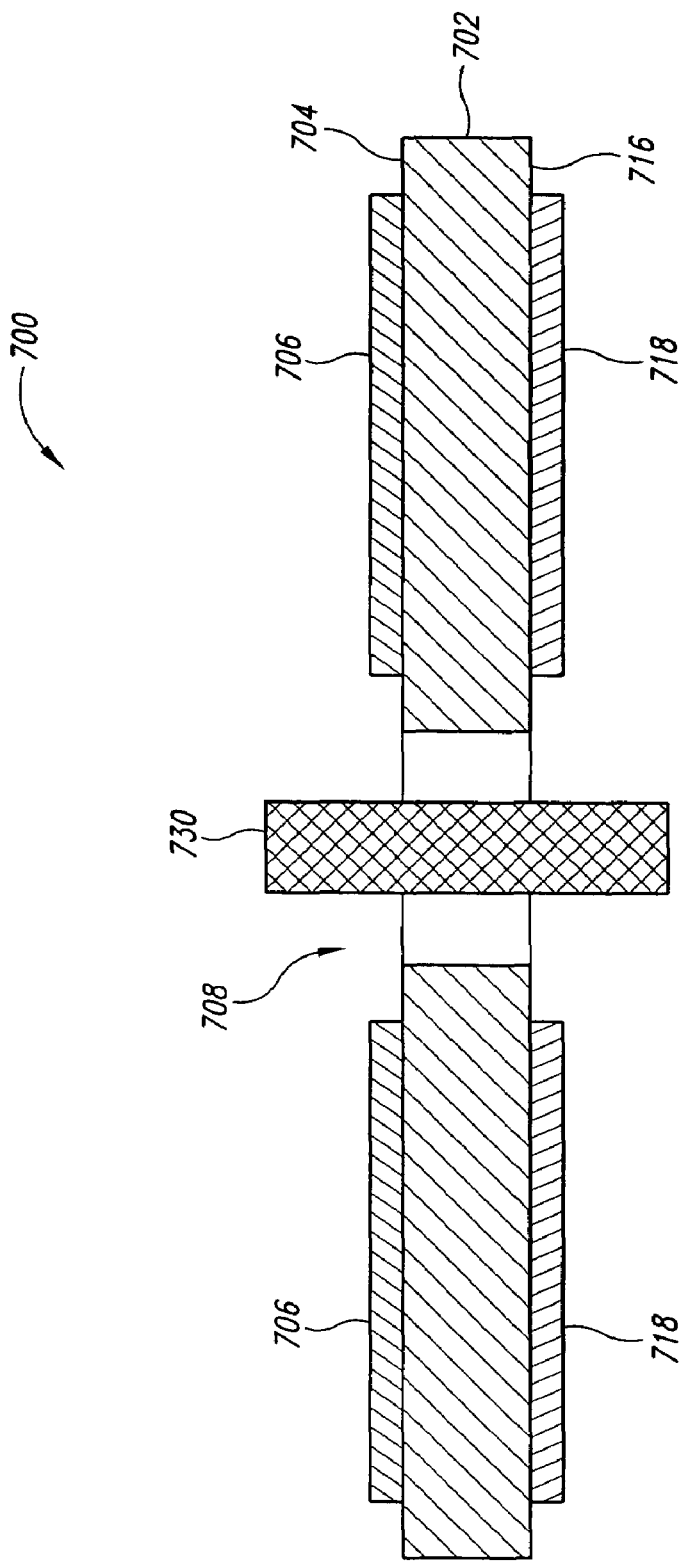
FIG. 9 is a side view of the embodiment of a coil illustrated in FIG. 7.

FIGS. 7 through 9 illustrate another embodiment of a bi-metal coil 700. FIGS. 7 through 9 are not drawn to scale for ease of illustration. FIG. 7 is a top view of the coil 700. The coil 700 comprises a layer of insulating material 702 with an upper surface 704. The layer of insulating material 702 may comprise, for example, an integrated circuit board, a substrate or a thin film or sheet of insulation. Commercially available insulating materials are sold under the trademark Mylar®. An electrical conductive winding in the form of a trace 706 is formed on the upper surface 704 of the layer of insulating material 702. The electrical conductive trace 706 may comprise any suitable electrical conductive material, such as, for example, copper, aluminum, gold, and silver, and alloys. The materials discussed above with respect to the electrical conductive winding 204 of FIG. 2 may be employed. Well-known techniques for forming traces on substrates may be employed, such as those used in connection with RFID devices and antennas. The layer of insulating material 702 has an opening 708.

FIG. 8 is a bottom view of the embodiment of a coil 700 illustrated in FIG. 7. The layer of insulating material 702 has a lower surface 716. A magnetic conductive winding in the form of a trace 718 is formed on the lower surface 716 of the layer of insulating material 702. The magnetic conductive trace 718 may comprise any suitable magnetic conductive material, such as, for example, nickel, nickel/iron alloys, nickel/tin alloys, nickel/silver alloys. The materials discussed above with respect to the magnetic conductive winding 206 of FIG. 2 may be employed. Well-known techniques for forming traces on substrates may be employed, such as those used in connection with RFID devices and antennas. FIG. 9 is a side view of the embodiment of a coil 700 illustrated in FIG. 7, illustrating an optional core 730 for the coil 700. The core 730 may comprise, for example, an iron core.

Figure 10:
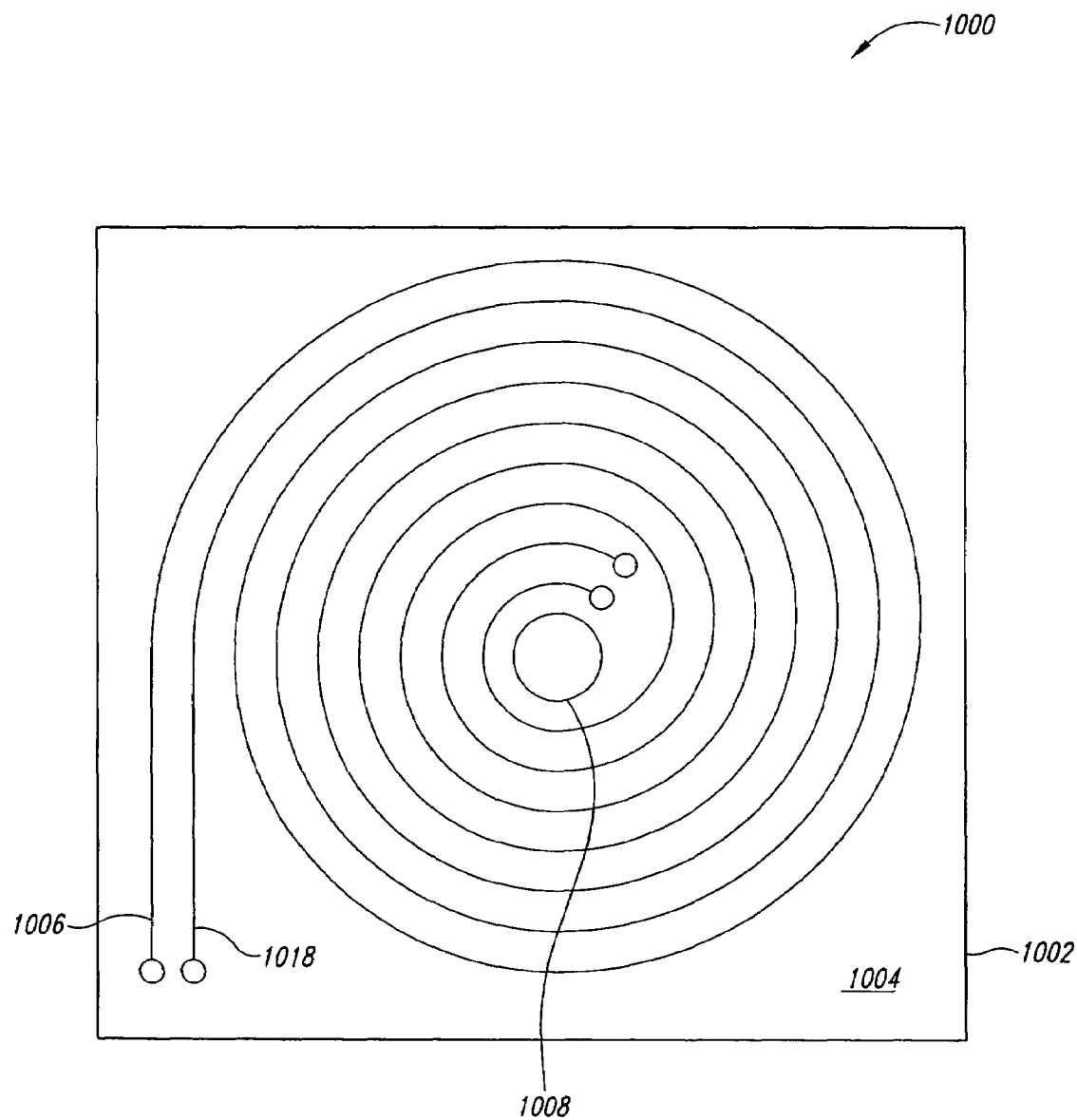
FIG. 10 is a top view of another embodiment of a coil in accordance with the present disclosure.

FIG. 10 is a top view of another embodiment of a bi-metal coil 1000. The coil 1000 comprises a layer of insulating material 1002 with an upper surface 1004. The layer of insulating material 1002 may comprise, for example an integrated circuit board, a substrate or a thin film of insulation. An electrical conductive winding in the form of a trace 1006 is formed on the upper surface 1004 of the layer of insulating material 1002. The electrical conductive trace 1006 may comprise any suitable electrical conductive material, such as, for example, copper, aluminum, gold, and silver, and alloys. For example, the materials discussed above with respect to the electrical conductive winding 204 of FIG. 2 may be employed. Well-known techniques for forming traces on substrates may be employed, such as those used in connection with RFID devices and antennas. The layer of insulating material 1002 has an opening 1008. A magnetic conductive winding in the form of a trace 1018 is formed on the upper surface 1004 of the layer of insulating material 1002. The magnetic conductive trace 1018 may comprise any suitable magnetic conductive material, such as, for example, nickel, nickel/iron alloys, nickel/tin alloys, nickel/silver alloys. For example, the materials discussed above with respect to the magnet conductive winding 206 of FIG. 2 may be employed. Well-known techniques for forming traces on substrates may be employed, such as those used in connection with RFID devices and antennas.

Figure 11:
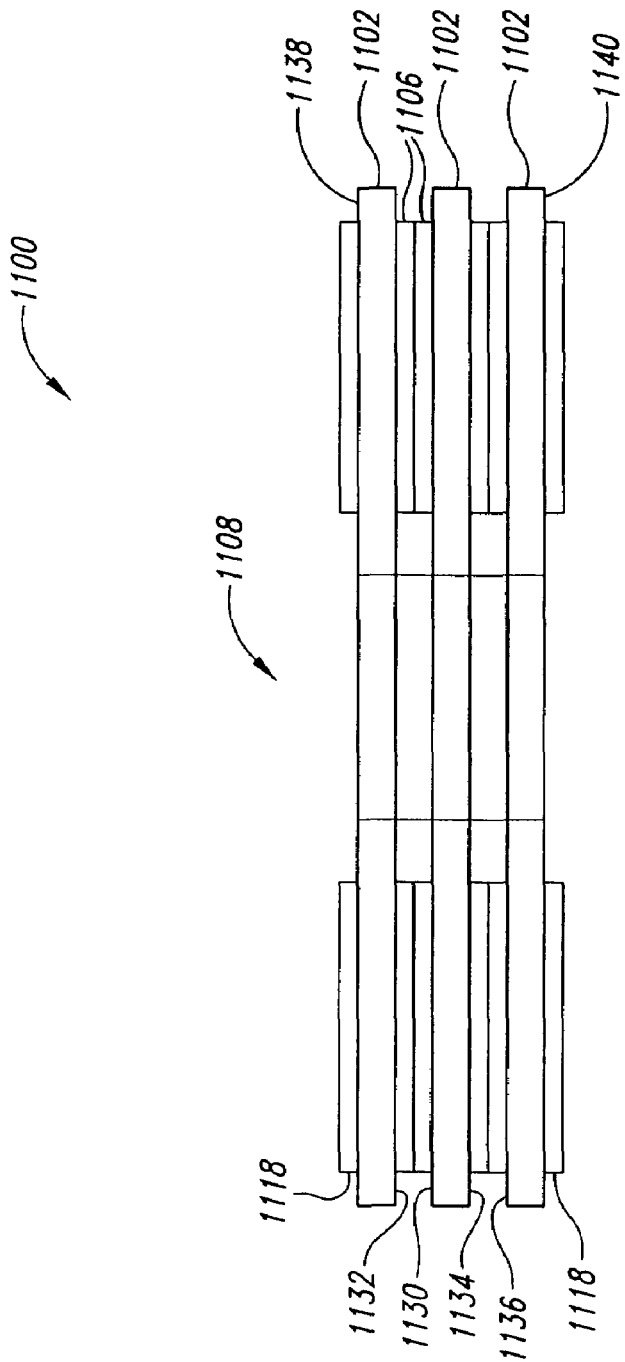
FIG. 11 is a side view of another embodiment of a coil in accordance with the present disclosure.

FIG. 11 is side view of another embodiment of a bi-metal coil 1100. The coil 1100 comprises a plurality of insulating layers 1102. Traces of electrical conductive material 1106 are formed on selected surfaces 1130, 1132, 1134, 1136 of the plurality of insulating layers 1102. Traces of magnetic conductive material 1118 are formed on selected surfaces 1138, 1140 of the plurality of insulating layers 1102. The layers of insulating material 1102 have an opening 1108. As illustrated, the coil 1100 comprises three layers of insulating material 1102. Fewer or additional layers 1102 may be employed. In addition, in some embodiments the traces of electrical conductive material 1106 and the traces of magnetic conductive material 1118 may be formed on selected surfaces of the layers of insulating material 1102 in different patterns. For example, traces of electrical conductive material 1106 and traces of magnetic conductive material 1118 may be formed on alternate surfaces of layers of insulating material. In another example, traces of electrical conductive material 1106 and magnetic conductive material 1118 may be formed on the same surface of a layer of insulating material 1102, or on each surface of a layer of insulating material. Traces on various layers of insulating material 1102 may be coupled to each other.

Figure 12:
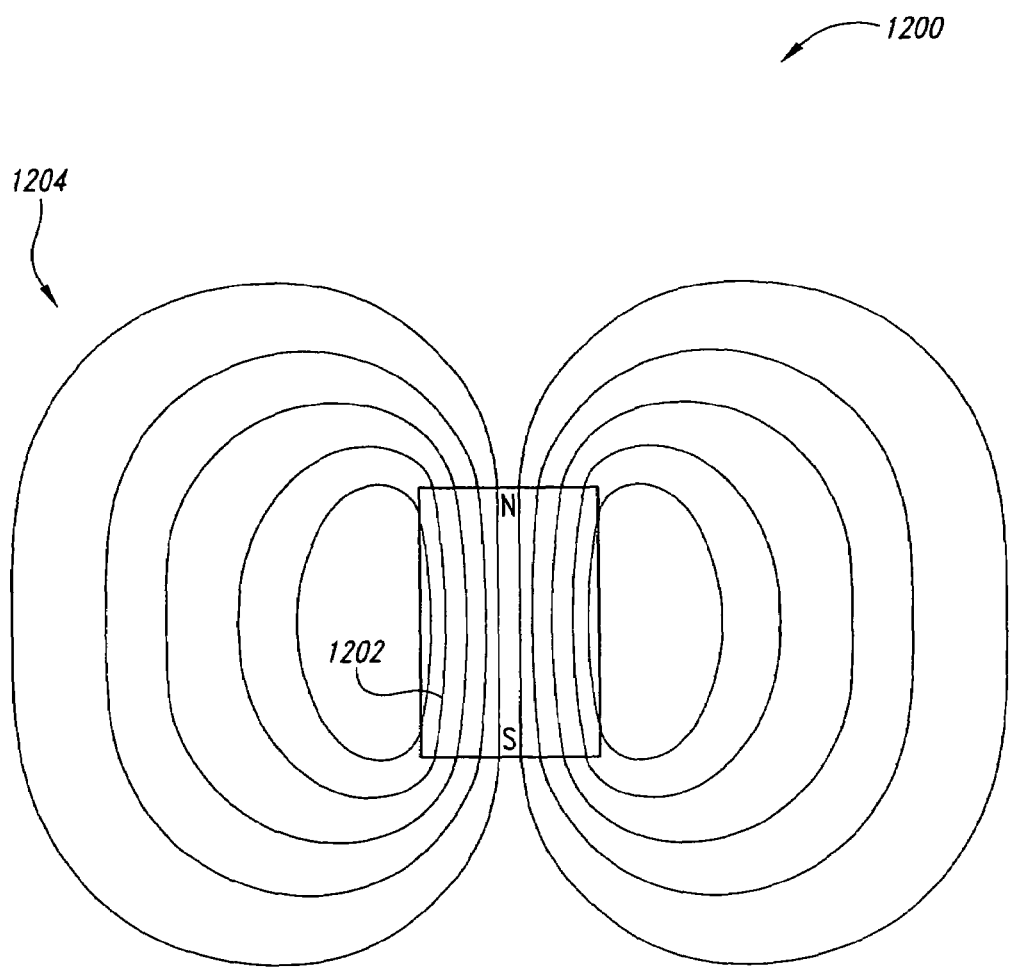
FIG. 12 is a graphic illustration of the magnetic flux generated by a conventional magnetic structure.

As mentioned above, coils are frequently employed in devices and applications together with magnets. Bi-metal coils can be advantageously employed in such applications and environments with conventional magnets. FIG. 12 is a graphic illustration of the magnetic flux generated by a conventional magnetic structure 1200. The magnetic structure comprises a magnet 1202 having a north pole N and a south pole S. FIG. 12 shows representative magnetic flux equipotential lines 1204 to illustrate the magnetic field that is generated by the permanent magnet 1202 of the magnetic structure 1200. The closer the equipotential lines in a region, the greater the magnetic flux density in the region.

Improvements, however, can be made to conventional magnetic structures. In many devices and applications, increasing the magnetic flux density in a region can greatly improve efficiency and performance. For example, increasing the magnetic flux density in a region can lead to a higher gradient, which can lead to increased efficiency in, for example, a generator or a motor.

Figure 13A:
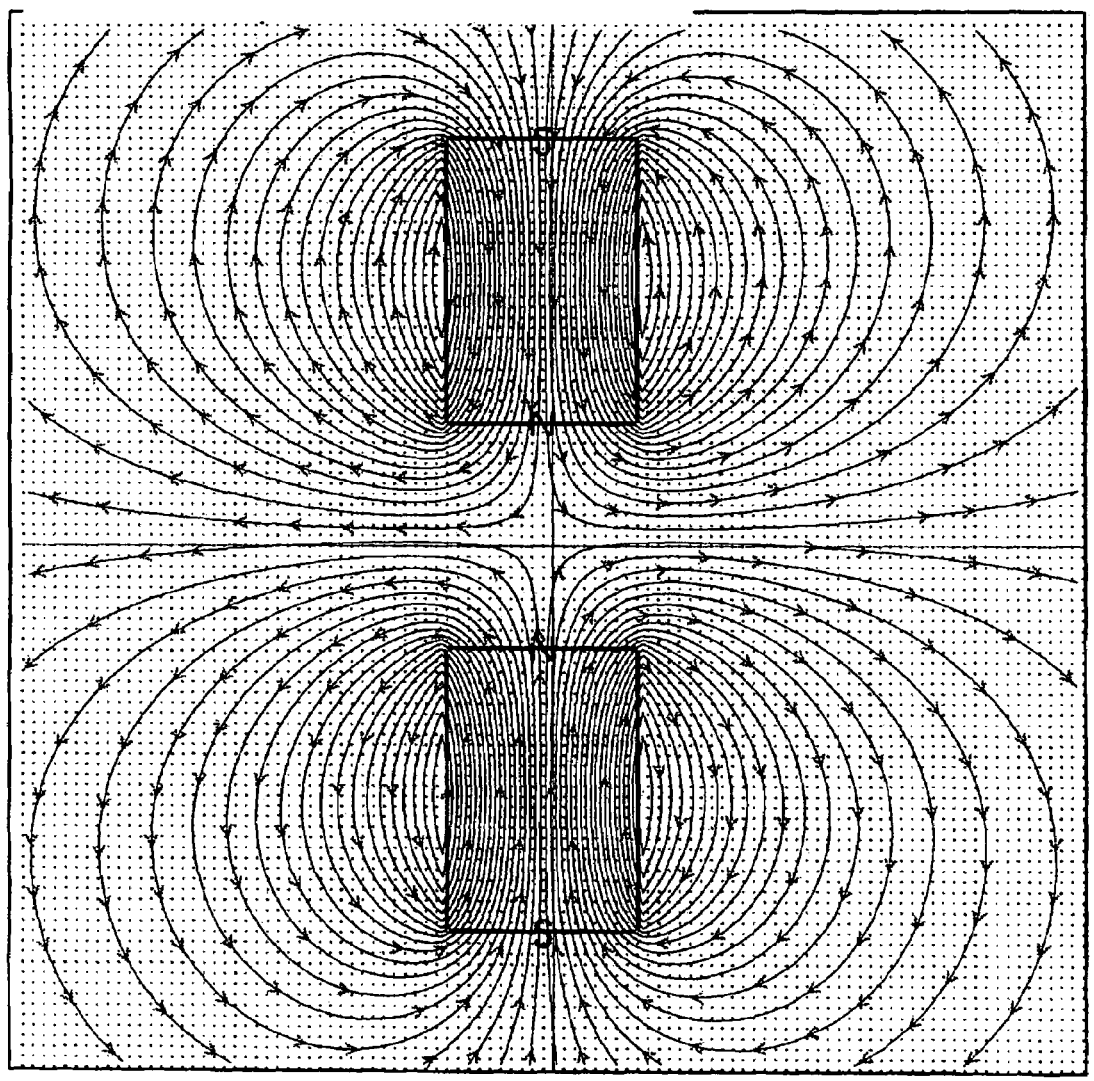
FIGS. 13A and 13B are graphic illustrations of the magnetic flux generated by two permanent magnets with like poles facing each other and separated by an ambient distance.
Figure 13B:
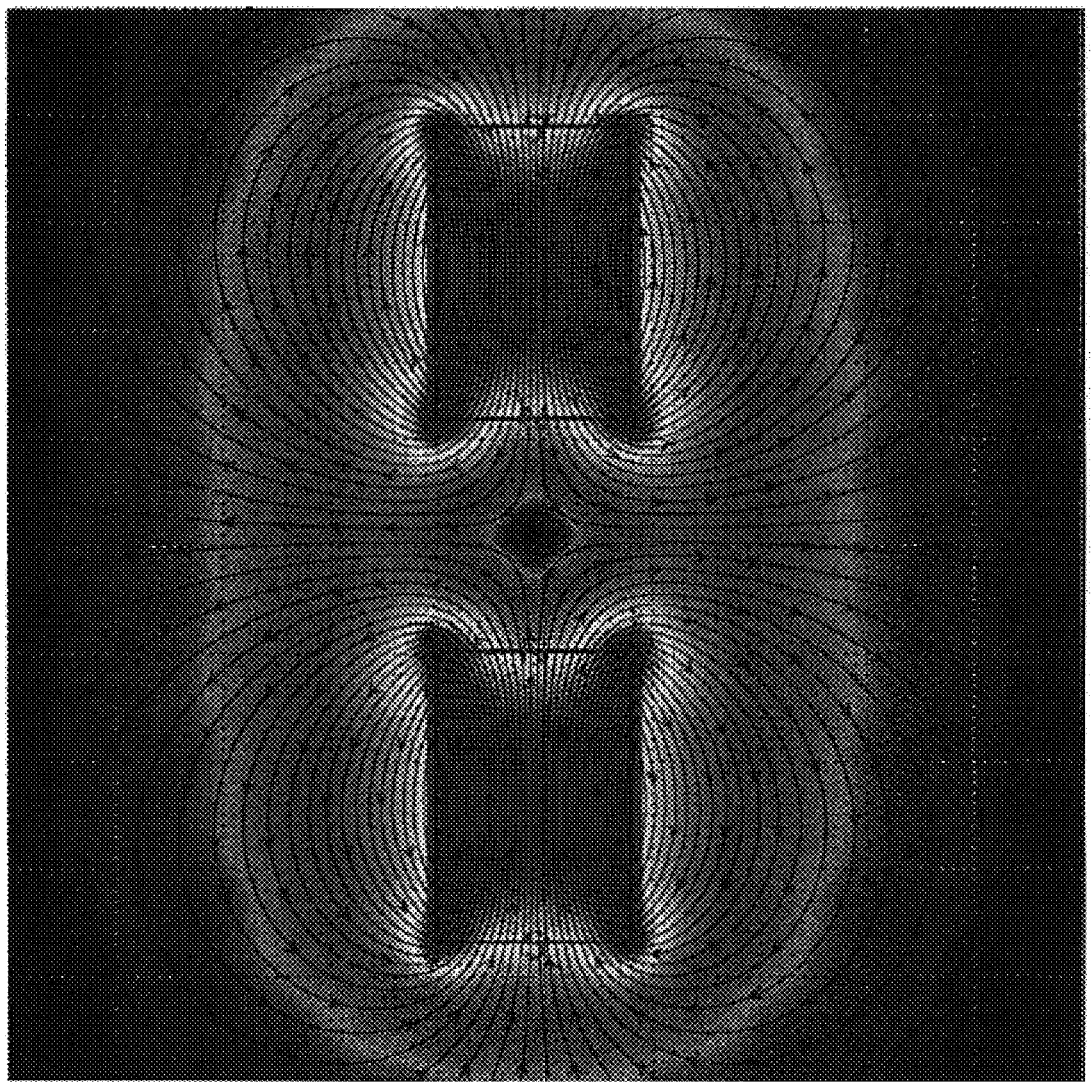

FIGS. 13A and 13B are graphic illustrations of the magnetic flux generated by a magnetic structure with two permanent magnets with north poles facing each other and separated by an ambient distance. FIG. 13A is a black and white representation and FIG. 13B is a color representation. Representative magnetic flux equipotential lines illustrate the magnetic field that is generated by the magnetic structure. The magnetic flux has a higher gradient in the region between the north poles than the magnetic flux in the region around the north pole generated by a single magnet or by magnetic structures that have opposite polarity poles facing each other.

Figure 14A:
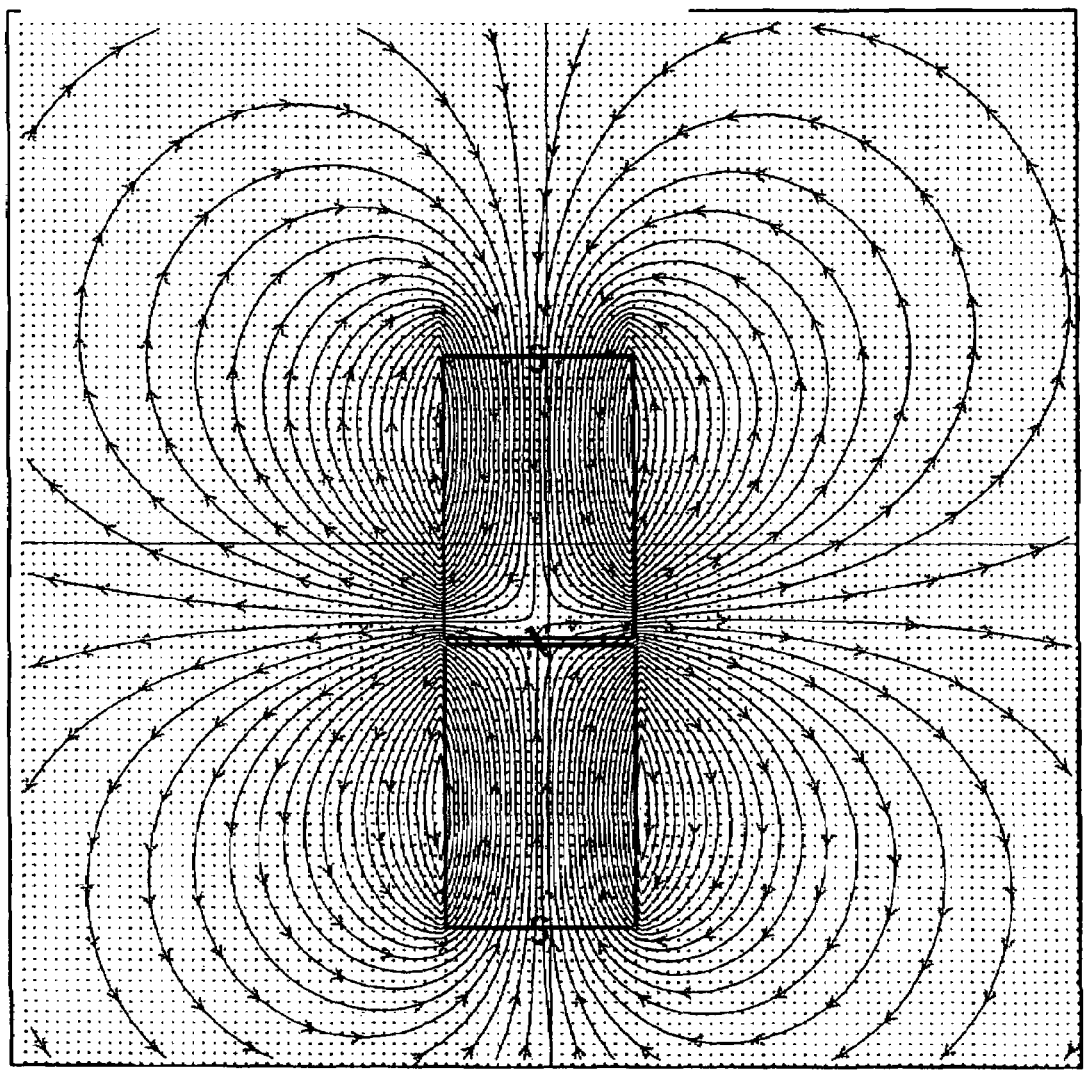
FIGS. 14A and 14B are graphic illustrations of the magnetic flux generated by two permanent magnets with like poles substantially touching each other.
Figure 14B:
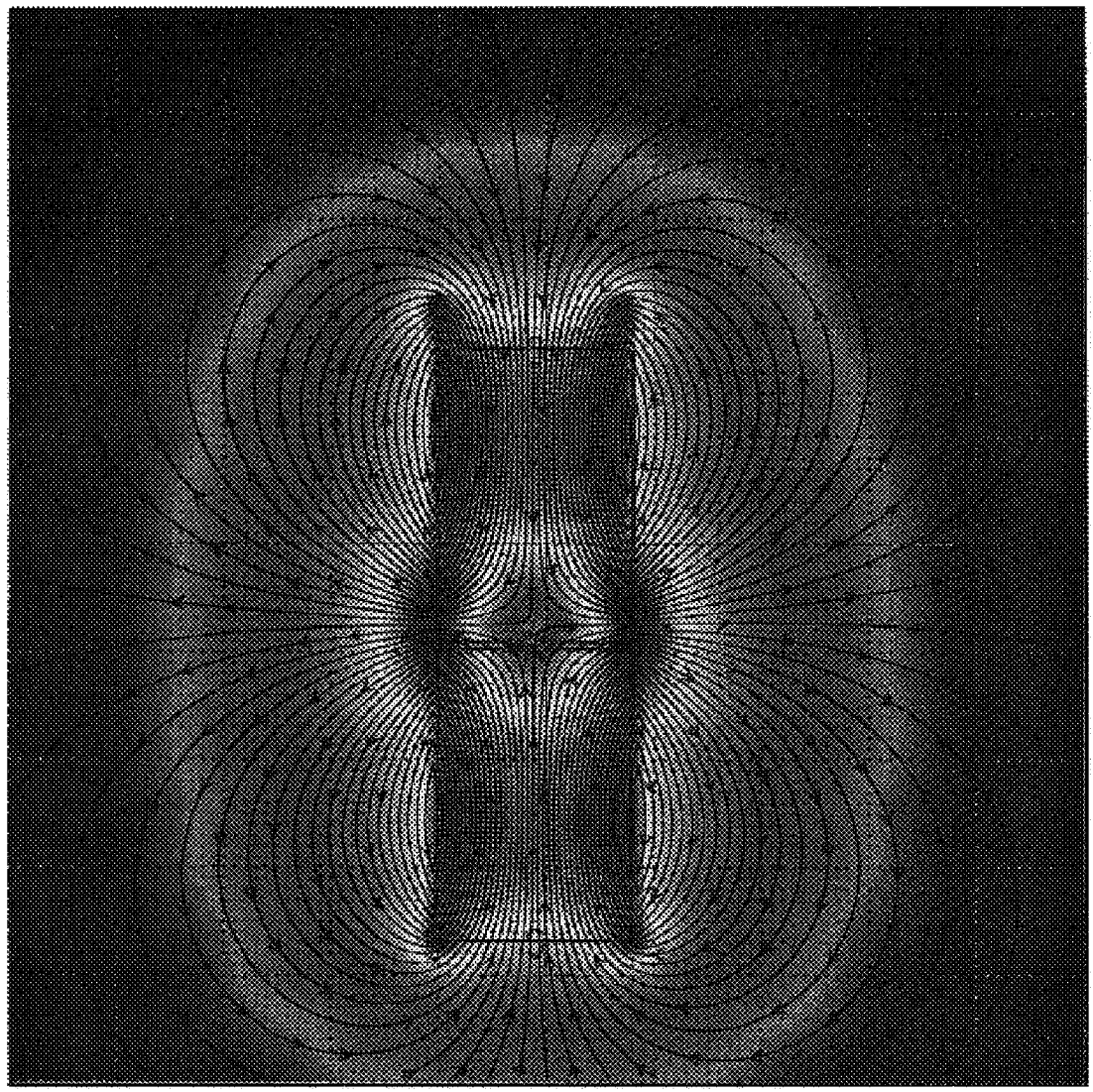

FIGS. 14A and 14B are graphic illustrations of the magnetic flux generated by a magnetic structure with two permanent magnets with north poles substantially touching each other. Representative magnetic flux equipotential lines illustrate the magnetic field that is generated by the magnetic structure. For similar magnets, the magnetic flux in the region adjacent to the substantially touching north poles generated by the arrangement illustrated in FIGS. 14A and 14B has a higher gradient than the magnet flux generated by the arrangement illustrated in FIGS. 13A and 13B, which is illustrated by the greater density of flux lines in FIGS. 14A and 14B. A higher magnetic flux gradient also occurs in a region adjacent to the south pole of the upper magnet illustrated in FIGS. 14A and 14B.

Figure 15A:
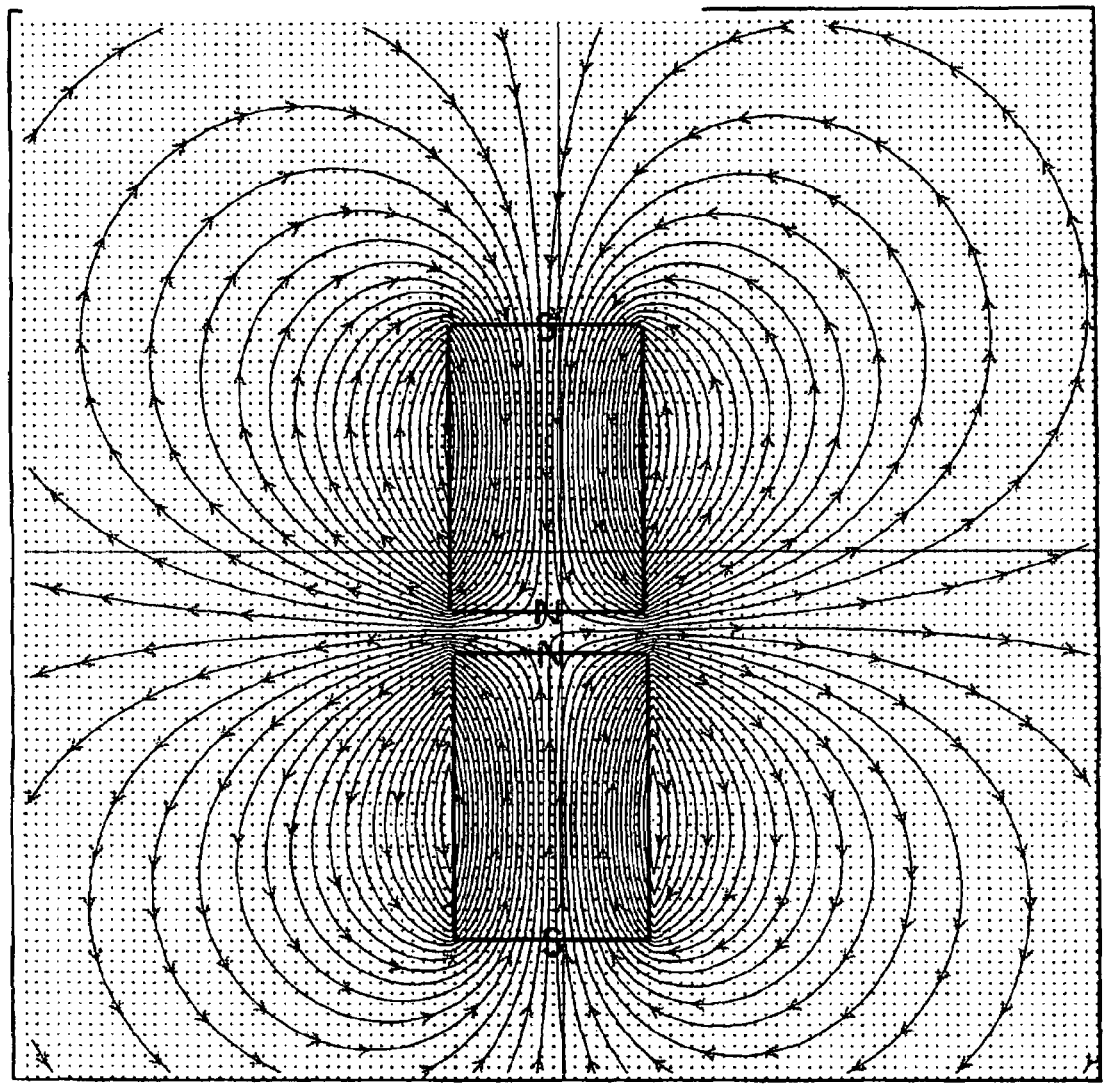
FIGS. 15A and 15B are graphic illustrations of the magnetic flux generated by two permanent magnets with like poles facing each other and held together between an ambient distance and a substantially touching position.
Figure 15B:
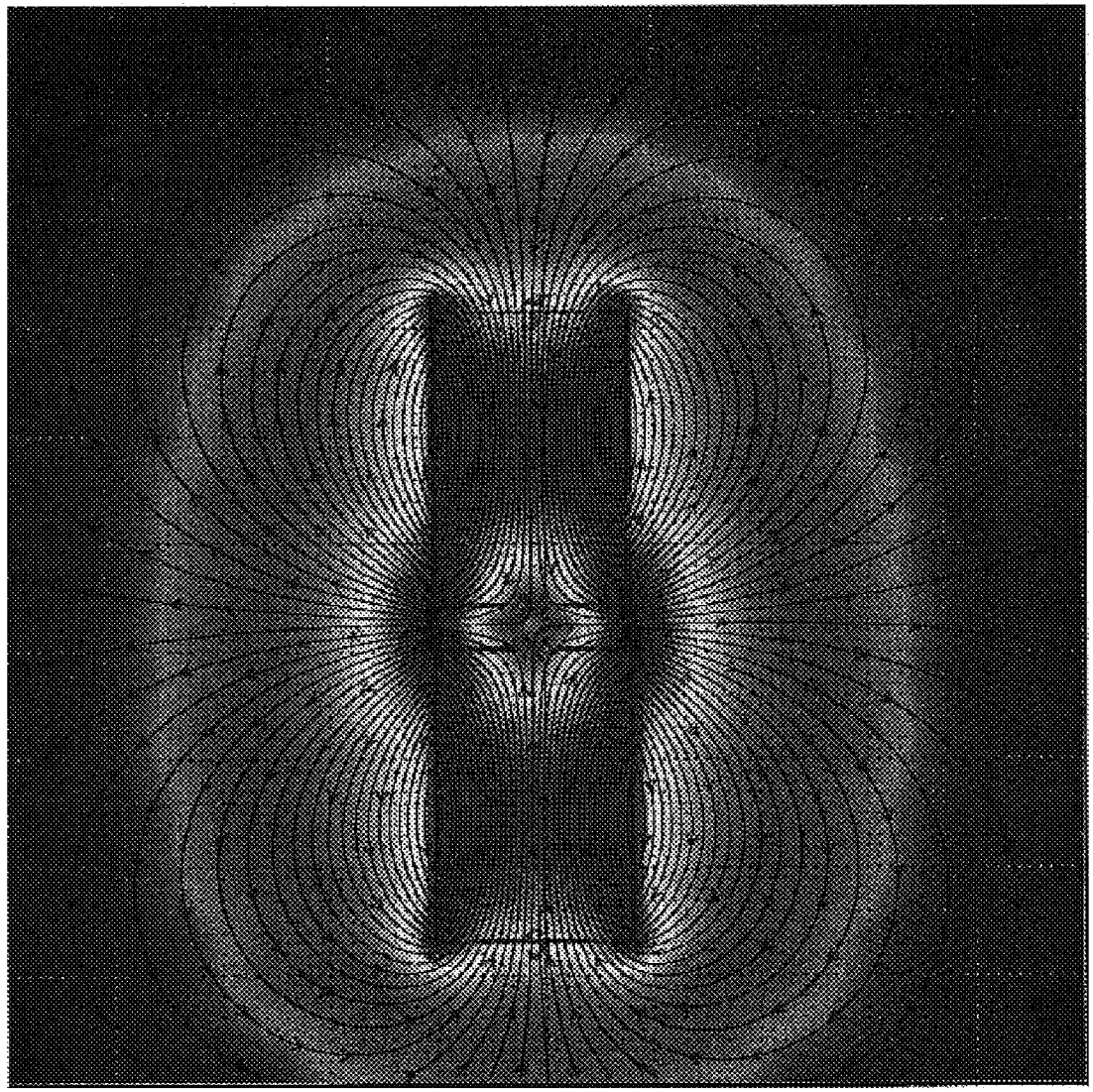

FIGS. 15A and 15B are graphic illustrations of the magnetic flux generated by a magnetic structure with two permanent magnets with like poles facing each other and held together at a distance between an ambient distance and a substantially touching position. Representative magnetic flux equipotential lines illustrate the magnetic field that is generated by the magnetic structure. For similar magnets, the magnetic flux generated by the arrangement illustrated in FIGS. 15A and 15B produces a denser set of flux lines along a larger region adjacent to the north poles, permitting a higher flux gradient in a larger region than the magnet flux generated by the arrangements illustrated in FIGS. 13A, 13B, 14A and 14B, which is illustrated by the greater density of flux lines along a larger region of the sides of the permanent magnets illustrated in FIGS. 15A and 15B.

Figure 16:
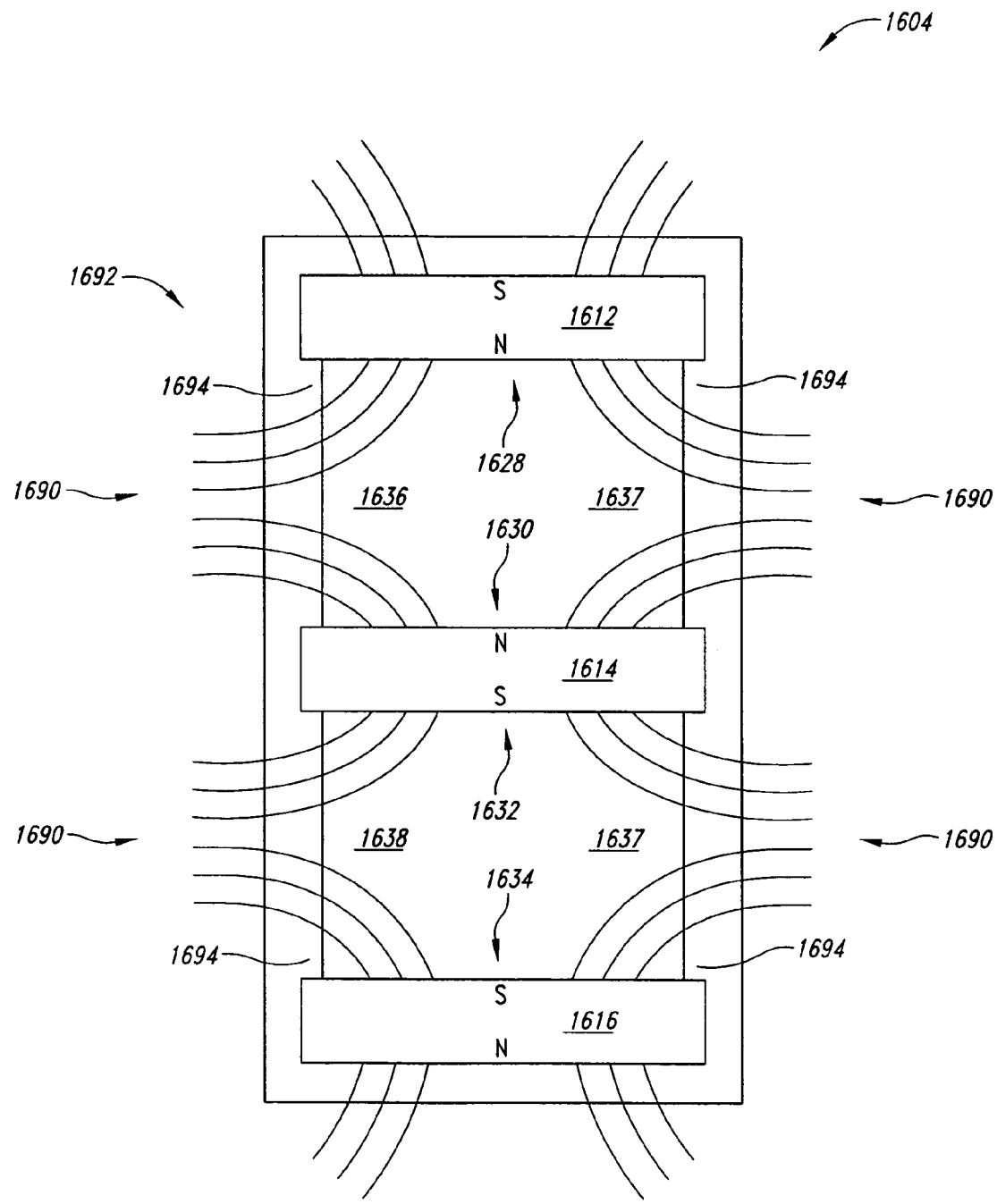
FIG. 16 is cross-sectional view of an embodiment of a magnetic structure in accordance with the present disclosure.

Significant improvements in efficiency, for example, in power generation, can be achieved by positioning the magnets with like poles facing each other at an optimum distance between a touching configuration and an ambient distance. The optimum distance will vary depending upon the configuration in which the magnetic structure is to be employed (e.g., the movement path of the magnetic structure with respect to a coil when the magnetic structure is employed in a generator/motor configuration). FIG. 16 is a cross-sectional view of an embodiment of a multipole magnetic structure 1604 generating a plurality of compressed magnetic fields. In some applications, generating a plurality of compressed magnetic fields can provide further increases in efficiency. The compressed magnetic fields may increase the efficiency of the conversion of energy into electrical energy when the magnetic structure 1604 is employed, for example, in a generator. Such generators may be configured to convert energy received in a parasitic manner. Typical sources of energy include kinetic sources, thermal sources, acoustic sources, and radio-frequency sources.

The magnetic structure 1604 employs tabs 1694 to hold the permanent magnets 1612, 1614, 1616 in position with respect to each other. While the illustrated embodiment employs three permanent magnets 1612, 1614, 1616, other embodiments may employ different numbers of permanent magnets, such as two permanent magnets of four permanent magnets. Other embodiments may employ electromagnets instead of or in addition to permanent magnets. The permanent magnets 1612, 1614, 1616 are disk-shaped as illustrated, but other shapes may be employed. For example, rectangular- (e.g., square), spherical-, or elliptical-shaped magnets may be employed. Similarly, the faces of the magnets need not be flat. For example, convex-, concave-, radial-, cone-, or diamond-shaped faces may be employed. Various combinations of shapes and faces may be employed. While the illustrated embodiment employs tabs, other positioning mechanisms may be employed, such as threads, spacers, glues, or combinations of positioning mechanisms. The magnets 1612, 1614, 1616 are positioned and held apart from each other and are arranged such that same polarity poles in adjacent permanent magnets face each other. For example, the N pole 1628 of the first permanent magnet 1612 faces the N pole 1630 of the second permanent magnet 1614 and the S pole 1632 of the second permanent magnet 1614 faces the S pole 1634 of the third permanent magnet 1616. In addition, the magnets 1612, 1614, 1616 are held close enough together to form a compressed magnetic field (e.g., closer than an ambient distance and spaced apart). In some embodiments, the spaces 1636, 1638 between the permanent magnets 1612, 1614, 1616 are substantially filled with a material 1637, which may comprise a gas such as air. In some embodiments, the material 1637 may comprise other substantially non-magnet and substantially non-conductive substances, such as a fluoropolymer resin or plastic. In some embodiments, the spaces 1636, 1638 between the magnets may be evacuated and hermetically sealed.

The shape, position and strength of the permanent magnets in a magnetic structure, such as the magnetic structure 1604, can increase the efficiency of a device or application employing the magnetic structure 1604, such as a generator, by generating a compressed magnetic field. A gauss meter (not shown) may be employed to determine the optimum strength and positioning of the permanent magnets 1612, 1614, 1616, as well as the number of permanent magnets. Other design considerations may be taken into consideration as well, such as weight and reducing external impacts of electromagnetic fields and control of multiple generator magnetic interaction.

Figure 17:
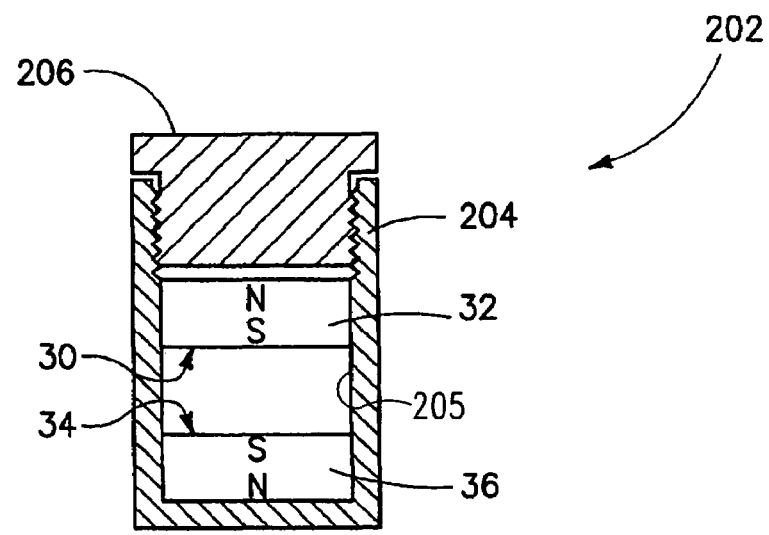
FIG. 17 is cross-sectional view of an embodiment of a magnetic structure in accordance with the present disclosure.

FIG. 17 illustrates an embodiment of a magnet structure 202 configured to generate a compressed magnetic field. The magnet structure 202 includes a case 204 and a plurality of magnets housed in the case 204 with like poles facing each other. In the illustrated embodiment, the case 204 houses a first magnet 32 having an end 30 of a first polarity and a second magnet 36 having an end 34 of the same polarity as the end 30 and facing the end 30. In the illustrated embodiment, the end 30 is a south pole and the end 34 is a south pole; in an alternative embodiment, two north poles face each other. In the illustrated embodiment, the case 204 has an inner cylindrical surface 205 and the magnets 32 and 36 have respective outer cylindrical surfaces. The magnets 32, 36 are slidingly received into the case 204. In the illustrated embodiment, the case 204 has an open threaded end, through which the magnets 32 and 36 are inserted (or replaced) and the magnet assembly 202 further includes a screw cap 206 selectively closing the threaded end of the case 204. In the illustrated embodiment, the screw cap 206 forces the magnets 32, 36 together closer than the ambient distance that the repelling force generated by the magnetic field would normally permit, thereby generated a compressed magnetic field. Other embodiments for positioning the magnets are possible. For example, the inner cylindrical surface 205 could have recesses into which the magnets are snapped.

Figure 18:
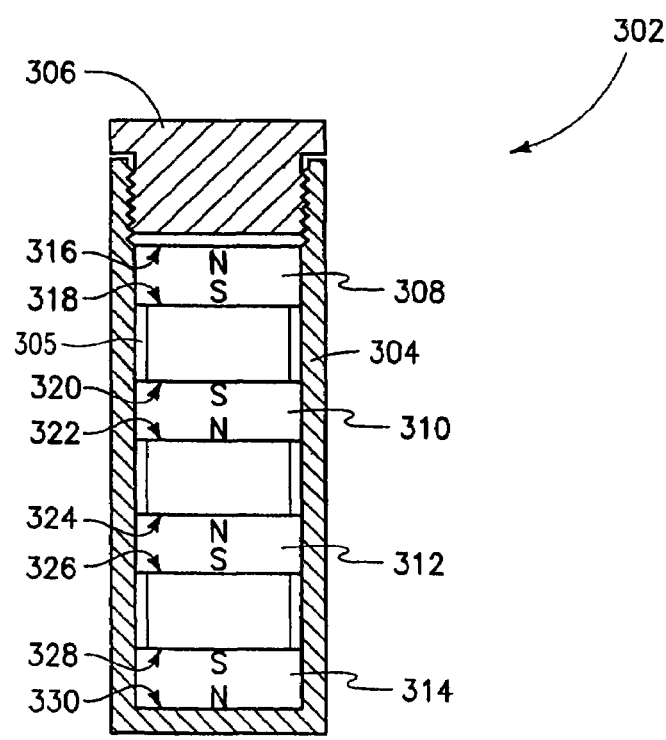
FIG. 18 is cross-sectional view of an embodiment of a magnetic structure in accordance with the present disclosure.

FIG. 18 illustrates an embodiment of a multi-pole magnetic structure 302 configured to generate a plurality of compressed magnetic fields. The magnetic structure 302 has a case 304 with tabs 305 holding a plurality of magnets in position with respect to each other. The magnets include a first magnet 308 having a first end 318 having a first polarity and a second end 316 having an opposite polarity. The magnets further include a second magnet 310 having a first end 320 having a polarity that is the same as the first polarity, and having a second end 322 having a polarity that is opposite the first polarity. The first end 320 of the second magnet 310 is spaced apart from the first end 318 of the first magnet 308. The first end 320 of the second magnet 310 is at least generally facing the first end 318 of the first magnet 308. The magnets further include a third magnet 312 having a first end 324 having a polarity that is opposite the first polarity, and having a second end 326 having a polarity that is the same as the first polarity. The first end 324 of the third magnet 312 is spaced apart from the second end 322 of the second magnet 310. The first end 324 of the third magnet 312 is at least generally facing the second end 322 of the second magnet 310. Any number of additional magnets is possible. For example, in the illustrated embodiment, the magnets further include a fourth magnet 314 having a first end 328 having a polarity that is the same as the first polarity and having a second end 330. The magnet assembly 302 further includes a screw cap 306 closing an open threaded end of the case 304.

Figure 19:
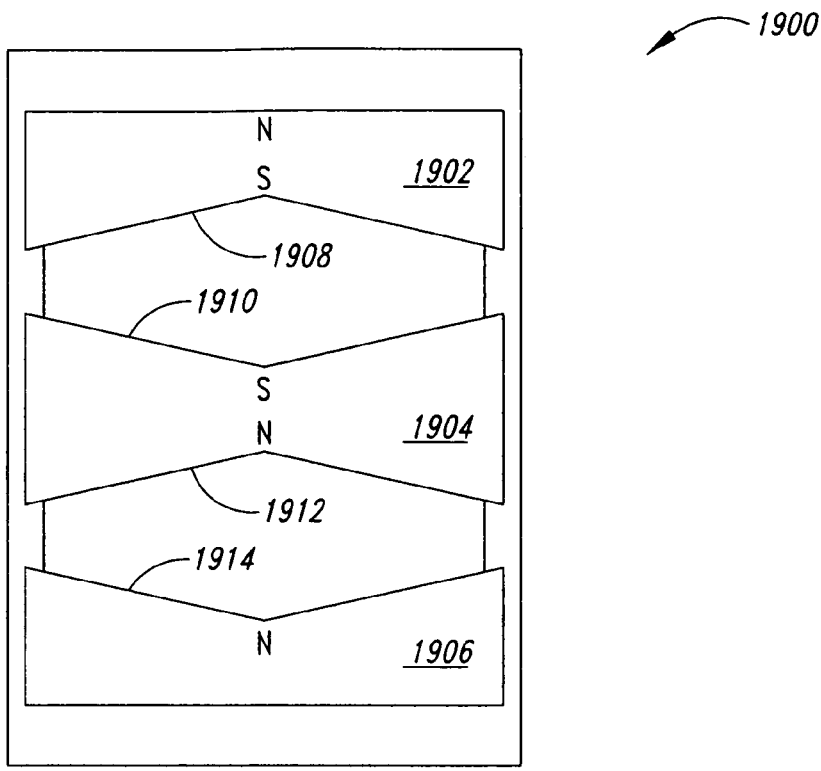
FIG. 19 is cross-sectional view of an embodiment of a magnetic structure in accordance with the present disclosure.

FIG. 19 is a side diametric cross-sectional view of an embodiment of a multi-pole magnet structure 1900 configured to generate a plurality of compressed magnetic fields. The magnet structure 1900 comprises a plurality of magnets 1902, 1904, 1906 with concave-shaped surfaces 1908, 1910, 1912, 1914 with like poles held facing each other at selected distances apart so as to generate high gradient or compressed magnetic fields. As illustrated, the concave-shaped surfaces are cone-shaped. Other substantially concave-shaped surfaces may be employed.

Figure 20:
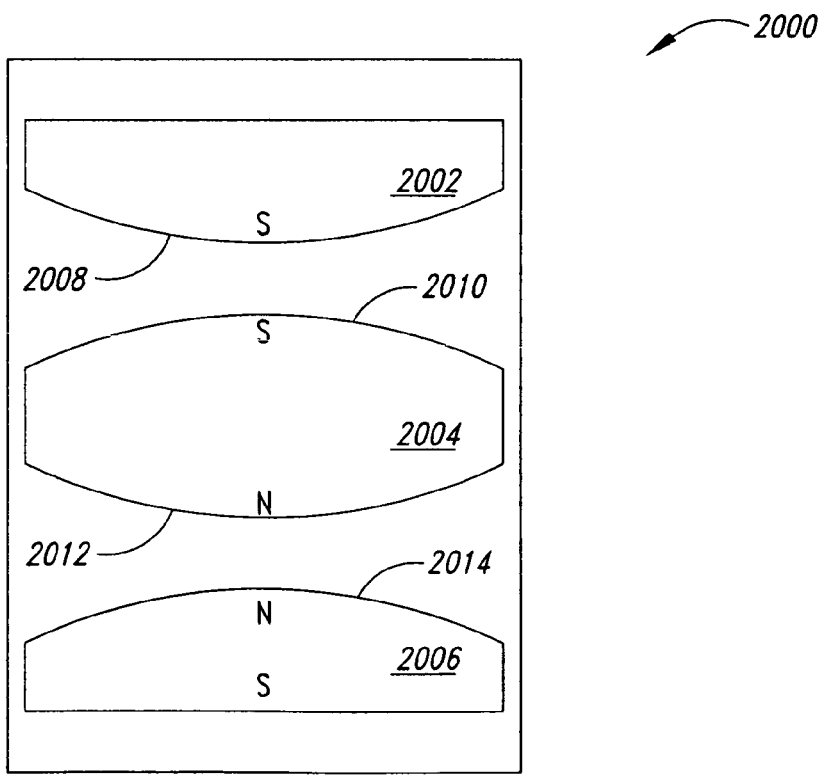
FIG. 20 is a side diametric cross-sectional view of another embodiment of a magnet structure in accordance with the present disclosure.

FIG. 20 is a side diametric cross-sectional view of another embodiment of a multi-pole magnet structure 2000 configured to generate a plurality of compressed magnetic fields. The magnet structure 2000 comprises a plurality of magnets 2002, 2004, 2006 with convex-shaped surfaces 2008, 2010, 2012, 2014 with like poles held facing each other at selected distances apart so as to generate high gradient or compressed magnetic fields. As illustrated, the convex-shaped surfaces are curved. Other substantially convex-shaped surfaces may be employed.

Figure 21:
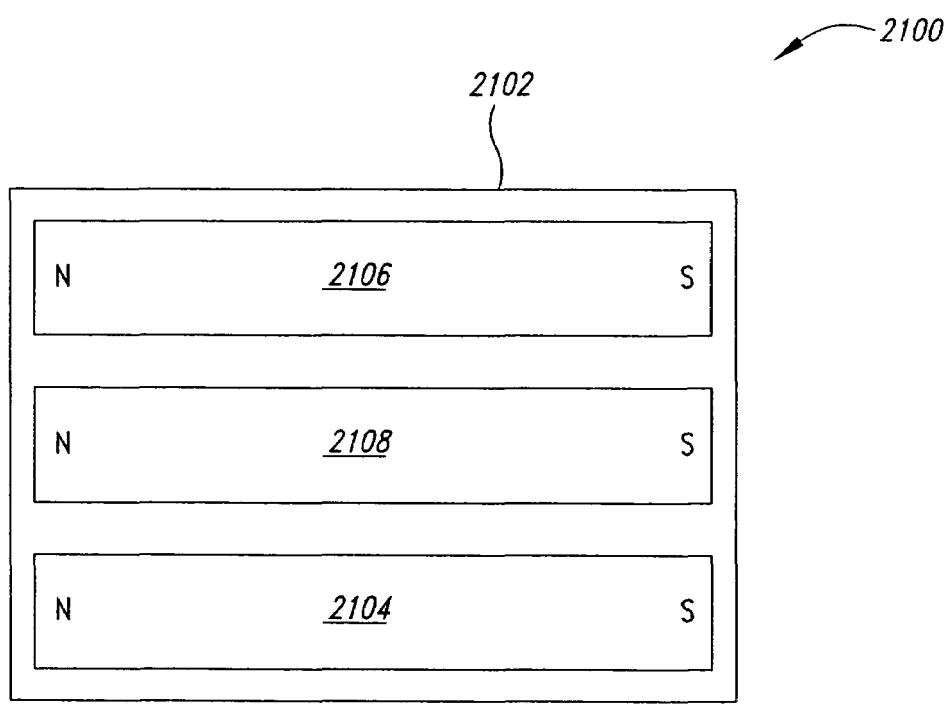
FIG. 21 is a side view of an embodiment of a magnet structure in accordance with the present disclosure.

FIG. 21 is a side view of an embodiment of another multi-pole magnet structure 2100 configured to generate a plurality of compressed magnetic fields. The magnet structure comprises a rectangular magnet housing 2102 and a plurality of rectangular magnets 2104, 2106, 2108 contained within the housing 2102. The magnets 2104, 2106, 2108 are held with like poles facing each other at selected distances apart so as to generate desired compressed magnetic fields.

Embodiments of dual-conductor or bi-metal coils and/or embodiments of magnet structures configured to generate compressed magnet fields, such as those described above, may be advantageously employed in a number of devices and applications. For example, embodiments of dual-conductor or bi-metal coils and/or embodiments of magnet structures configured to generate compressed magnet fields may be used in various types of generators/motors used in various applications, acoustic systems and/or control systems. Example generators include generators may be configured to convert energy received in a parasitic manner or energy specifically generated to be converted into electrical energy. Typical sources of energy include kinetic sources, thermal sources, acoustic sources, and radio-frequency sources. For example, some embodiments may employ a magnetic structure configured to generate a compressed magnetic field together with dissimilar metals in order to take advantage of the Seebeck effect.

A number of such example applications are discussed below by way of illustrative example embodiments of such devices and applications. Although some embodiments may employ a dual-conductor or bi-metal coil and a magnet structure configured to generate a compressed magnetic field, other embodiments may employ a dual-conductor or bi-metal coil and a conventional magnetic structure or no magnetic structure. Other embodiments may employ a magnetic structure configured to generate a compressed magnetic field and a conventional coil or no coil. Some embodiments may employ a conventional coil and a conventional magnetic structure in combination with other aspects of the present disclosure.

Linear generators and motors are known in the art. A linear generator typically has a stator and an armature that can be linearly driven relative to the stator to generate electrical energy. Linear generators are disclosed, for example, in U.S. Pat. No. 6,759,755 to Sagov and in U.S. Pat. No. 6,798,090 to Cheung et al., both of which are incorporated herein by reference. A linear motor typically has a stator and an armature that can be linearly driven relative to the stator in response to the application of electrical energy, typically in the form of electrical signals.

Conversion of linear motion to electrical power is a challenging problem. Recent work by the inventors in evaluating classical linear displacement generators using planar inductors indicates poor conversion efficiencies. See, for example, U.S. Pat. No. 6,220,719 issued to Vetorino, et al. The basic problem is that the power output is proportional to the square of the derivative of the magnetic field, and the magnitude of this derivative remains small in conventional devices. Similar issues arise in the conversion of electrical power into linear motion.

In a linear generator, the power output generated by relative movement of a coil with respect to a magnetic structure is proportional to the square of the derivative of the magnetic field. The voltage is determined by the number of turns in the winding of the coil and the strength of the magnetic field. The shape, relative position and strength of the permanent magnets in a magnetic structure can magnify the value of that derivative by generating a compressed magnetic field. By using a compressed magnetic field, significant increases in efficiency can be obtained from this class of generators, even for relatively small rates of mechanical displacement. The concepts pertinent to generating a compressed magnetic field are addressed through illustrative examples (see the description of FIGS. 13-16 above and 22-25 below).

Figure 22:
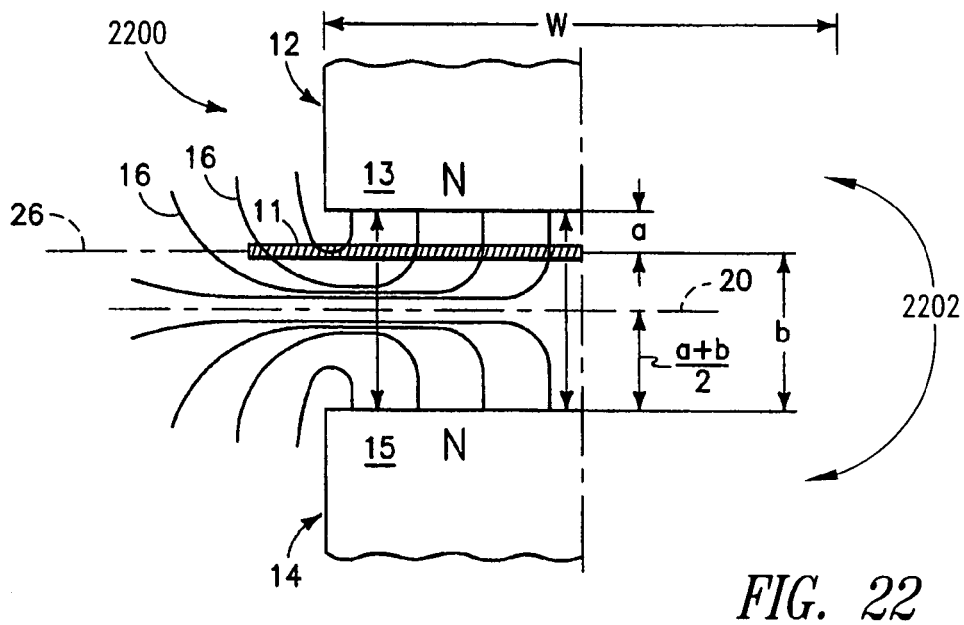
FIG. 22 is a diagrammatical front view of an embodiment of a power generator system.
Figure 23:
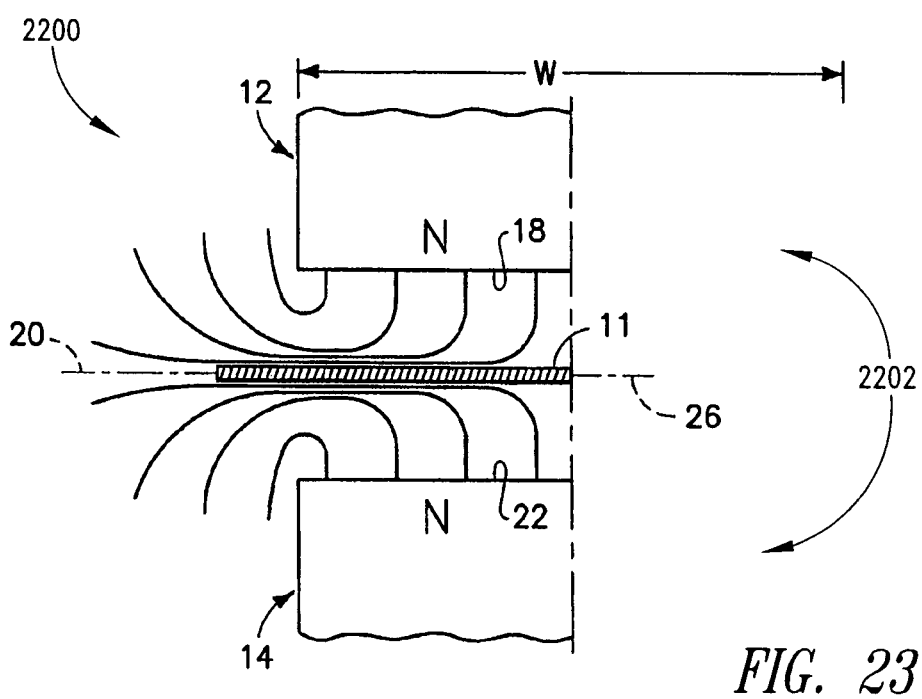
FIG. 23 is a diagrammatical front view of the system of FIG. 22 at a different point in time.
Figure 24:
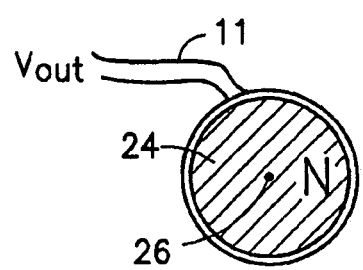
FIG. 24 is a side view, in section, of an armature included in the system of FIG. 22.

FIGS. 22 through 24 illustrate an embodiment of a linear power generator 2200 employing an embodiment of a magnetic structure 2202 configured to generate a compressed magnetic field. The power generator 2200 includes a coil 11 located between two magnets 12 and 14. The coil may be a conventional coil or a dual-conductor or bi-metal coil. More particularly, the power generator 2200 includes a first magnet 12 having an end 13 having a first polarity, and a second magnet 14 having an end 15 having a polarity that is the same as the first polarity. More particularly, in the illustrated embodiment, the end 13 is a north pole and the end 15 is also a north pole. The end 15 of the second magnet 14 is spaced apart from the end 13 of the first magnet 12. In the illustrated embodiment, the end 15 has a surface 22 (FIG. 23) that is generally planar, and the end 13 has a surface 18 that is generally planar. The end surface 22 of the second magnet 14 is at least generally facing the end surface 18 of the first magnet 12.

The at-rest position of the coil 11 is closer to the end 13 of the first magnet 12 than the end 15 of the second magnet 14. In the illustrated embodiment, the magnets 12 and 14 are permanents magnets. Other embodiments may employ electro-magnets. Note that the static magnetic flux through the coil 11 is fairly high, as indicated by the density of the equi-potential lines 16 passing through the coil 11, in FIG. 22. The flux through the surface area of the face 18 of the magnet 12 is very large. The flux through a plane approximately in the center 20 between magnets 12 and 14 is small.

There is a very high negative field gradient between the geometric position of the coil 11 in FIG. 22 and the position occupied by the coil in FIG. 23. Thus, even slow physical movement of the coil 11 (or, conversely, the magnets) will generate large derivatives. The coil 11 moving back and forth about the center 20 gives a huge change in flux. This will be true even with the small rates of physical displacement (spatial derivatives) of magnet position. Because output is proportional to the square of this derivative, significant increases in power production will result.

If the coil 11 is moved from proximate face 18 of magnet 12 to face 22 of magnet 14 in time 2Δt, the flux will change from $+\phi_{max}$ to $-\phi_{max}$.

Thus, the dφ/dt is approximately:

$$\partial\phi_{max}/\partial\Delta t = \phi_{max}/\Delta t$$

and it is positive.

This is an approximate value because, for a linear velocity, the derivative will vary in value during the period Δt since the field is non-linear.

In the embodiment shown in FIG. 24, the coil 11 is wound around a core 24 having a length, and an axis 26 along the length (coinciding with the center line 20 in FIG. 23). In the embodiment shown in FIG. 19, the axis 26 is normal to the direction defined between the end 13 of the first magnet 12 and the end 15 of the second magnet 14. In the embodiment of FIG. 22, the end surface 18 of the first magnet 12 has a width W, and the core 24 has a length along axis 26 that is at least as long as the width W of the end surface 18 of the first magnet 12. In the illustrated embodiment, the end surface 22 of the second magnet 14 has a width corresponding to the width of the end surface 18. Other embodiments are possible.

In the illustrated embodiment, the coil 11 is supported to be driven back and forth between the first magnet 12 and the second magnet 14 along a path between surfaces 18 and 22 that is generally normal to the axis 26.

Figure 25:
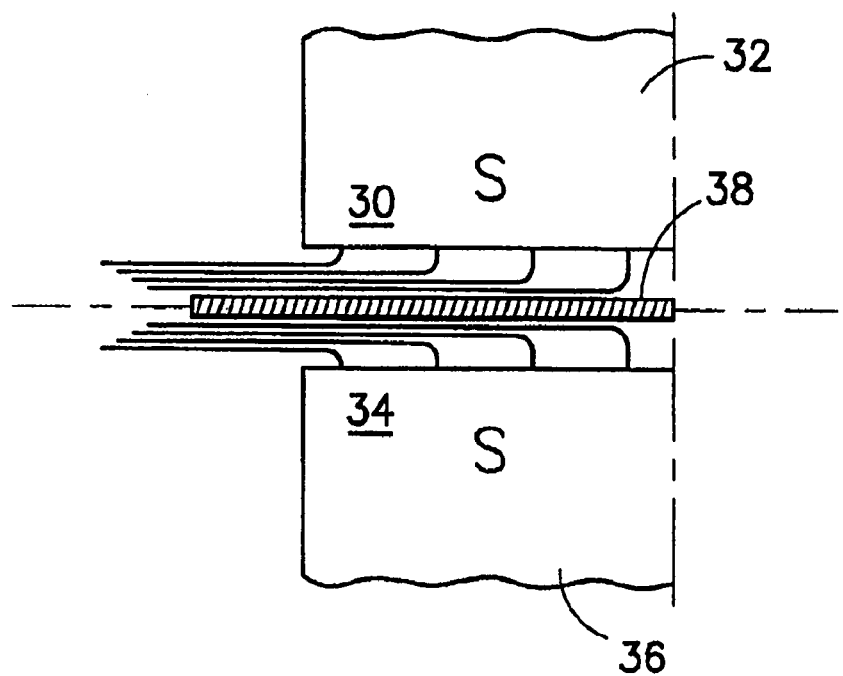
FIG. 25 is a diagrammatical front view of a system in accordance with an alternative embodiment of a generator.
Figure 26:
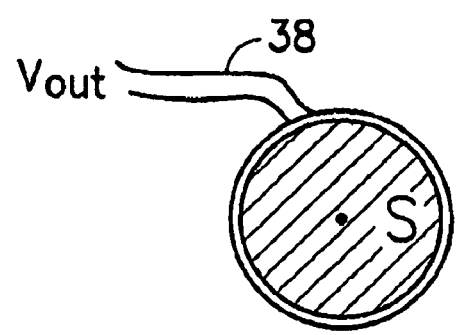
FIG. 26 is a side view, in section, of an armature included in the system of FIG. 25.

In an alternative embodiment, shown in FIGS. 25 and 26, the end 30 of a first magnet 32 is a south pole and the end 34 of a second magnet 36 is also a south pole (and the ends 30 and 34 at least generally face each other). A coil 38 is shown between the two magnets in FIG. 25, but other coil arrangements are possible in a generator as will be described herein.

Holding the magnets separate and closer together than the ambient distance that the repelling force from the magnets would normally permit creates a high-gradient, or compressed, magnetic field. This generally results in an increase of power output from the generator. For many embodiments, holding the magnets closer together up to a limit will result in an increased power output. For example, in alternative embodiments, the distance between face 18 and face 22 could be equivalent to two times the distance "a" shown in FIG. 22.

Figure 27:
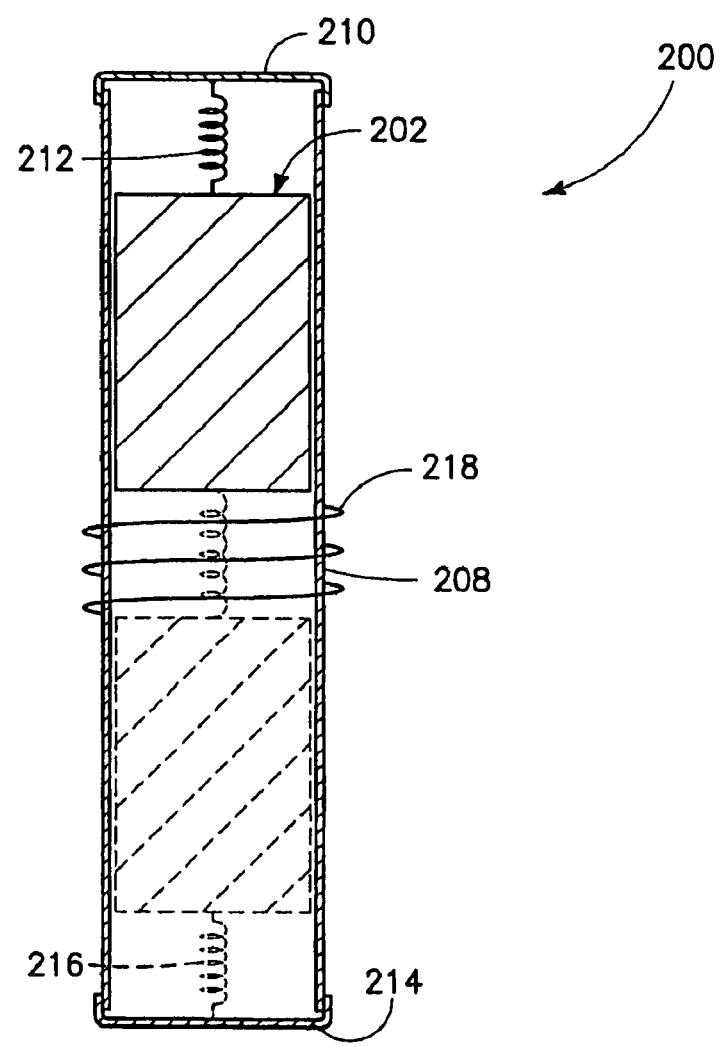
FIG. 27 is a side cross-sectional view of an embodiment of a system in accordance with the present disclosure.

FIG. 27 is a diametric cross-sectional view of a generator 200 employing an embodiment of a magnet structure 202 configured to generate a high-gradient or compressed magnet field. For example, embodiments of the magnetic structures illustrated in FIGS. 16 through 21 may be employed as the magnetic structure 202 illustrated in FIG. 27. The generator 200 includes a housing 208 in which the magnet structure 202 is supported for sliding movement. In the illustrated embodiment, the case 204 has an outer cylindrical surface and the housing 208 has a cylindrical inner surface, which has a diameter slightly larger than the diameter of the outer cylindrical surface of the case 204. The outside of the case 204 and the inside of the housing 208 may be made of or coated with dissimilar materials to reduce potential for binding between the case 204 and the housing 208. For example, the case 204 may be coated with a non-stick coating while the housing 208 may be made of an ABS plastic. Example dissimilar materials are available under the respective trademarks Teflon® and Lexan®.

The generator 200 further includes an end 210, which can be a threaded end cap, for example, closing an open end of the housing 208. The generator 200 further includes a spring 212 supported by the end 210 configured to be selectively compressed by the magnet assembly 202 and to move the magnet assembly 202 away from the end 210. The generator 200 further includes an end 214 which could be a threaded end cap or merely a closed end, and a spring 216 configured to be selectively compressed by the magnet assembly 202 and to move the magnet assembly 202 away from the end 214. In some embodiments, the springs 212, 216 may be configured to remain in a compressed state.

The generator 200 further includes at least one coil 218 supported by the housing. While other coil positions are possible, in the illustrated embodiment, the housing 208 has an outer surface, which is cylindrical in the illustrated embodiment, and the coil is wrapped around the outer surface of the housing 208. The coil 218 is positioned radially outwardly of the housing 208 and the magnet assembly 202 inside the housing 208. The coil 218 can be retrained against longitudinal movement relative to the housing 208 by glue, grooves, notches, or protrusions in the housing, or by any other desired method, or can be molded into the housing, supported on the interior of the housing, etc. The coil 218 is positioned to be acted on by the compressed magnetic fields generated by the magnetic structure 202.

In some embodiments, the generator 200 as an assembly is merely supported in a location that would be exposed to motion. In other embodiments, a mechanical linkage is provided to couple the generator 200, as an assembly, to motion. For example, the bottom 214 could be coupled to a source of motion or movement. In some embodiments, period maintenance could be facilitated. For example, the top 210 could be removable for cleaning or maintenance or replacement of magnets, if desired. Some embodiments may be maintenance free. For example, embodiments of a generator 200 employed in a battery (See FIGS. 33-35), may be designed to last for the life of the battery without periodic maintenance. For example, the generator 200 may be evacuated and hermetically sealed in some embodiments.

In some embodiments, an accelerometer is provided in the desired application and the frequency constant of the motion is determined. The spring constants of the springs and mass of the magnets are then customized so that the magnet assembly 202 resonates in the housing 208 when there is energy available.

Figure 28:
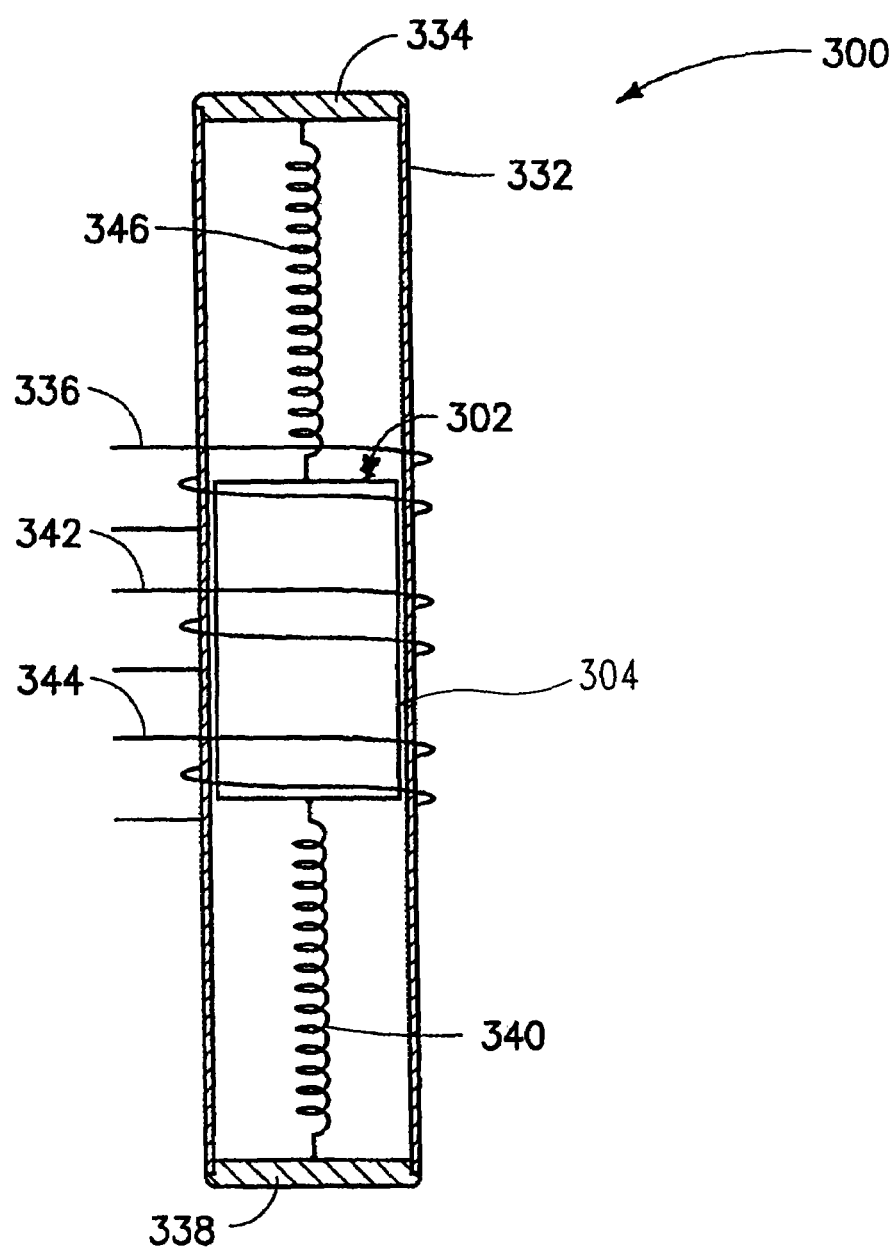
FIG. 28 is a side cross-sectional view of another embodiment of a system in accordance with the present disclosure.

FIG. 28 shows a generator 300, which is similar to the generator 200 except that multiple coils are used. The generator 300 has a magnetic structure or assembly 302 configured to generate one or more compressed magnetic fields. Multi-pole magnetic structures configured to generate multiple compressed magnetic fields, such as embodiments of the magnetic structures illustrated in FIGS. 16 and 18 through 21, may be advantageously employed as the magnetic structure 302 in embodiments of the generator 300. The magnet structure 302 includes a case 304.

The generator 300 further includes a housing 332 in which the magnet structure 302 is supported for linear motion. In the illustrated embodiment, the case 304 has an outer cylindrical surface and the housing 332 has a cylindrical inner surface, which has a diameter slightly larger than the diameter of the outer cylindrical surface of the case 304. The generator 300 further includes an end 334, which can be a threaded end cap, for example, closing an open end of the housing 332. The generator 300 further includes a spring 346 supported by the end 334. The spring 346 is configured to be selectively compressed by the magnet assembly 302 and to move the magnet assembly 302 away from the end 334. The generator 300 further includes an end 338 which could be a threaded end cap or merely a closed end, and a spring 340 is arranged to be selectively compressed by the magnet assembly 302. The spring 340 is arranged to move the magnet assembly 302 away from the end 338.

The generator 300 further includes a first coil 336 supported relative to the magnets such that the first coil 336 is selectively acted on by fields from at least one pair of opposed ends of magnets, but possibly by fields from additional pairs of opposed ends of magnets, depending on movement of the magnet assembly 302. The generator 300 further includes a second coil 342 supported relative to the magnets such that the second coil 342 is selectively acted on by fields from at least one pair of opposed ends of magnets, but possibly by fields from additional pairs of opposed ends of magnets, depending on movement of the magnet assembly 302. In the illustrated embodiment, the generator 300 further includes a third coil 344 supported relative to the magnets such that the third coil 344 is selectively acted on by fields from at least one pair of opposed ends of magnets, but possibly by fields from additional pairs of opposed ends of magnets, depending on movement of the magnet assembly 302. Any number of coils can be employed. Any number of pairs of opposed ends of magnets can be employed to act on one or more coils.

Figure 29:
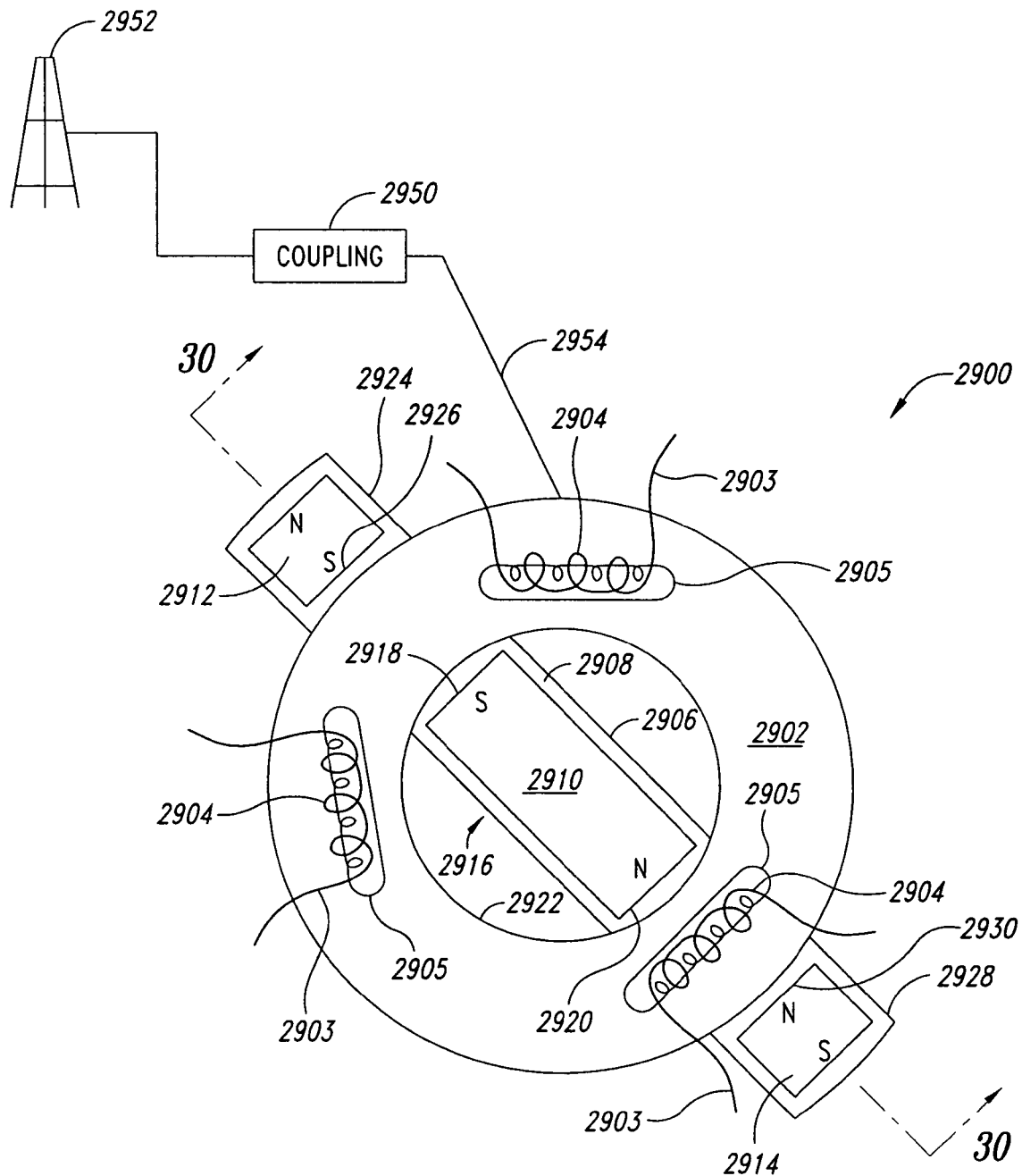
FIG. 29 is a top view of a system in accordance with the present disclosure.
Figure 30:
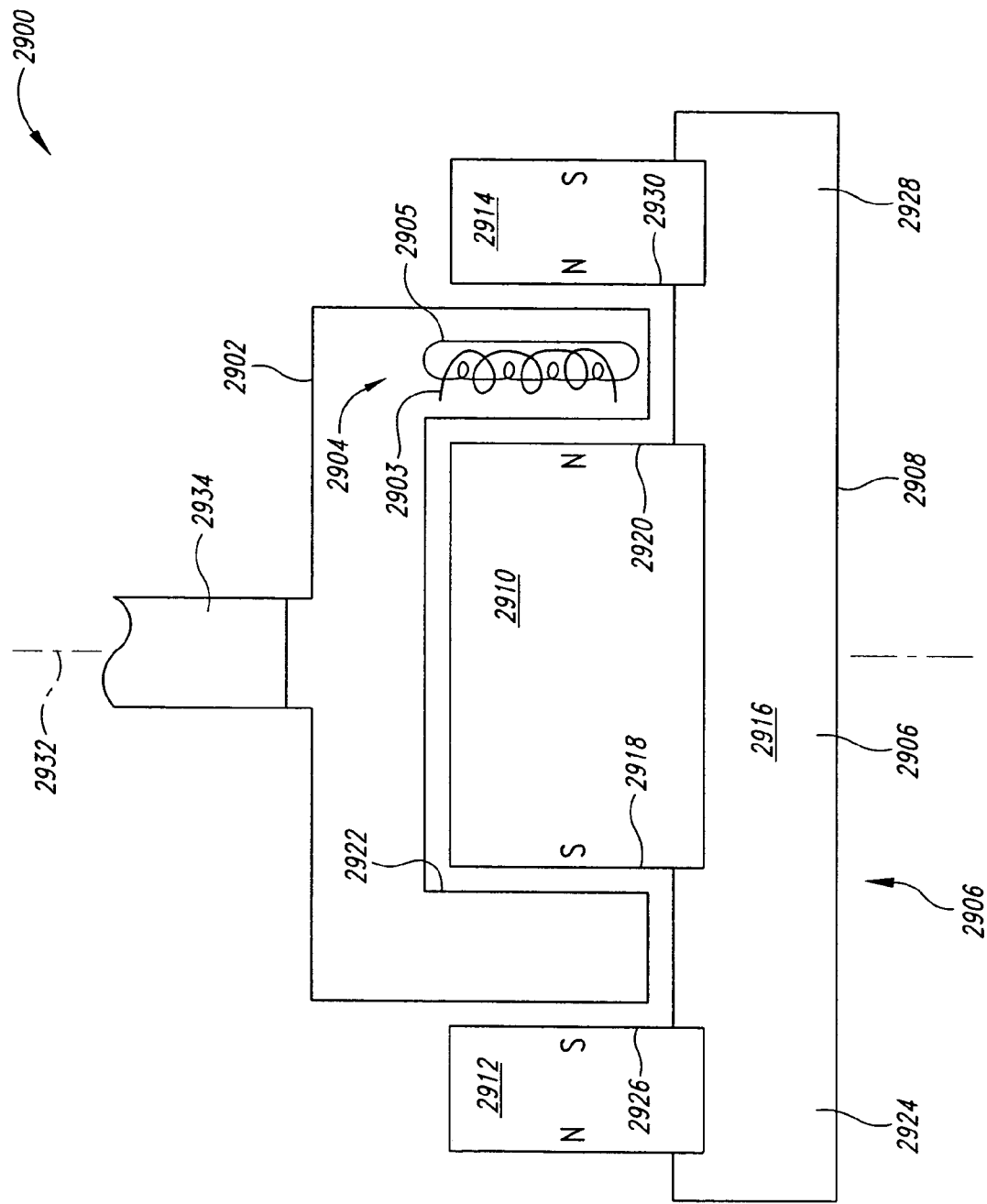
FIG. 30 is a side diametric cross-sectional view of the system of FIG. 29 taken along line 30-30.

FIG. 29 illustrates an embodiment of a system 2900 employing a magnetic structure configured to generate a compressed, high gradient magnetic field and a dual conductor or bi-metal coil. FIG. 30 is a diametric side cross sectional view of the system 2900 of FIG. 29 taken along line 30-30. FIG. 30 is not to scale with respect to FIG. 29 and some of the detail is omitted from FIG. 30 to facilitate illustration. The system 2900 comprises a rotor 2902 comprising one or more bi-metal coils 2904. Each bi-metal coil 2904 comprises an electrical conductive winding 2903 and a magnetic conductive winding 2905. Embodiments of the bi-metal coils illustrated in FIGS. 2-3 and 5-11 may be advantageously employed in embodiments of the system 2900 illustrated in FIG. 29. Some embodiments may comprise a magnetic structure configured to generate a compressed magnetic field and a conventional coil. Other embodiments may comprise a bi-metal coil and a conventional magnetic structure.

The 2900 also comprises a stator 2906 comprising a magnet support 2908 and a plurality of permanent magnets 2910, 2912, 2914. A first magnet 2910 of the plurality of magnets is coupled to a central portion 2916 of the magnet support 2908. The first magnet 2910 is oriented such that its poles 2918, 2920 face opposite sides of an inner circumference 2922 of the rotor 2902. The second magnet 2912 in the plurality of magnets is coupled to a first outer portion 2924 of the magnet support 2908. The second magnet 2912 is oriented such that a pole 2926 of the second magnet 2912 faces the like pole 2918 of the first magnet 2910. As illustrated, the like poles 2918, 2926 are the south poles of the respective first and second permanent magnets 2910, 2912. The third magnet 2914 in the plurality of magnets is coupled to a second outer portion 2928 of the magnet support 2908. The third magnet 2914 is oriented such that a pole 2930 of the third magnet 2914 faces the like pole 2920 of the first magnet 2910. As illustrated, the like poles 2920, 2930 are the north poles of the respective first and third permanent magnets 2910, 2914. The magnets 2910, 2912, 2914 are positioned such that a plurality of compressed magnetic fields are generated. In the illustrated embodiment the rotor 2902 is coupled to a mechanical transmission system 2934. In some embodiments, the magnet support 2906 may be part of the rotor and the bi-metal coils 2904 may be part of the stator.

As illustrated, the system 2900 comprises a coupling 2950 for coupling the coils 2904 to a power grid 2952. Details of the electrical connection 2954 between the coils 2904 and the coupling 2950 are omitted for clarity. A bus system coupled to the electrical conductive windings 2903, for example, may be employed as the electrical connection 2954 between the coils 2904 and the coupling 2950. The coupling 2950 may comprise control and/or conditioning modules (not shown).

In some embodiments, the system 2900 may be configured to operate as a generator. In such embodiments, force applied to the rotor 2902 by the mechanical transmission system 2934 may cause the rotor 2902 to rotate with respect to the stator

2906. As the rotor 2902 rotates with respect to the stator 2906 along an axis 2932 illustrated by the dashed line B-B, a three-phase alternating current may be generated by the system 2900.

In some embodiments, the system 2900 may be configured to operate as a motor. In such embodiments, an electrical signal applied to the coils 2904 may cause the rotor 2902 to rotate with respect to the stator 2906. As the rotor 2902 rotates with respect to the stator 2906 along an axis 2932 illustrated by the dashed line B-B, a force is applied to the mechanical transmission system 2934 by the rotor 2902. In some embodiments, the system 2900 may be configured to selectively operate as a motor or as a generator. In some embodiments, the system 2900 may be advantageously configured to operate at a desired voltage level, in a desired voltage range, and/or at a desired frequency. For example, the system 2900 may be configured to produce 110-120 volts AC at 50/60 Hz, 220-240 volts AC at 50/60 Hz, 10 kV AC at 50/60 Hz, or 100 kV at 50/60 Hz. In some embodiments, the system 2900 may be figured to produce alternating and/or direct current.

Figure 31:
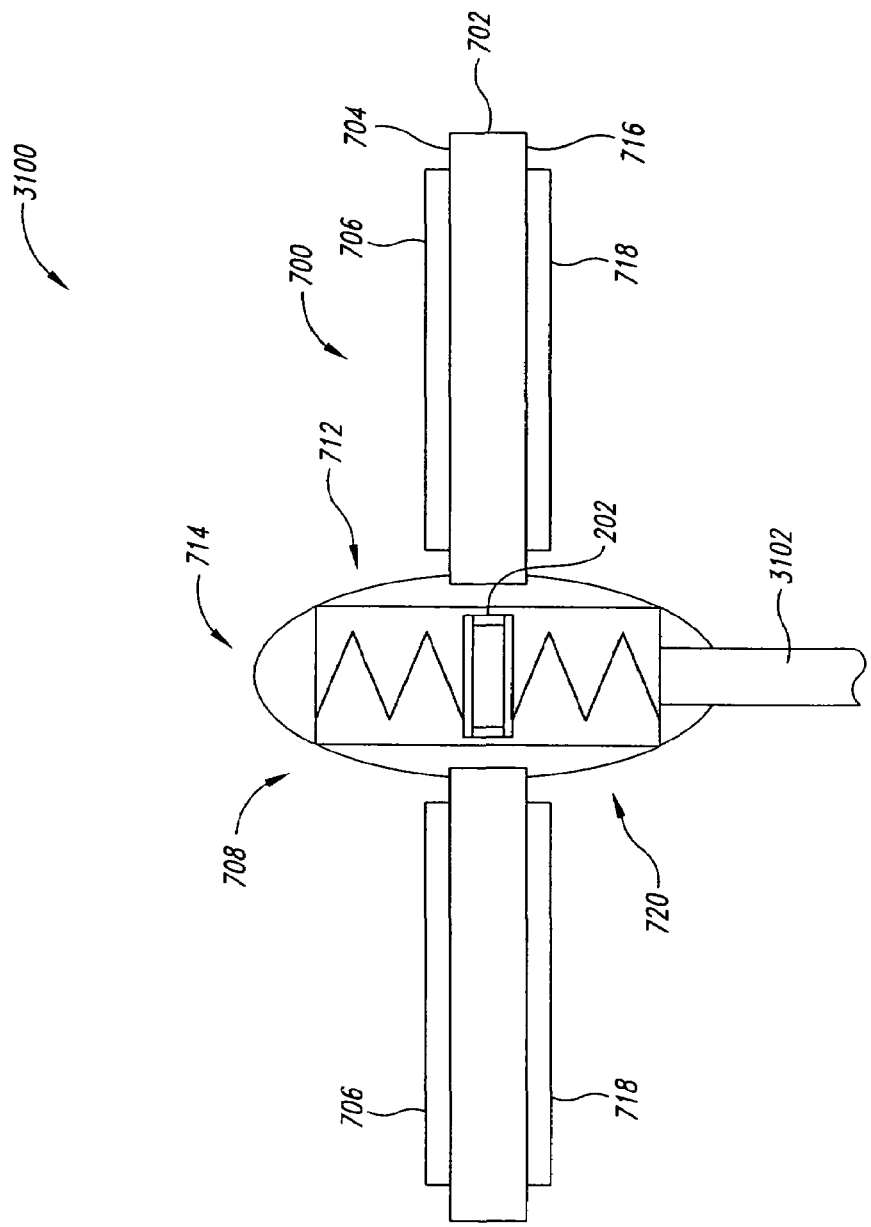
FIG. 31 is a side diametric cross-sectional view of an embodiment of a system employing the embodiments illustrated in FIGS. 7 through 9 and FIG. 17.

FIG. 31 illustrates a side cross-sectional view of an embodiment of a system 3100 employing a dual conductor or bi-metal coil 700 and a magnetic structure 202 configured to generate a compressed, high gradient magnetic field. For convenience, the system 3100 will be described with respect to the bi-metal coil 700 illustrated in FIGS. 7 through 9 and the magnetic structure 202 illustrated in FIG. 17. Other embodiments of bi-metal coils and magnetic structures configured to generate compressed magnetic fields may be employed in embodiments of the system 3100.

FIG. 31 is not necessarily to scale for ease of illustration. The bi-metal coil 700 comprises a layer of insulating material 702 with an upper surface 704. The layer of insulating material 702 may comprise, for example, an integrated circuit board, a substrate or a thin film or sheet of insulation. Commercially available insulating materials are sold under the trademark Mylar®. An electrical conductive trace 706 is formed on the upper surface 704 of the layer of insulating material 702. The electrical conductive trace 706 may comprise any suitable electrical conductive material, such as, for example, copper, aluminum, gold, and silver, and alloys. The materials discussed above with respect to the electrical conductive winding 204 of FIG. 2 may be employed. Well-known techniques for forming traces on substrates may be employed, such as those used in connection with RFID devices and antennas. The layer of insulating material 702 has an opening 708 through which the magnetic structure 202 may move. An upper portion 712 of a suspension system 714 is coupled to the magnetic structure 202 and to the upper surface 704 of the layer of insulating material 702. The layer of insulating material 702 has a lower surface 716. A magnetic conductive trace 718 is formed on the lower surface 716 of the layer of insulating material 702. The magnetic conductive trace 718 may comprise any suitable magnetic conductive material, such as, for example, nickel, nickel/iron alloys, nickel/tin alloys, nickel/silver alloys. The materials discussed above with respect to the magnetic conductive winding 206 of FIG. 2 may be employed. Well-known techniques for forming traces on substrates may be employed, such as those used in connection with RFID devices and antennas. A lower portion 720 of the suspension system 714 is coupled to the magnetic structure 202 and to the lower surface 716 of the layer of insulating material 702. The suspension system 714 is coupled to an optional mechanical transmission system 3102.

In some embodiments, the system 3100 may be configured to operate as a generator. In such embodiments, mechanical force applied to the suspension system 714 by the mechanical transmission system 3102 may cause the magnetic structure 202 to move linearly with respect to the bi-metal coil 700, which may cause the device to generate an electric current. In some embodiments, the system 3100 may be configured to operate as a motor. In such embodiments, an electrical signal applied to the bi-metal coil 700 may cause the magnetic structure 202 to move linearly with respect to the bi-metal coil 700, which may cause the suspension system 714 to apply a mechanical force to the mechanical transmission system 3102. In some embodiments, the system 3100 may be configured to selectively operate as a motor or as a generator.

Figure 32:
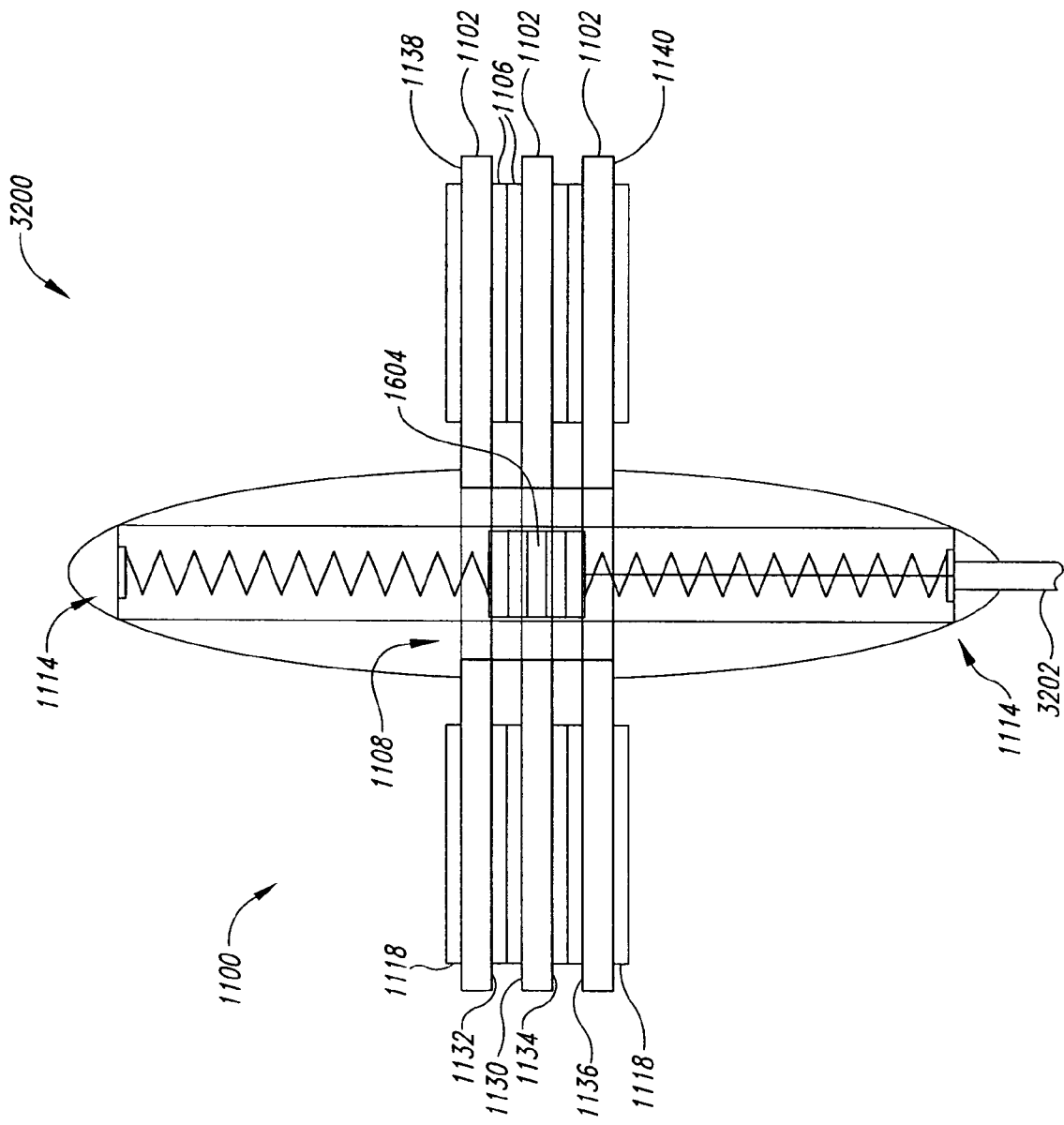
FIG. 32 is a side diametric cross-sectional view of an embodiment of a system employing the embodiments illustrated in FIG. 11 and FIG. 16.

FIG. 32 illustrates a side cross-sectional view of an embodiment of a system 3200 employing a dual conductor or bi-metal coil 1100 and a magnetic structure 1604 configured to generate a compressed, high gradient magnetic field. For convenience, the system 3200 will be described with respect to the bi-metal coil 1100 illustrated in FIG. 11 and the magnetic structure 1604 illustrated in FIG. 16. Other embodiments of bi-metal coils and magnetic structures configured to generate compressed magnetic fields may be employed in embodiments of the system 3200.

FIG. 32 is not necessarily to scale for ease of illustration. The bi-metal coil 1100 comprises a plurality of insulating layers 1102. Traces of electrical conductive material 1106 are formed on selected surfaces 1130, 1132, 1134, 1136 of the plurality of insulating layers 1102. Traces of magnetic conductive material 1118 are formed on selected surfaces 1138, 1140 of the plurality of insulating layers 1102. A suspension system 1114 moveably suspends a magnetic structure 1900 in an opening 1108 in the plurality of layers of insulating material 1102. As illustrated, the bi-metal coil 1100 comprises three layers of insulating material 1102. Fewer or additional layers 1102 may be employed. In addition, in some embodiments the traces of electrical conductive material 1106 and the traces of magnetic conductive material 1118 may be formed on selected surfaces of the layers of insulating material 1102 in different patterns. For example, traces of electrical conductive material 1106 and traces of magnetic conductive material 1118 may be formed on alternate surfaces of layers of insulating material. In another example, traces of electrical conductive material 1106 and magnetic conductive material 1118 may be formed on the same surface of a layer of insulating material 1102, or on each surface of a layer of insulating material. Traces on various layers of insulating material 1102 may be coupled to each other. The suspension system 1114 is coupled to an optional mechanical transmission system 3202.

In some embodiments, the system 3200 may be configured to operate as a generator. In such embodiments, mechanical force applied to the suspension system 1114 by the mechanical transmission system 3202 may cause the magnetic structure 1900 to move linearly with respect to the bi-metal coil 1100, which may cause the system to generate an electric current. In some embodiments, the system 3200 may be configured to generate an alternating current and/or a direct current. In some embodiments, the device system may be configured to operate as a motor. In such embodiments, an electrical signal applied to the bi-metal coil 1100 may cause the magnetic structure 1900 to move linearly with respect to the bi-metal coil 1100, which may cause the suspension system 1114 to apply a mechanical force to the mechanical transmission system 3202. In some embodiments, the system 3200 may be configured to selectively operate as a motor or as a generator.

Battery technology is a one example application in which embodiments of a bi-metal coil and/or a magnetic structure configured to generate a compressed magnetic field may be advantageously employed, as will be illustrated with a limited number of examples.

Figure 33:
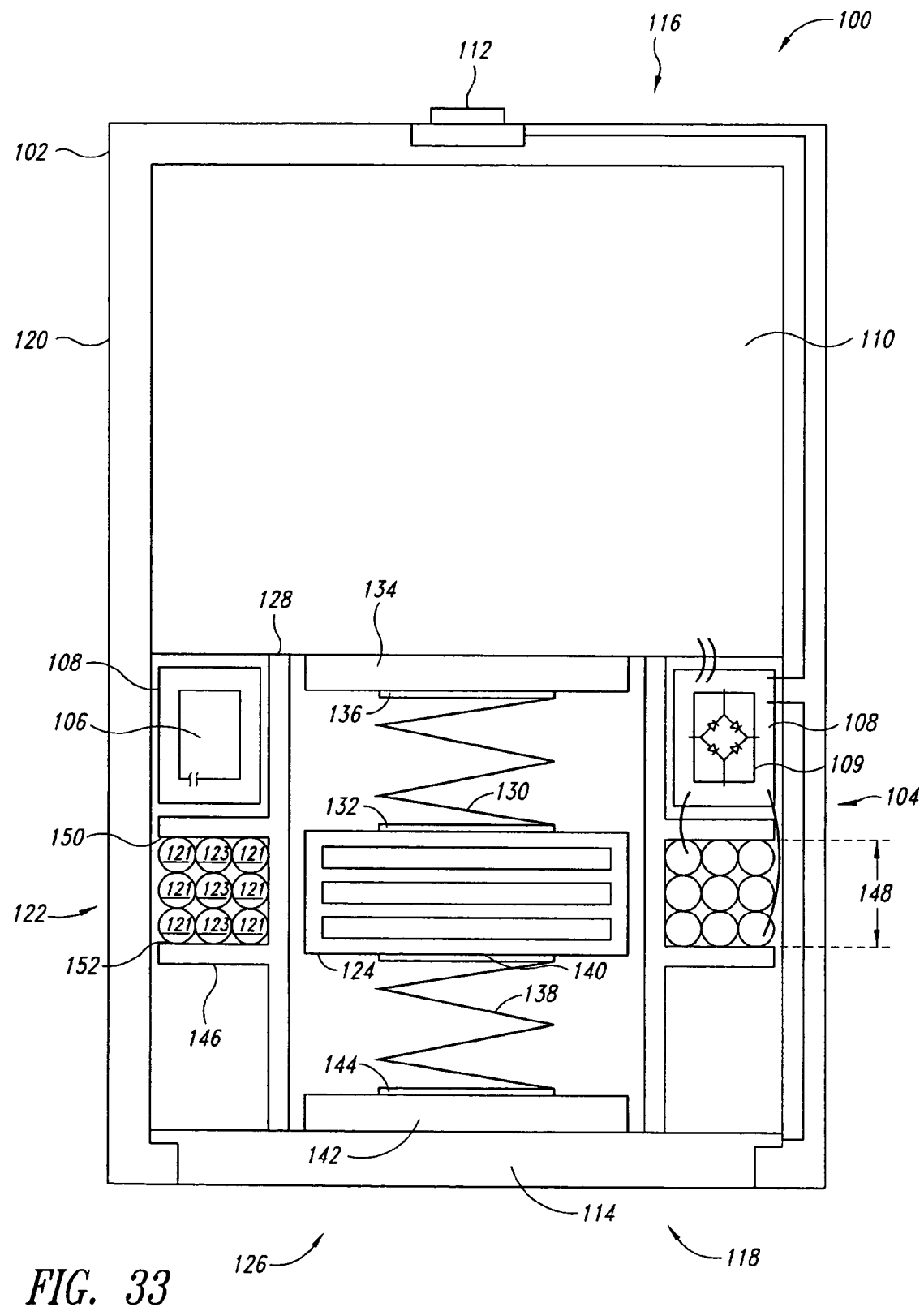
FIG. 33 is a diametric cross-sectional view of an embodiment of a battery.

FIG. 33 is a diametric cross-sectional view of an embodiment of a battery 100 comprising a case 102, a generator 104, a first energy storage device 106, a control module 108, a second energy storage device 110, and contact terminals 112, 114. The case 102 as illustrated is cut-away so as to facilitate illustration of other components of the battery 100. The case 102 contains the generator 104, the first energy storage device 106, the control module 108, and the second energy storage device 110. The contact terminals 112, 114 are mounted to the case 102 at a top 116 and bottom 118, respectively, of the battery 100.

The case 102 may comprise an outer case shielding 120, which may be a magnetic and/or electrical shield. The case shielding 120 may comprise, for example, a layer of tin foil, a layer of a magnetic shielding material, such as, for example, nickel, nickel/iron alloys, nickel/tin alloys, nickel/silver alloys, nickel/iron/copper/molybdenum alloys, which may also take the form of a foil. Such foil layers may, for example, have a thickness in the range of 0.002-0.004 inches. Magnetic shielding materials are commercially available under several trademarks, including MuMetal®, Hipernom®, HyMu 80®, and Permalloy®.

In some embodiments, the case 102 and contact terminals 112, 114 may take the external configuration of those of a conventional battery, such as, for example, a AA-cell, a AAA-cell, a C-cell, a D-cell, a 9-volt battery, a watch battery, a pacemaker battery, a cell-phone battery, a computer battery, and other standard and non-standard battery configurations. Embodiments of the battery 100 may be configured to provide desired voltage levels, including, for example, 1.5 volts, 3.7, 7.1, 9-volts, and other standard and non-standard voltages. Embodiments may be configured to provide direct and/or alternating current.

The generator 104 converts kinetic energy into electrical energy. As illustrated the generator 104 is a linear generator comprising a bi-metal coil 122, a magnetic structure 124 and a suspension system 126. As illustrated, the bi-metal coil 122 comprises an electrical conductive winding 121 and a magnetic conductive winding 123. As illustrated, the suspension system 126 comprises a magnetic structure carrier guide 128, a first spring 130 coupled at one end 132 to the magnetic structure 124, a first repelling magnet 134 coupled to the other end 136 of the first spring 130, a second spring 138 coupled at one end 140 to the magnetic structure 124, and a second repelling magnet 142 coupled to the other end 144 of the second spring 138. The suspension system 126 facilitates movement of the magnetic structure 124, in response to movement of the battery, along an axis A-A with respect to the coil 122. The movement of the magnetic structure 124 relative to the coil 122 generates a current in the coil 122. The suspension system 126 may comprise, for example, stainless steel springs, such as 304 or 316 stainless steel springs. The magnetic structure 124 may comprise, for example, one or more rare earth magnets, such as neodymium-iron-boron permanent magnets, one or more ceramic magnets, one or more plastic magnets, or one or more other magnets. The repelling magnets 132, 142 may comprise, for example, one or more rare earth magnets, one or more ceramic magnets, one or more plastic magnets, or one or more other magnets. As illustrated, the carrier guide 128 comprises a winding form 146 upon which one or more windings of the coil 122 are wound. In some embodiments, a separate winding form may be employed. The suspension system 126 is configured to permit the magnetic structure 124 to pass completely out of a region 148 defined by a top 150 and a bottom 152 of the coil 122. The springs 130, 138 are typically configured in a loaded condition.

The first energy storage device 106 is configured to store electrical energy generated by the generator 104. In one embodiment, the first energy storage device 106 is capable of storing electrical energy generated by the generator 104 with little or no conditioning. In other embodiments, electrical energy may be conditioned before it is stored in the first energy storage device 106, as discussed by way of example below. The first energy storage device 106 may comprise, for example, one or more ultracapacitors. For ease of illustration, the first energy storage device 106 is illustrated as a functional block.

The control module 108 controls the transfer of energy within the battery 100. The control module 108 typically comprises a rectifier, which as illustrated is a full bridge rectifier 109. For example, the control module 108 may be configured to control the transfer of energy between various components of the battery 100, such as the generator 104, the first energy storage device 106, the second energy storage device 110, and the contact terminals 112, 114. In one embodiment, the control module 108 may also control the transfer of energy from the generator 104 to the first energy storage device 106. In one embodiment, the control module 108 controls the transfer of energy stored in the first energy storage device 106 to the second energy storage device 110. For example, the control module 108 may limit the current flow from the first energy storage device 106 to the second energy storage device 110. In another example, the control module 108 may stop the transfer of energy from the first energy storage device 106 to the second energy storage device 110 to avoid overcharging the second energy storage device 110. In one embodiment, the control module 108 may be configured to stop the transfer of energy to the first energy storage device 106 to avoid overcharging the first energy storage device 106. In one embodiment, the control module 108 may be configured to control the transfer of energy from the first energy storage device 106 to the contact terminals 112, 114. In one embodiment, the control module may be configured to control the transfer of energy from the generator to the contact terminals 112, 114. In one embodiment, the control module 108 also may be configured to detect, control, permit, accept, regulate and/or to facilitate charging of the first energy storage device 106 and/or the second energy storage device 110 from an external source of electrical energy, such as a conventional battery charger (not shown), or ambient sources of energy. In one embodiment, the control module 108 is configured to condition energy during a transfer. The operation of the control module 108 in two exemplary embodiments is discussed in more detail below in the description of FIGS. 37 and 38.

The control module 108 may be implemented in a variety of ways, including as a combined control system or as separate subsystems. The control module 108 may be implemented as discrete circuitry, one or more microprocessors, digital signal processors (DSP), application-specific integrated circuits (ASIC), or the like, or as a series of instructions stored in a memory and executed by a controller, or various combinations of the above. In some embodiments, the first energy storage device 106 may be integrated into the control module 108.

The second energy storage device 110 is configured to store electrical energy transferred from the first energy storage device 106 under the control of the control module 108. The second energy storage device 110 may comprise, for example, one or more conventional batteries, such as a leadacid battery, a nickel-cadmium battery, a nickel-metal hydride battery, a lithium polymer battery or lithium ion battery, a sodium/sulfur battery, or any suitable rechargeable energy storage device.

The contact terminals 112, 114 provide access for transferring electrical energy to and/or from the battery 100. The contact terminals 112, 114 may be made of any electrically conductive material, such as, for example, metallic materials, such as copper, copper coated with silver or tin, aluminum, gold, etc. The contact terminals 112, 114 are coupled to the control module 108. In some embodiments, the contact terminals 112, 114 may be coupled to the second energy storage device 110, instead of being directly coupled to the control module 108. As illustrated, the contact terminals 112, 114 have a physical configuration similar to the contact terminals of a conventional C-cell battery. As discussed above, other configurations may be employed. The contact terminals 112, 114 are configured to permit the battery 100 to be easily installed into and removed from external devices, such as, for example, a radio, a cell phone, or a positioning system. The contact terminals 112, 114 may employ magnetic shielding.

Energy may be stored in the battery 100 as a result of movement of the battery 100. For example, if the magnetic structure 124 is neutral with respect to the coil 122 and the battery 100 is subject to a downward movement, the magnetic structure 124 may move up with respect to the coil 122 in response to the downward movement of the battery 100. The relative upward movement of the magnetic structure 124 will result in the generation of a current in the coil 122 when it passes above the top of the coil 150. As the magnetic structure 124 approaches the first repulsive magnet 134, the first spring 130 and the first repulsing magnet 134 will apply downward forces to the magnetic structure 124. In response to the downward forces, the magnetic structure 124 may begin to move downward with respect to the coil 122. It may pass through neutral 151, a location approximately midway between 150 and 152, and pass through the coil 122 again, generating additional electrical current when it passes below the bottom of the coil 152. When the magnetic structure 124 approaches the second repulsing magnet 142, the second spring 138 and the second repulsing magnet 142 will apply upward forces to the magnetic structure 124. If the upward forces are sufficiently strong, the magnetic structure 124 will again pass through the coil 122 again, and generate additional electrical current. The movement may continue in an oscillatory back and forth fashion until there is insufficient energy in the suspension system 126 to continuing moving the magnetic structure 124 with respect to the coil 122.

In some embodiments the suspension system 126 may be tuned to increase the electrical energy generated from anticipated sources of energy. For example, if the battery 100 will frequently be in an environment where energy is supplied by an individual walking or running at a known speed or rate, the suspension system 126 may be tuned to that speed or rate. Thus, a battery may be configured to substantially maximize the conversion of energy expected to be generated by a jogger into electrical energy. In another example, if the battery 100 will frequently be subject to stop and go traffic in an automobile or irregular motion from a flight or ground vehicle, the suspension system 126 may be tuned to maximize the conversion of the energy of that environment into electrical energy. In another example, if the battery will be employed in an environment frequently subjected to fluid waves, such as water or sea waves, or wind, the suspension system may be tuned to maximize the conversion of the energy of that environment into electrical energy. In another example, if the battery will be frequently subjected to vibrations, for example, in a moving vehicle, the suspension system may be tuned to maximize the conversion of the energy received from the vibrations into electrical energy. The suspension system may be tuned, for example, by modifying the strength of any repelling magnets, adjusting the tension in any repelling devices, such as springs, employing multiple mechanical repelling devices (see FIG. 36), modifying the length of the path of travel of the magnetic structure, or combinations of modifications. Other suspension systems may be employed, such as, for example, suspension systems which orient the generator in different directions within the battery. The suspension system 126 may be gimbaled and/or may employ gyroscopic principles to orient the generator to facilitate optimal conversion of energy into electrical energy. Multiple generators within a battery with different orientations may be employed and multiple battery configurations may be employed.

In some embodiments, other generator configurations may be employed, such as, for example, radial, rotational, Seebeck, acoustic, thermal, or radio-frequency generators. In some embodiments, other suspension systems may be employed, such as suspension systems in which the generator 104 may move with respect to the case 102 so as to take maximum advantage of the available forms of energy. For example, the generator 104 may be configured to rotate in the battery case 102, so as to align itself with an axis of movement. In another example, the suspension system 126 may be configured to allow the coil 122 to move with respect to the magnetic structure 124.

Figure 34:
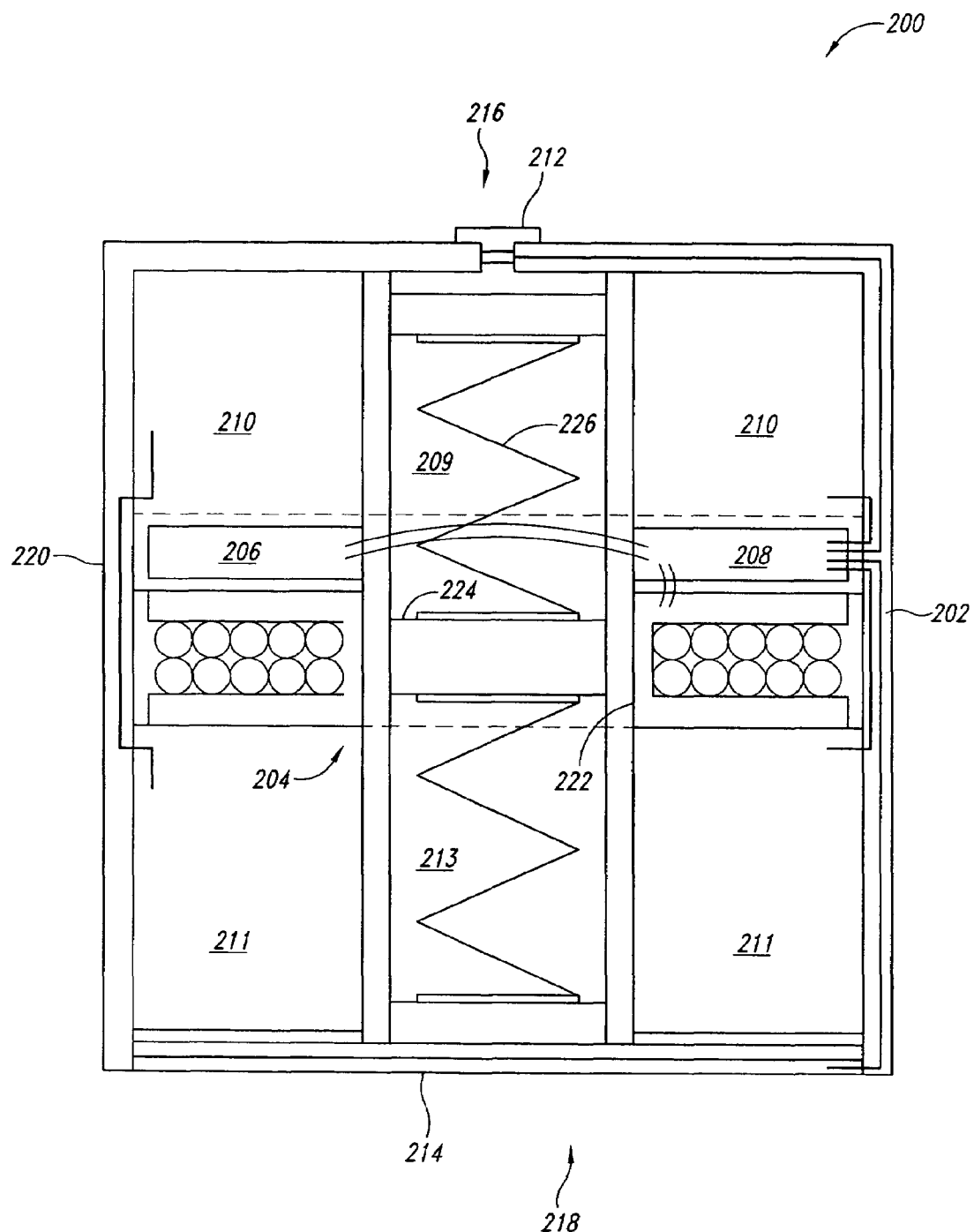
FIG. 34 is a diametric cross-sectional view of another embodiment of a battery.

FIG. 34 is a diametric cross-sectional view of another embodiment of a battery 200 comprising a case 202, a generator 204, a first energy storage device 206, a control module 208, a second energy storage device 210, a third energy storage device 211, and contact terminals 212, 214. The case 202 as illustrated is cut-away so as to facilitate illustration of other components of the battery 200. The case 202 contains the generator 204, the first energy storage device 206, the control module 208, the second energy storage device 210 and the third energy storage device 211. The contact terminals 212, 214 are mounted to the case 202 at a top 216 and bottom 218, respectively, of the battery 200. The case 202 may comprise an outer case shielding 220, which may be a magnetic and/or electrical shield. In some embodiments, the case 202 and contact terminals 212, 214 may take the configuration of those of a conventional battery, such as, for example, a M-cell, a AAA-cell, a C-cell, a D-cell, a 9-volt battery, a watch battery, a pacemaker, a cell-phone battery, a computer battery, and other standard and non-standard battery configurations. Embodiments of the battery 200 may be configured to provide desired voltage levels, as discussed above with respect to the embodiment illustrated in FIG. 33. For example, the voltage level can be modified by changing the number of turns in a winding (see, e.g., winding 410 of coil 402 in FIG. 36) of the coil 122.

The generator 204 converts received energy into electrical energy. As illustrated the generator 204 is a linear generator comprising a coil 222, a magnetic structure 224 and a suspension system 226. The generator 204 may operate, for example, as described above with respect to the generator 104 illustrated in FIG. 33.

The first energy storage device 206 is configured to store electrical energy generated by the generator 204. In one embodiment, the first energy storage device 206 is capable of storing electrical energy generated by the generator 204 with little or no conditioning. The first energy storage device 206 may comprise, for example, one or more ultracapacitors.

The control module 208 controls the transfer of energy between the various components of the battery 200, such as the generator 204, the first energy storage device 206, the second energy storage device 210, the third energy storage device 211, and the terminals 212, 214. For example, the control module 208 may control the transfer of stored in the first energy storage device 206 to the second energy storage device 210 and to the third energy storage device 211. In one embodiment, the control module 208 may also control the transfer of energy from the generator 204 to the first energy storage device 206. For example, the control module 208 may limit the current flow from the first energy storage device 206 to the second energy storage device 210 and to the third energy storage device 211. In another example, the control module 208 may stop the transfer of energy from the first energy storage device 206 to the second energy storage device 210 and to the third energy storage device 211 to avoid overcharging the second and third energy storage devices 210, 211. In one embodiment, the control module 208 may be configured to detect, control, permit, and/or to facilitate charging of the first, second and/or third energy storage devices 206, 210, 211 from an external source of electrical energy (not shown) coupled to the terminals 212, 214.

The control module 208 may be implemented in a variety of ways. For example, the control module may be implemented as described above in the description of the control module 108 of FIG. 33.

The second and third energy storage devices 210, 211 are configured to store electrical energy transferred from the first energy storage device 206 under the control of the control module 208. The second and third energy storage devices 210, 211 may comprise, for example, conventional rechargeable batteries, such as nickel-cadmium batteries, nickel-metal hydride batteries, lithium polymer batteries or lithium ion batteries, other energy storage devices, or combinations of energy storage devices. The second and third energy storage devices may be coupled to the control module 208, for example, separately, in series, or in parallel. As illustrated, the second and third energy storage devices 210, 211 are washer-shaped with the suspension system 226 extending into hollow centers 209, 213 of the second and third energy storage devices 210, 211. As illustrated the second and third energy storage device 210, 211 are connected in series between the first and second contact terminals 212, 214 and in series to the control module 208. Some embodiments may employ dissimilar metals to take advantage of the Seebeck effect.

The contact terminals 212, 214 provide access for transferring electrical energy to and from the battery 200. The contact terminals 212, 214 may be made of any electrically conductive material, such as, for example, metallic materials, such as copper, copper coated with silver or tin, aluminum, gold, etc. The contact terminals 212, 214 are coupled to the second and third energy storage devices 210, 211. The second and third energy storage devices 210, 211 may be coupled to the contact terminals in parallel or in series. In some embodiments, the contact terminals 212, 214 may be coupled to the control module 208, instead of being directly coupled to the second and third energy storage devices 210, 211. As illustrated, the contact terminals 212, 214 have the physical configuration of the contact terminals of a conventional C-cell battery. As discussed above, other configurations may be employed. The contact terminals 212, 214 are typically configured to permit the battery 200 to be easily installed into and removed from external devices, such as, for example, a radio, a cell phone, or a positioning system. The contact terminals 212, 214 may employ magnetic shielding.

Energy may be stored in the battery 200 as a result of movement of the battery 200. For example, energy may be converted into stored energy in a manner similar to the example discussed above with respect to FIG. 33.

As discussed above, in some embodiments the suspension system 226 may be tuned to maximize the electrical energy generated from anticipated sources of kinetic energy.

In some embodiments, other generator configurations may be employed, such as, for example, rotational generators. In some embodiments, other suspension systems may be employed, such as, for example, suspension systems in which the generator 204 may move with respect to the case 202 so as to take maximum advantage of available kinetic energy. For example, the generator 204 may be configured to spin in the battery case 202, so as to align itself with an axis of movement. In another example, the suspension system 226 may be configured to allow coil 222 to move with respect to the magnetic structure 224.

Figure 35:
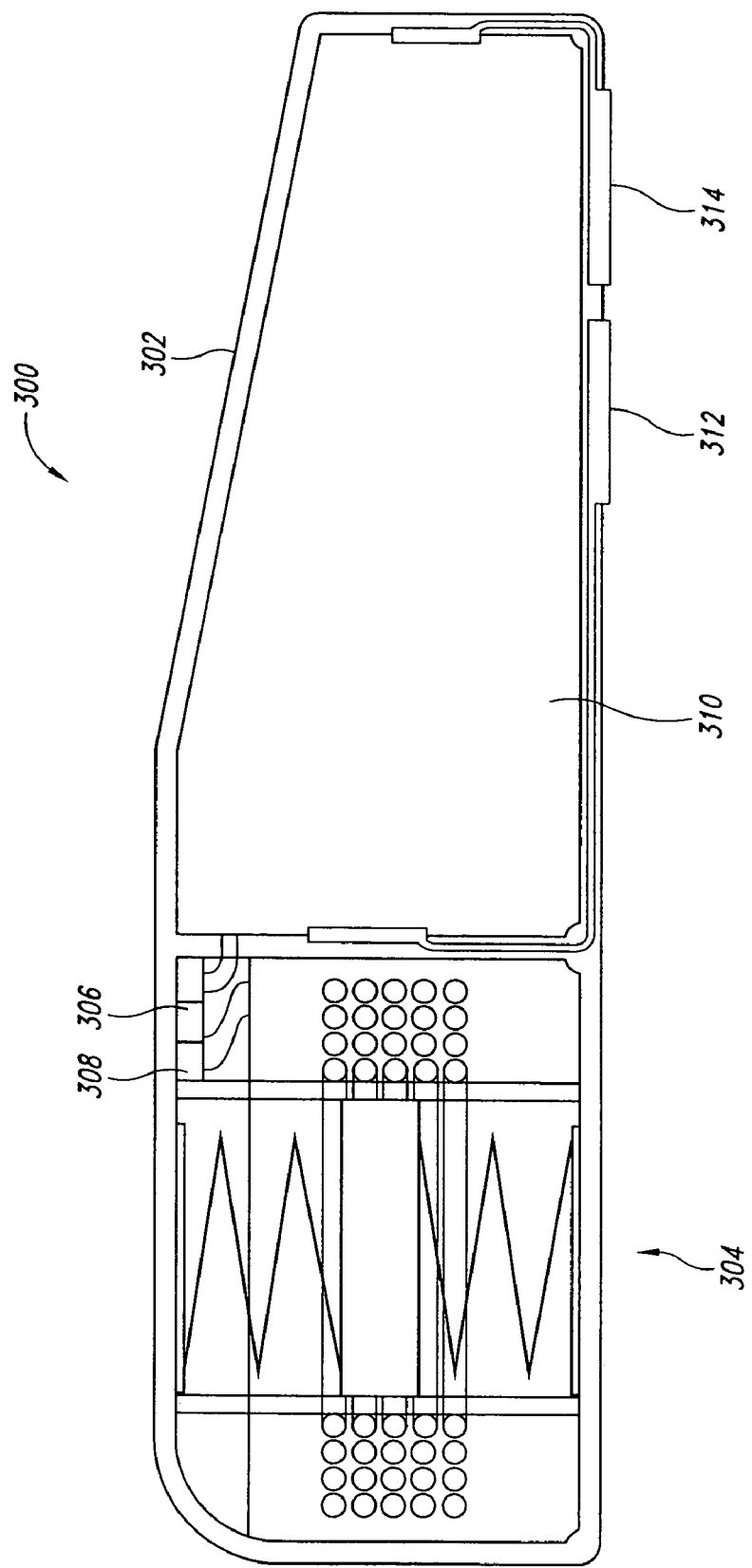
FIG. 35 is a side sectional view of another embodiment of a battery.

FIG. 35 is a side sectional view of another embodiment of a battery 300 comprising a case 302, a generator 304, a first energy storage device 306, a control module 308, a second energy storage device 310, and contact terminals 312, 314. The battery 300 has a different configuration than the battery 100 illustrated in FIG. 33, but the operation of the battery 300 is typically similar to the operation of the battery 100 illustrated in FIG. 33. The contact terminals 312, 314 may be made of any electrically conductive material, such as, for example, metallic materials, such as copper, copper coated with silver or tin, aluminum, gold, etc. In some embodiments, the contact terminals 312, 314, may be contained within a connector, such as a plastic connector.

Figure 36:
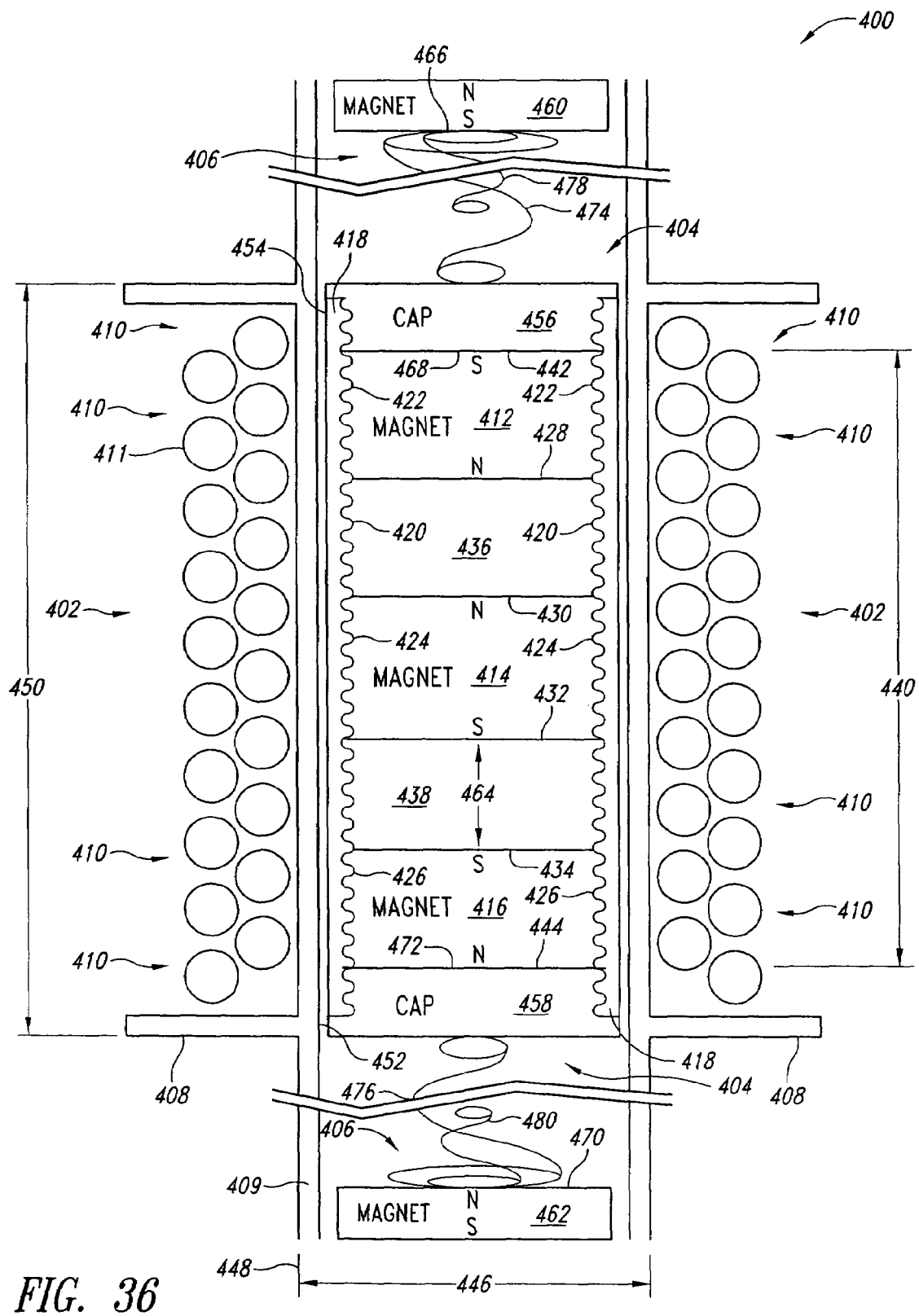
FIG. 36 is a diametric cross sectional view of a linear generator suitable for use in the embodiments illustrated in FIGS. 33 through 36.

FIG. 36 is a diametric cross-sectional view of a generator 400 suitable for use, for example, in the embodiments illustrated in FIGS. 33 through 35. Other generators and/or devices may be employed in the embodiments illustrated in FIGS. 33 through 35, such as, for example, the embodiments illustrated in FIGS. 22-32. The generator comprises a coil 402, a magnetic structure 404 configured to generate a compressed magnetic field (see, e.g., FIGS. 15 through 21) and a suspension system 406. The suspension system 406 is configured to allow the magnetic structure 404 to completely pass through the coil 402 in either direction. As illustrated, the generator 400 is a linear generator.

The coil 402 comprises a cylindrical winding form 408 and one or more windings 410. As illustrated, the winding form 408 is integrated with a carrier guide 409 of the suspension system 406. As illustrated, the coil 402 comprises a single winding 410. The winding 410 may comprise any electrically conductive and substantially non-magnetic conductive material, such as, for example, copper, aluminum, gold, and silver, and alloys. The winding 410 is typically covered with an insulating material 411. In some embodiments, additional windings comprising magnetic conductive and/or non-magnetic conductive material may be employed (See, e.g., FIGS. 2-11). The winding 410 may be, for example, solid material or may be comprised of strands of wire. Sheets of material may be employed in some embodiments. For example, a sheet comprising a copper layer and a Mylar® layer may be wound around the winding form 408.

The magnetic structure 404 comprises a plurality of permanent magnets 412, 414, 416 contained within a cylindrical magnet housing 418. While the illustrated embodiment employs three permanent magnets 412, 414, 416, other embodiments of the generator 400 may employ different numbers of permanent magnets, such as two permanent magnets, four permanent magnets or hundreds of permanent magnets. The permanent magnets 412, 414, 416 are disk-shaped as illustrated, but other shapes may be employed. For example, rectangular- (e.g., square), spherical-, or elliptical-shaped magnets may be employed. Similarly, the faces of the magnets need not be flat. For example, convex-, concave-, radial-, cone-, or diamond-shaped faces may be employed. Various combinations of shapes and faces may be employed. In some embodiments, electromagnets may be employed. The inside 420 of the magnet housing 418 and outsides 422, 424, 426 of the permanent magnets 412, 414, 416 are threaded so that the permanent magnets 412, 414, 416 can be fixed in position with respect to each other within the magnet housing 418. Other positioning mechanisms may be employed, such as tabs, spacers, glues, or combinations of positioning mechanisms.

The magnets 412, 414, 416 are positioned and held apart from each other and are arranged such that same polarity poles in adjacent permanent magnets face each other. For example, the N pole 428 of the first permanent magnet 412 faces the N pole 430 of the second permanent magnet 414 and the S pole 432 of the second permanent magnet 414 faces the S pole 434 of the third permanent magnet 416. In addition, the magnets 412, 414, 416 are held close enough together to form a compressed magnetic field (see the discussions of FIGS. 15 and 16). In some embodiments, the spaces 436, 438 between the permanent magnets 412, 414, 416 are substantially filled with a material 437, which may comprise a gas such as air. In some embodiments, the material 437 may comprise other substantially non-magnet and substantially non-conductive substances, such as a fluoropolymer resin or plastic. In some embodiments, the magnetic structure may be evacuated and hermetically sealed.

As noted above, the shape, position and strength of the permanent magnets in a magnetic structure, such as the magnetic structure 404, can increase the efficiency of the generator 400 by generating a compressed magnetic field. The ratio of the length 440 from the top 442 of the first permanent magnet 412 to the bottom 444 of the third permanent magnet 416 to the length of 446 of the inner diameter 448 of the winding form 408, also impacts the electrical current produced in response to movement of the magnetic structure 404 with respect to the coil 402. A gauss meter (not shown) may be employed to determine the optimum strength and positioning of the permanent magnets 412, 414, 416, as well as the number of permanent magnets and the length 440.

Other design considerations may be taken into consideration as well, such as weight and reducing external impacts of electromagnetic fields and impacts from external electromagnetic fields. In another example of an additional design consideration, the overall length 450 of the winding form 408 and the range of movement of the magnetic structure 404 in the suspension system may impact the stability of the generator 400. In one experimental embodiment, the first magnet 412 and the third magnet 416 had a strength of 450 gauss and the second magnet had a strength of 900 gauss and the permanent magnets 412, 414, 416 were separated by 2 mm. Factors in determining the desired spacing include the magnetic B-field strength. The repelling magnets 460, 462 each had a strength of 600 gauss. In another experimental embodiment, the first magnet 412, second magnet 414 and third magnet 416 had a strength of 12,600 gauss and the permanent magnets 412, 414, 416 were separated by 4-5 mm. The repelling magnets 460, 462 each had a strength of 9906 gauss. This resulted in a high-gradient field with a strength of approximately 16,800 gauss.

The inside 452 of the carrier guide 409 and the outside 454 of the magnet housing 418 are made of or coated with dissimilar materials to reduce potential for binding between the winding form 408 and the magnet housing 418. For example, the carrier guide 409 may be coated with a non-stick coating while the magnet housing 418 may be made of an ABS plastic. Example dissimilar materials are available under the respective trademarks Teflon® and Lexan®. The magnetic housing 418 also comprises a first threaded end cap 456 and a second threaded end cap 458.

The suspension system 406 comprises a first repelling permanent magnet 460 and a second repelling permanent magnet 462 that are fixed with respect to the coil 402 in the axis of movement 464 of the magnetic structure 404. The first repelling magnet 460 is positioned such that a like pole of the first repelling magnet 460 faces the like pole of the nearest permanent magnet 412 in the magnetic structure 404. As illustrated, the S pole 466 of the first repelling magnet 460 faces the S pole 468 of the first permanent magnet 412 of the magnetic structure 404. Similarly, the second repelling magnet 462 is positioned such that a like pole of the second repelling magnet 462 faces the like pole of the nearest permanent magnet 416 in the magnetic structure 404. As illustrated, the N pole 470 of the second repelling magnet 462 faces the N pole 472 of the third permanent magnet 416 of the magnetic structure 404. This arrangement increases the efficiency of the generator in converting kinetic energy into electrical energy and reduces the likelihood that the magnetic structure 404 will stall in the suspension system 406.

The suspension system 406 also comprises a first spring 474, a second spring 476, a third spring 478 and a fourth spring 480. The first spring 474 is coupled to the first repelling magnet 460 and to the first cap 456 of the magnetic structure 404. The first spring 474 is typically in a loaded condition. The second spring 476 is coupled to the second repelling magnet 462 and to the second end cap 458 of the magnetic structure 404. The second spring 476 is typically in a loaded condition. The first and second springs 474, 476 help to hold the magnetic structure 404 centered in the desired movement path along the axis 464, and impart forces to the magnetic structure 404 as they are compressed and stretched by movement of the magnetic structure 404 along the axis of movement 464. The third spring 478 is coupled to the first repelling magnet 460 and imparts a repelling force on the magnetic structure 404 in response to compression forces applied by the magnetic structure 404 as it nears the first repelling magnet 460. The fourth spring 480 is coupled to the second repelling magnet 462 and imparts a repelling force on the magnetic structure 404 in response to compression forces applied by the magnetic structure 404 as it nears the second repelling magnet 462. The springs 474, 476, 478, 480 may be tuned to increase the efficiency of the generator in particular applications and likely environments, as discussed in more detail above in the description of FIG. 33. The tuning may be done experimentally. Some embodiments may employ no springs, fewer springs, or more springs. For example, in some embodiments springs 478 and 480 may be omitted.

Figure 37:
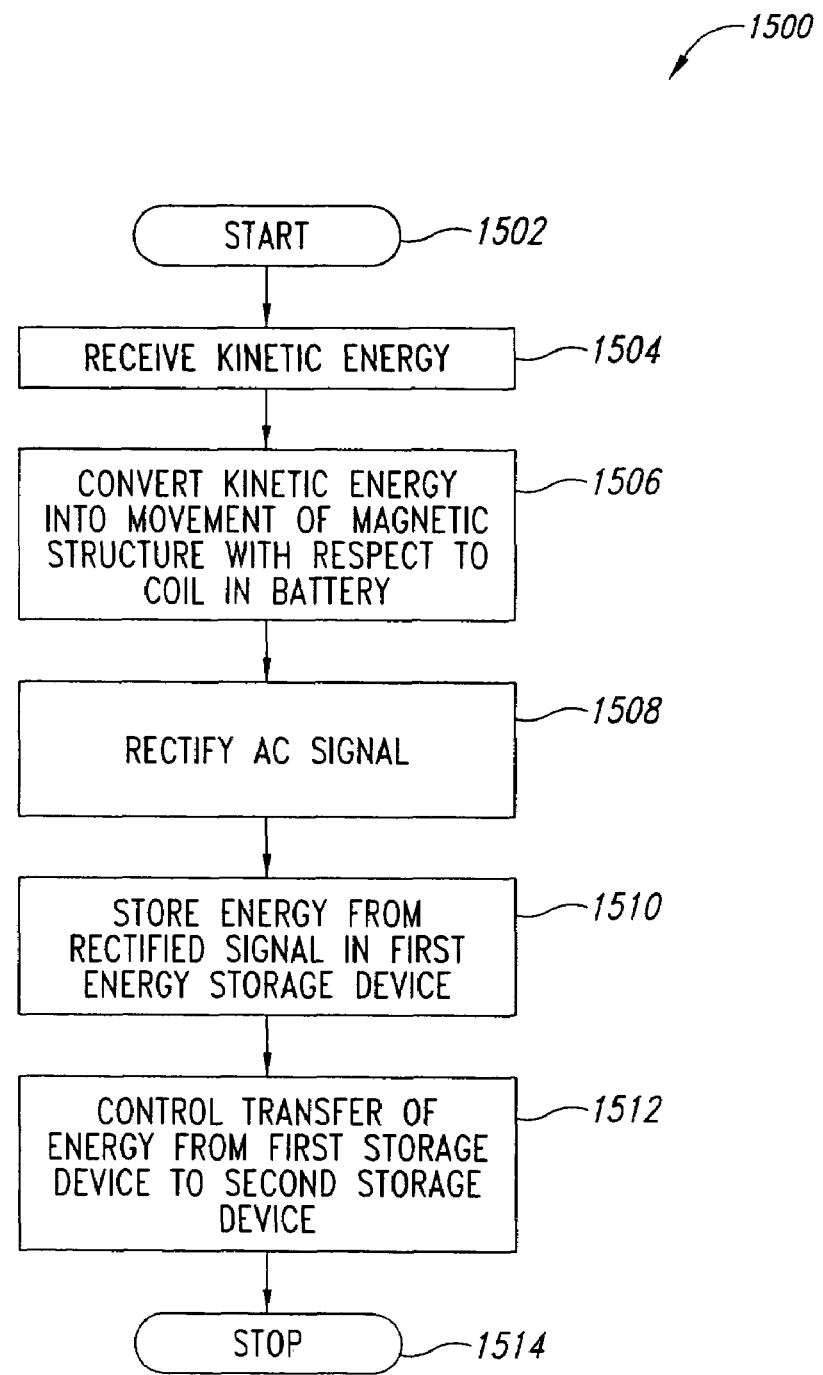
FIG. 37 is a high-level flow diagram for an embodiment of a method of recharging a portable energy storage device.

FIG. 37 is a high-level flow diagram illustrating an embodiment of a method 1500 of charging a portable energy storage device, such as the batteries 100, 200, 300 illustrated in the embodiments of FIGS. 33 through 35, in response to movement of the battery. For convenience, the method 1500 will be described with respect to the battery 100 illustrated in FIG. 33.

The method 1500 begins at 1502 and proceeds to 1504. At 1504, the battery 100 receives energy as a result of movement of the battery 100. The method 1500 proceeds to 1506. At 1506, the battery 100 converts the energy into movement of a magnetic structure with respect to a coil inside the battery 100. The back and forth movement of the magnetic structure through the coil generates an alternating current signal. The magnetic structure may be configured to generate a compressed magnetic field (see, e.g., FIGS. 15 through 21 and 36). The coil may comprise electrical conductive and magnetic conductive windings (see, e.g., FIGS. 2 through 11). The method 1500 proceeds from 1506 to 1508. At 1508, the battery 100 rectifies the alternating current signal produced by the movement of the magnetic structure with respect to the coil. The method proceeds to 1510. At 1510, the battery 100 stores electrical energy from the rectified alternating current signal in a first energy storage device within the battery 100. The method 1500 proceeds from 1510 to 1512. At 1512, the battery 100 controls the transfer of energy stored in the first energy storage device to a second energy storage device within the battery 100. The method 1500 proceeds from 1512 to 1514, where the method 1500 stops.

Embodiments of a method to charge a portable energy storage device may perform other acts not shown in FIG. 37, may not all perform all of the acts shown in FIG. 37, may combine acts shown in FIG. 37, or may perform the acts of FIG. 37 in a different order. For example, the embodiment of a method 1500 illustrated in FIG. 37 may be modified to check whether conditions are appropriate for charging second energy storage device before transferring energy from the first energy storage device to the second energy storage device.

Figure 38:
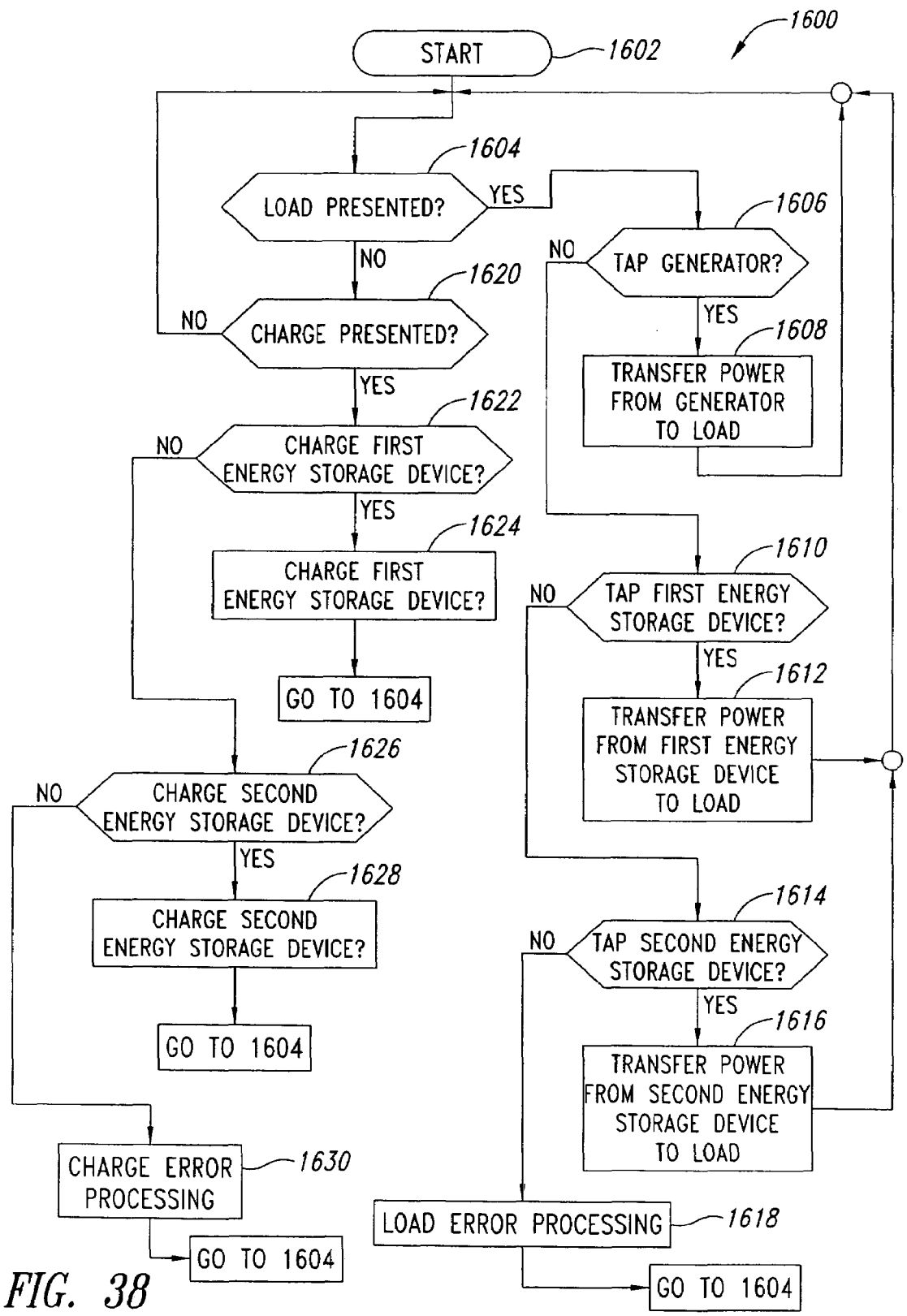
FIG. 38 is a high level flow diagram for an embodiment of a method of operating a portable energy storage device.

FIG. 38 is a high-level flow diagram illustrating an embodiment of a method 1600 of operating a portable energy storage device, such as the batteries 100, 200, 300 illustrated in the embodiments of FIGS. 33 through 35, in response to the presentation of a load or a charge signal to the battery. For convenience, the method 1600 will be described with respect to the battery 100 illustrated in FIG. 33.

The method 1600 begins at 1602 and proceeds to 1604. At 1604, the battery 100 determines whether a load is being presented to the battery 100. This may be done, for example, by using discrete circuitry. When it is determined at 1604 that a load is being presented to the battery 100, the method proceeds from 1604 to 1606. When it is determined at 1604 that a load is not being presented to the battery 100, the method 1600 proceeds from 1604 to 1620.

At 1606, the battery 100 determines whether to condition energy from the generator and provide the conditioned energy to the load. This determination may be made, for example, by determining whether the energy being generated by the generator is sufficient to drive the load. Other factors may be considered as well in the determination, such as, for example, load histories, charging and discharging cycles of the energy storage devices in the battery 100. Discrete circuitry and/or look-up tables may be employed to determine to supply conditioned energy from the generator to the load. When it is determined at 1606 to condition energy from the generator and provide the conditioned energy to the load, the method 1600 proceeds from 1606 to 1608. When it is determined at 1606 to not provide conditioned energy from the generator to the load, the method 1600 proceeds from 1606 to 1610. At 1608, the battery 100 transfers conditioned energy from the generator to the load. The method 1600 proceeds from 1608 to 1604.

At 1610, the battery 100 determines whether to transfer energy from the first energy storage device to the load. This determination may be made, for example, by determining whether the energy stored in the first energy storage device is sufficient to drive the load. Other factors may be considered as well in the determination, such as, for example, load histories, and charging and discharging cycles of the energy storage devices in the battery 100. Discrete circuitry and/or look-up tables may be employed to determine whether to supply energy stored in the first energy storage device to the load. When it is determined at 1610 to supply energy stored in the first energy storage device to the load, the method 1600 proceeds from 1610 to 1612. When it is determined at 1610 to not transfer energy stored in the first energy storage device to the load, the method 1600 proceeds from 1610 to 1614. At 1612, the battery 100 transfers energy stored in the first energy storage device to the load. The method 1600 proceeds from 1612 to 1604.

At 1614, the battery 100 determines whether to transfer energy from the second energy storage device to the load. This determination may be made, for example, by determining whether the energy stored in the second energy storage device is sufficient to drive the load. Other factors may be considered as well in the determination, such as, for example, load histories, and charging and discharging cycles of the energy storage devices in the battery 100. Discrete circuitry and/or look-up tables may be employed to determine whether to supply energy stored in the second energy storage device to the load. When it is determined at 1610 to supply energy stored in the second energy storage device to the load, the method 1600 proceeds from 1614 to 1616. When it is determined at 1614 to not transfer energy stored in the second energy storage device to the load, the method 1600 proceeds from 1614 to 1618. At 1616, the battery 100 transfers energy stored in the second energy storage device to the load. The method 1600 proceeds from 1616 to 1604.

At 1618, error processing and/or safety processing for load conditions is performed. For example, the battery 100 may disable the transfer of energy from the battery until the battery has been recharged (either through energy from the generator or through external sources of energy). The method 1600 proceeds from 1618 to 1604.

At 1620, the battery 100 determines whether a charge signal is being presented to the battery 100. This may be done by, for example, using discrete circuitry. When it is determined at 1620 that a charge signal is being presented to the battery 100, the method proceeds from 1620 to 1622. When it is determined at 1620 that a charge signal is not being presented to the battery 100, the method 1600 proceeds from 1620 to 1604.

At 1622, the battery 100 determines whether to charge the first energy storage device. This determination may be made based upon factors such as, for example, the characteristics of the charge signal, the energy stored in the energy storage devices, and charging and discharging cycles of the energy storage devices in the battery 100. Discrete circuitry and/or look-up tables may be employed to determine whether to charge the first energy storage device using the energy in the charge signal. When it is determined at 1622 to charge the first energy storage device, the method 1600 proceeds from 1622 to 1624. When it is determined at 1622 not to charge the first energy storage device, the method 1600 proceeds from 1622 to 1626. At 1624, the battery 100 uses energy from the received charge signal to charge the first energy storage device. The method 1600 proceeds from 1624 to 1604.

At 1626, the battery 100 determines whether to charge the second energy storage device. This determination may be made based upon factors such as, for example, the characteristics of the charge signal, the energy stored in the energy storage devices, and charging and discharging cycles of the energy storage devices in the battery 100. Discrete circuitry and/or look-up tables may be employed to determine whether to charge the second energy storage device using the energy in the charge signal. When it is determined at 1626 to charge the second energy storage device, the method 1600 proceeds from 1626 to 1628. When it is determined at 1626 not to charge the second energy storage device, the method 1600 proceeds from 1626 to 1630. At 1628, the battery 100 uses energy from the received charge signal to charge the second energy storage device. The method 1600 proceeds from 1628 to 1604.

At 1630 load error processing is performed. For example, the battery 100 may temporarily disable charging of the energy storage devices. The method 1600 proceeds from 1630 to 1604.

Embodiments of a method of operating a portable energy storage device may perform other acts not shown in FIG. 38, may not all perform all of the acts shown in FIG. 38, may combine acts shown in FIG. 38, or may perform the acts of FIG. 38 in a different order. For example, the embodiment of a method 1600 illustrated in FIG. 38 may be modified to provide energy to a load from more than one energy storage device. In another example, the embodiment of a method 1600 illustrated in FIG. 38 may be modified to simultaneously charge an energy storage device and provide energy to a load.

In another example application, devices employing bi-metal coils, magnetic structures configured to generate compressed magnetic fields, and/or other aspects of the present disclosure may be advantageously employed to convert fluid waves, such as water or sea water waves, to electrical energy. This is a potential environmentally friendly, renewable, source of energy. For example, an apparatus, such as the one disclosed in U.S. Pat. No. 6,864,592 to Kelly, for converting the motion of sea wave energy to electrical energy, including one or more float driven linear generators in which the inertial mass of a float and any linkage to the linear generator is minimized, may be modified in accordance with the present disclosure. The moving part of the generator is sized that its gravitational weight acting upon the float, together with that of the float itself and any intermediate linkage, is substantially equal to half the total buoyancy of the float. In calm conditions, the float would be half in, half out of the water. In the presence of waves during the rise of a wave, an upwards thrust is imparted to the generator equal to substantially half the weight of the water displaced by the float. On the fall of the wave, a downwards thrust due to gravity is imparted to the generator equal to the combined weight of the assembly. Thus, the linear generators experience substantially consistent upwards and downwards thrust during the passing of a wave, and consistent generation of power during both of these phases is achieved. The device of Kelly could be advantageously modified to incorporate bi-metal coils and/or magnetic structures configured to generate compressed magnetic fields to increase its efficiency.

Another patent that discloses converting sea waves to electrical energy is U.S. Pat. No. 6,791,205 to Woodbridge, which is incorporated herein by reference. This patent discloses a reciprocating generator rigidly attached to the underside of an ocean buoy that creates electric power from ocean swells. A generator coil maintains a stable position beneath the ocean surface while the magnetic field housing reciprocates with the vertical motion of the buoy in response to interaction with swell and waves on the surface of the ocean. Damping plates attached to the generator coil inhibit the motion of the generator coil, thus keeping it in a stable position relative to the motion of the magnetic housing. The magnetic housing focuses the magnetic field through the generator coil and the relative motion between the magnetic housing and generator coil creates an electromotive force in the coil. In another example, the apparatus of Woodbridge could be advantageously modified in accordance with the present disclosure to increase its efficiency.

Figure 39:
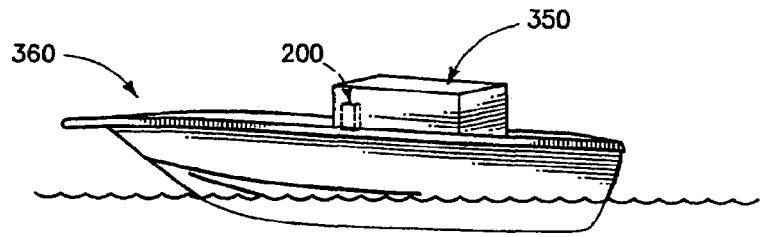
FIG. 39 is a perspective view illustrating a practical application for an embodiment of a power generator.

In some embodiments, as shown in FIG. 39, a generator 200 is employed in a cargo container 350. Security of cargo containers is a growing concern. If power were available, gamma detection of explosives, infrared detection of human cargo, or other surveillance could be performed. By supporting a generator 200 or 300 in or on a cargo container 350, energy can be generated by the linear generator from the motion of a ship 360, due to the action of waves, and this energy can be used to power a variety of surveillance or detection systems. The generator 200 or 300 could be arranged to capture side to side rocking motion, or up and down motion, for example.

Figure 40:
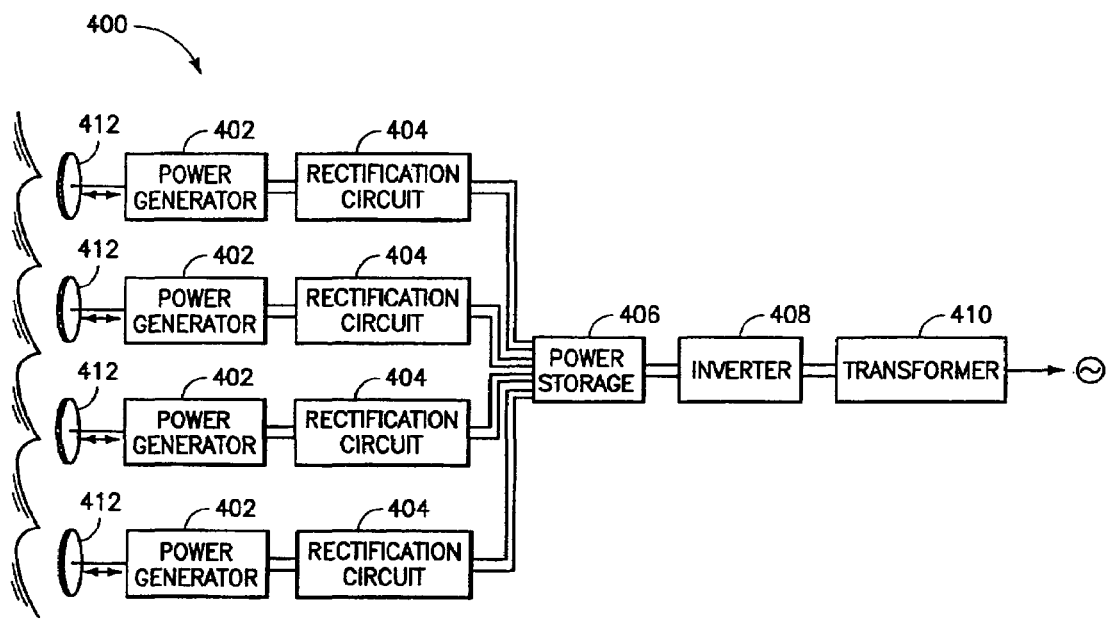
FIG. 40 is a block diagram of an embodiment of a system for generating power.

In another example, FIG. 40 shows just one example of a water wave to electrical energy power facility 400 comprising a plurality of power generators 402 of the type described above. The facility 400 includes paddles or linkages 412 coupled to the generators 402. In one embodiment, the generators 402 are like the linear generators described above and the paddles 412 are coupled to the bottom 214 of a generator 200 or the bottom 338 of a generator 300. The generators 402 are arranged to be moved by water waves and to cause either the coils or magnets of the generators 402 to move in response to the waves. In some embodiments, the generators 402 are supported to float on water, without the use of linkages.

The facility 400 further includes one or more rectification circuits or circuitry 404 coupled to the windings or coils of the power generators 402. The rectification circuits 404 convert AC currents generated in the windings or coils of the power generators 402 to DC currents. The windings or coils of the power generators may comprise bi-metal coils.

In the embodiment of FIG. 40, the facility 400 further includes a power storage device 406 coupled to the rectification circuits 404 for accumulating and storing power generated by the windings or coils. The power storage device 406 can be or include one or more batteries, capacitors, combination of batteries and capacitors, or other types of power storage devices. The power storage device includes a charging regulator to provide proper current and voltage to the battery, capacitor, or other energy storage device.

In the embodiment of FIG. 40, the facility 400 further includes an inverter 408 coupled to the power storage device 406 and configured to supply alternating current to an electricity distribution system or grid. In the illustrated embodiment, the inverter is coupled to the grid via a transformer 410. Other embodiments, including one or more power generators, for converting water waves to electrical power (either AC or DC) are possible.

Other applications are possible, such as biological motion systems, parasitic power harvesting, self-powered devices such as self-powered security and intelligence gathering devices. For example, in one embodiment, a power generator as described herein is included in a shoe, to generate power from walking. That power can be used to supply any variety of electronic devices.

A shoe-mounted device includes, for example, a power generator as described above, mounted in or on a shoe heel such that each time the heel hits the ground, the impact causes movement of the coil relative to the magnets. The shoe-mounted device also includes a rectification circuit (e.g., a full wave rectifier) coupled to the coil of the power generator, and a power storage device such as a capacitor or battery coupled to the output of the rectification circuit. A voltage regulator can be included to provide proper current and voltage to the storage device.

Figure 41:
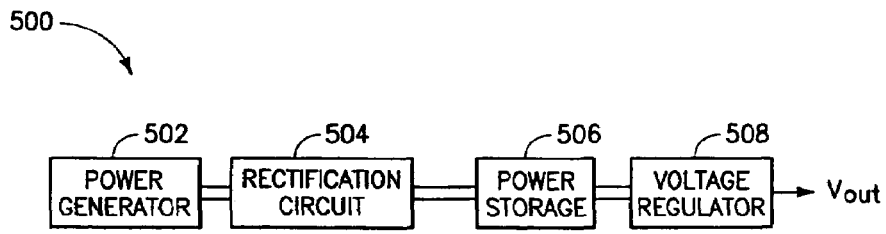
FIG. 41 is a block diagram of an embodiment of a self-powered device.

For example, FIG. 41 shows just one example of a biological motion device 500 comprising a power generator 502 of the type described above in connection with FIGS. 22-32. The power generator 502 is mounted, in some embodiments, in the heel of a shoe or elsewhere on a person such that the action of walking moves the magnets relative to the coil of a power generator 502.

The device 500 further includes a rectification circuit or rectification circuitry 504 coupled to the windings or coils of the power generator 502. The rectification circuitry 504 converts AC currents generated in the windings or coils of the power generators 502 to DC currents.

In the embodiment of FIG. 41, the device 500 further includes a power storage device 506 coupled to the rectification circuitry 504 for accumulating and storing power generated by the windings or coils. The power storage device 506 can be or include one or more batteries, capacitors, combination of batteries and capacitors, or other types of power storage devices.

In the embodiment of FIG. 41, the device 500 further includes a voltage regulator 508 coupled to the power storage device 506 and configured to provide a stable output voltage to an electronic device borne by a person. Other embodiments are possible.

Figure 42:
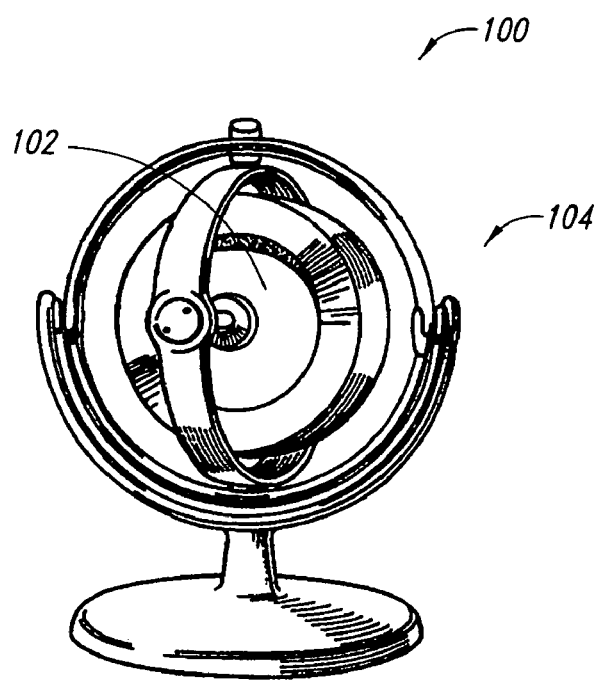
FIG. 42 illustrates an embodiment of a system in accordance with the present disclosure.

FIG. 42 illustrates an embodiment of a system 100 that is gimbaled to facilitate the conversion of available energy into electrical energy. The system 100 comprises a generator 102, such as, for example, one or more of the generators illustrated in FIGS. 22 through 32, supported by a support structure 104 that facilitates positioning of the generator 102 in a desired position. In some embodiments, the support structure 104 may employ gyroscopic techniques.

Figure 43:
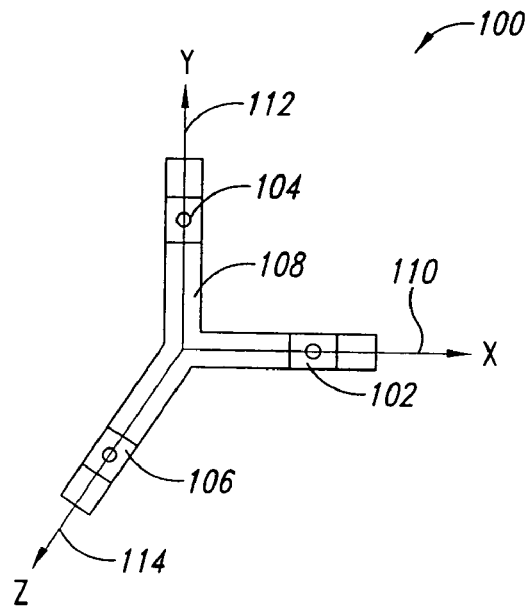
FIG. 43 illustrates another embodiment of a system in accordance with the present disclosure.

FIG. 43 illustrates a system 100 comprising a plurality of generators 102, 104, 106 coupled to a support structure 108. A first generator 102 is coupled to the support structure 108 so as to be oriented along an X-axis 110. A second generator 104 is coupled to the support structure 108 so as to be oriented along an Y-axis 112. A third generator 106 is coupled to the support structure 108 so as to be oriented along a Z-axis 114.

Figure 44:
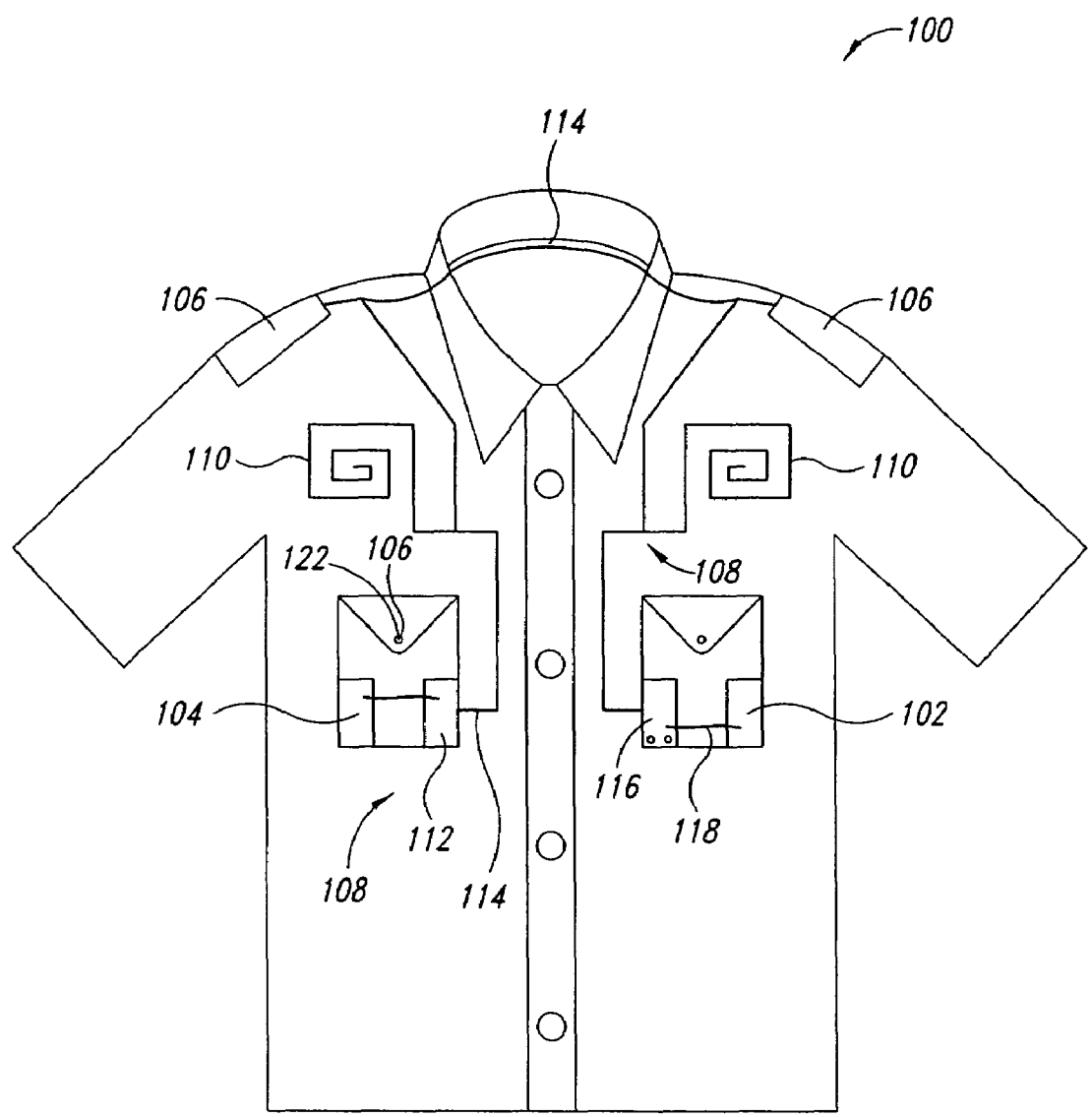
FIG. 44 illustrates an embodiment of an article of clothing in accordance with the present disclosure.

FIG. 44 illustrates an article of clothing 100 comprising an embodiment of a battery 102, such as one of the battery embodiments illustrated in FIGS. 33 through 35, an embodiment of a generator 104, such as one of the generators illustrated in FIGS. 22 through 32, solar collectors 106, and a radio-frequency energy collector 108 comprising an antenna system 110 and a rectifier 112. The article of clothing 100 also comprises a bus system 114 to couple the various components together and a coupling 116 to couple the bus system 100 to the battery 102. The coupling 116 may be configured to condition or add together electrical energy received from the generator 104, the solar collectors 106 and/or the radio frequency energy collector 108, or to switch a connection 118 to the battery to connect to one or more of the other components of the article of clothing, such as the generator 104. The coupling 116 may also be configured to allow connections to external loads and/or sources of energy. As illustrated, the article of clothing 100 is a shirt, but other embodiments may comprise other articles of clothing. The battery 102, generator 104, solar collectors 106, the radio-frequency energy collector 108, bus system 114, the coupling 116 and the connection 118 may be integrated into the article of clothing, removeably coupled to the article of clothing, or combinations of the above. For example, the antenna system 110 and the bus system 114 may be integrated into the fabric of the shirt while the battery 102 may be coupleable to the shirt. In another example, a button 122 may also comprise a solar collector 106. Some embodiments may not comprise all of the components illustrated. For example, an embodiment may comprise the battery 102 and the antenna system 110. In some embodiments, a control module in the battery (see control module 208 in FIG. 34), may control storage in the battery 102 of energy received by the battery 102 via the bus system 114.

Figure 45:
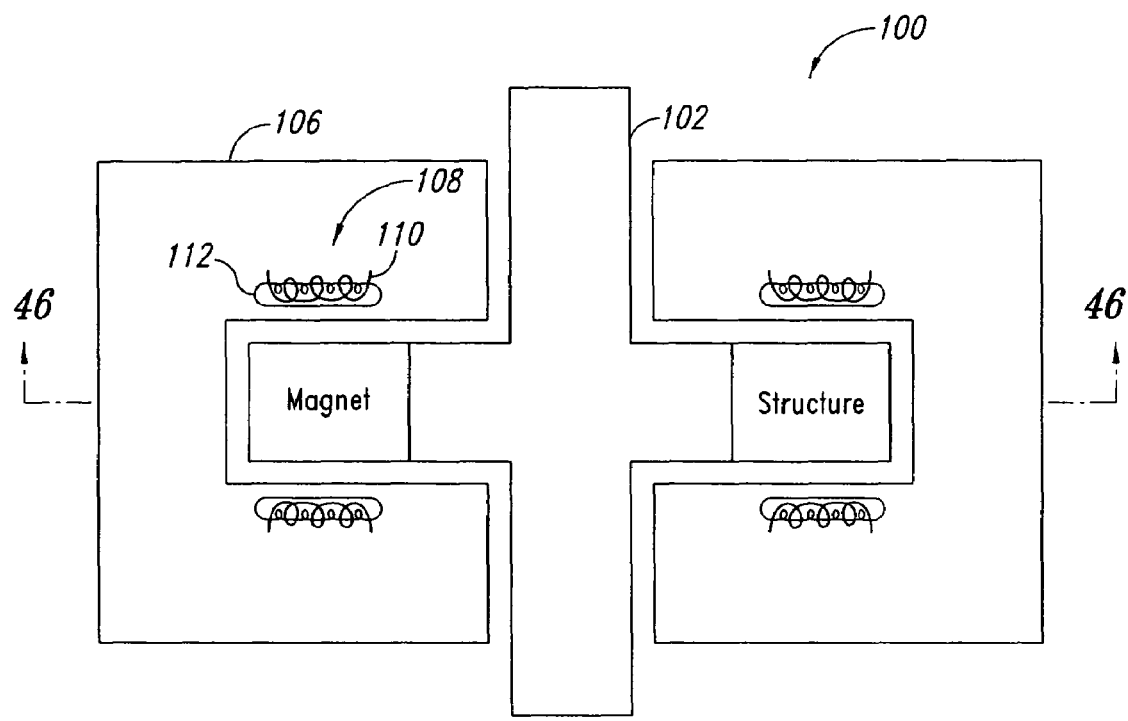
FIG. 45 is a side view of an embodiment of a system in accordance with the present invention.
Figure 46:
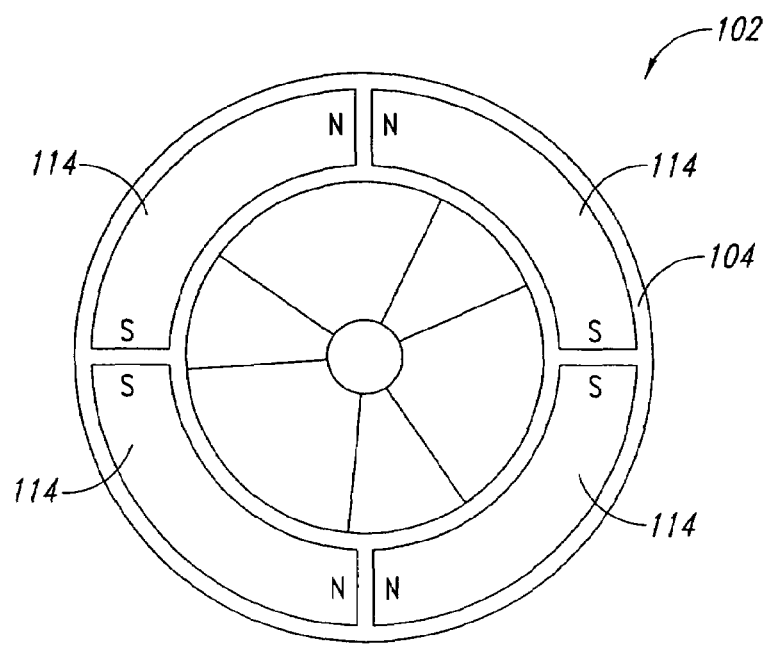
FIG. 46 is a top view of an embodiment of a rotor suitable for use in the embodiment of a system illustrated in FIG. 45.

FIG. 45 is a side sectional view of an embodiment of a system 100 in accordance with an embodiment. The system 100 comprises a rotor 102 comprising a magnetic structure 104 configured to generate a compressed magnetic field and a stator 106 comprising one or more bi-metal coils 108 comprising an electrical conductive element 110 and a magnetic conductive element 112. FIG. 46 is a top cross-sectional view of the rotor 102 of FIG. 45 taken along lines 46-46. The magnetic structure 104 comprises a plurality of magnets 114 held spaced apart with like poles facing each other so as to generate a compressed magnetic field.

Although specific embodiments of and examples for the coil, magnetic structure, device, generator/motor, battery, control module, energy storage devices and methods of generating and storing energy are described herein for illustrative purposes, various equivalent modifications can be made without departing from the spirit and scope of this disclosure, as will be recognized by those skilled in the relevant art. The various embodiments described above can be combined to provide further embodiments.

These and other changes can be made to the invention in light of the above-detailed description. In general, in the following claims, the terms used should not be construed to limit the invention to the specific embodiments disclosed in the specification and the claims. Accordingly, the invention is not limited by the disclosure, but instead its scope is to be determined entirely by the following claims.

What is claimed is:

1. A battery, comprising:
a case;
a coil contained within the case;
a magnetic structure contained within the case and configured to generate a compressed magnetic field;
a first energy storage device contained within the case;
a plurality of contact terminals coupled to the case; and
a control module contained within the case and coupled to the coil and the first energy storage device.

2. The battery of claim 1 wherein the magnetic structure comprises a plurality of spaced-apart rare earth magnets configured so that like-polarity poles face each other in neighboring magnets in the plurality of rare earth magnets.

3. The battery of claim 2 wherein the magnets in the plurality of magnets are held in position with respect to one another.

4. The battery of claim 2 wherein a space between two magnets in the plurality of magnets is substantially filled with a non-magnet substance.

5. The battery of claim 4 wherein the non-magnetic substance comprises air.

6. The battery of claim 4 wherein the non-magnetic substance comprises a fluoropolymer resin.

7. The battery of claim 1 wherein the case is evacuated and hermetically sealed.

8. The battery of claim 1 further comprising:
a suspension system coupled to the magnetic structure.

9. The battery of claim 8 wherein the suspension system is tuned to optimize conversion of expected patterns of movement into electrical energy.

10. The battery of claim 8 wherein the coil comprises:
an electrical conductive element; and
a magnetic conductive element.

11. The battery of claim 10 wherein the magnetic conductive element is configured to focus magnetic flux in the electrical conductive element.

12. The battery of claim 11 wherein the magnetic conductive element comprises a silver/nickel alloy.

* * * * *